(12) United States Patent
See

(10) Patent No.: US 8,824,976 B2
(45) Date of Patent: Sep. 2, 2014

(54) DEVICES FOR SWITCHING AN ANTENNA

(75) Inventor: Puay H. See, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/444,369

(22) Filed: Apr. 11, 2012

(65) Prior Publication Data

US 2013/0273861 A1    Oct. 17, 2013

(51) Int. Cl.
*H04B 1/44* (2006.01)
*H01Q 5/00* (2006.01)

(52) U.S. Cl.
CPC .............. *H04B 1/44* (2013.01); *H01Q 5/0093* (2013.01)
USPC ............. 455/78; 455/83; 455/63.3; 455/13.3; 330/51

(58) Field of Classification Search
USPC ........ 455/78, 83, 63.3, 13.3, 552.1, 285, 302; 330/51, 124, 103, 32
See application file for complete search history.

(56) References Cited

U.S. PATENT DOCUMENTS

| | | | |
|---|---|---|---|
| 5,969,681 A | 10/1999 | O'neill, Jr. | |
| 7,092,676 B2 | 8/2006 | Abdelgany et al. | |
| 7,643,848 B2 | 1/2010 | Robinett | |
| 8,175,554 B2 * | 5/2012 | Camuffo et al. | 455/126 |
| 2007/0178839 A1 | 8/2007 | Rezvani et al. | |
| 2007/0222697 A1 | 9/2007 | Caimi et al. | |
| 2008/0051134 A1 | 2/2008 | Brobston et al. | |
| 2009/0034504 A1 * | 2/2009 | Uejima | 370/343 |
| 2009/0268647 A1 * | 10/2009 | Uejima | 370/297 |
| 2010/0048196 A1 | 2/2010 | Georgantas et al. | |
| 2010/0105340 A1 | 4/2010 | Weissman | |
| 2010/0238075 A1 | 9/2010 | Pourseyed | |
| 2010/0291888 A1 | 11/2010 | Hadjichristos et al. | |
| 2011/0018632 A1 | 1/2011 | Pletcher et al. | |
| 2011/0227666 A1 * | 9/2011 | Manssen et al. | 333/32 |
| 2012/0302188 A1 * | 11/2012 | Sahota et al. | 455/150.1 |
| 2013/0016024 A1 * | 1/2013 | Shi et al. | 343/833 |
| 2013/0122825 A1 * | 5/2013 | Deforge et al. | 455/73 |
| 2013/0194054 A1 * | 8/2013 | Presti | 333/112 |
| 2013/0285873 A1 * | 10/2013 | Dupuy et al. | 343/852 |

OTHER PUBLICATIONS

International Search Report and Written Opinion—PCT/US2013/036171—ISA/EPO—Jun. 21, 2013.

* cited by examiner

*Primary Examiner* — Minh D Dao
(74) *Attorney, Agent, or Firm* — Kenyon S. Jenckes

(57) ABSTRACT

A switchplexer is described. The switchplexer includes switches that are coupled to an antenna. The switchplexer also includes ports. Each of the switches is separately coupled to one of the ports. The switchplexer also includes controlling circuitry coupled to the switches. The controlling circuitry concurrently closes at least two of the switches when indicated by a control signal.

44 Claims, 35 Drawing Sheets

DEVICES FOR SWITCHING AN ANTENNA

TECHNICAL FIELD

The present disclosure relates generally to electronic devices. More specifically, the present disclosure relates to devices for switching an antenna.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) communicate with other electronic devices. For example, a cellular phone may wirelessly communicate with a base station by transmitting and receiving electromagnetic signals over the air.

As wireless communication technology has advanced, wireless communication devices that can communicate using different frequency bands and/or different technologies have been sought. As can be observed from this discussion, systems and methods that enable communications using different frequency bands and/or different technologies may be beneficial.

SUMMARY

A switchplexer is described. The switchplexer includes switches that are coupled to an antenna. The switchplexer also includes ports. Each of the switches is separately coupled to one of the ports. The switchplexer additionally includes controlling circuitry coupled to the switches. The controlling circuitry concurrently closes at least two of the switches when indicated by a control signal. The switches may only be coupled to a single antenna. The switchplexer may include a separate set of switches coupled to another antenna and to the controlling circuitry.

At least one of the ports may be coupled to a phase shifter. Each of the ports may be coupled to one of a plurality of filters. The ports may not be coupled to a duplexer. A first port of the ports may be coupled to a receive filter and a second port of the ports may be coupled to a transmit filter and switches corresponding to the ports may be closed to enable concurrent transmission and reception.

A transmit filter may be coupled to one of the ports and a receive filter may be coupled to another of the ports. The transmit filter and the receive filter may be independently linkable to the antenna. The receive filter may be a multiple mode receive filter.

The controlling circuitry may concurrently close at least two of the switches corresponding to at least two of the ports that support codirectional signals when indicated by the control signal. The ports may not be coupled to a diplexer. The codirectional signals may be receive signals in different bands to enable carrier aggregation.

Each of the ports may support signals in one or more bands corresponding to at least one of Global System for Mobile Communications (GSM), Code Division Multiple Access (CDMA), Wideband Code Division Multiple Access (WCDMA), Universal Mobile Telecommunications System (UMTS), Long Term Evolution (LTE), Time Division Synchronous Code Division Multiple Access (TD-SCDMA), wireless personal area network (PAN) and Institute of Electrical and Electronics Engineers (IEEE) 802.11 specifications. The ports may support concurrent wireless communication with two or more different wireless systems.

A method for switching an antenna is also described. The method includes obtaining a control signal. The method also includes generating switch signals based on the control signal. The method further includes controlling switches that are coupled to an antenna based on the switch signals. Each of the switches may be separately coupled to one of multiple ports. The switch signals may concurrently close at least two of the switches when indicated by the control signal.

An apparatus for switching an antenna is also described. The apparatus includes means for obtaining a control signal. The apparatus also includes means for generating switch signals based on the control signal. The apparatus further includes means for controlling switches that are coupled to an antenna based on the switch signals. Each of the switches is separately coupled to one of multiple ports. The means for controlling switches concurrently closes at least two of the switches when indicated by the control signal.

A computer-program product for switching an antenna is also described. The computer-program product includes a non-transitory tangible computer-readable medium with instructions. The instructions include code for causing a switchplexer to obtain a control signal. The instructions also include code for causing the switchplexer to generate switch signals based on the control signal. The instructions further include code for causing the switchplexer to control switches that are coupled to an antenna based on the switch signals. Each of the switches is separately coupled to one of multiple ports. The switch signals concurrently close at least two of the switches when indicated by the control signal.

DETAILED DESCRIPTION

Figure 1:
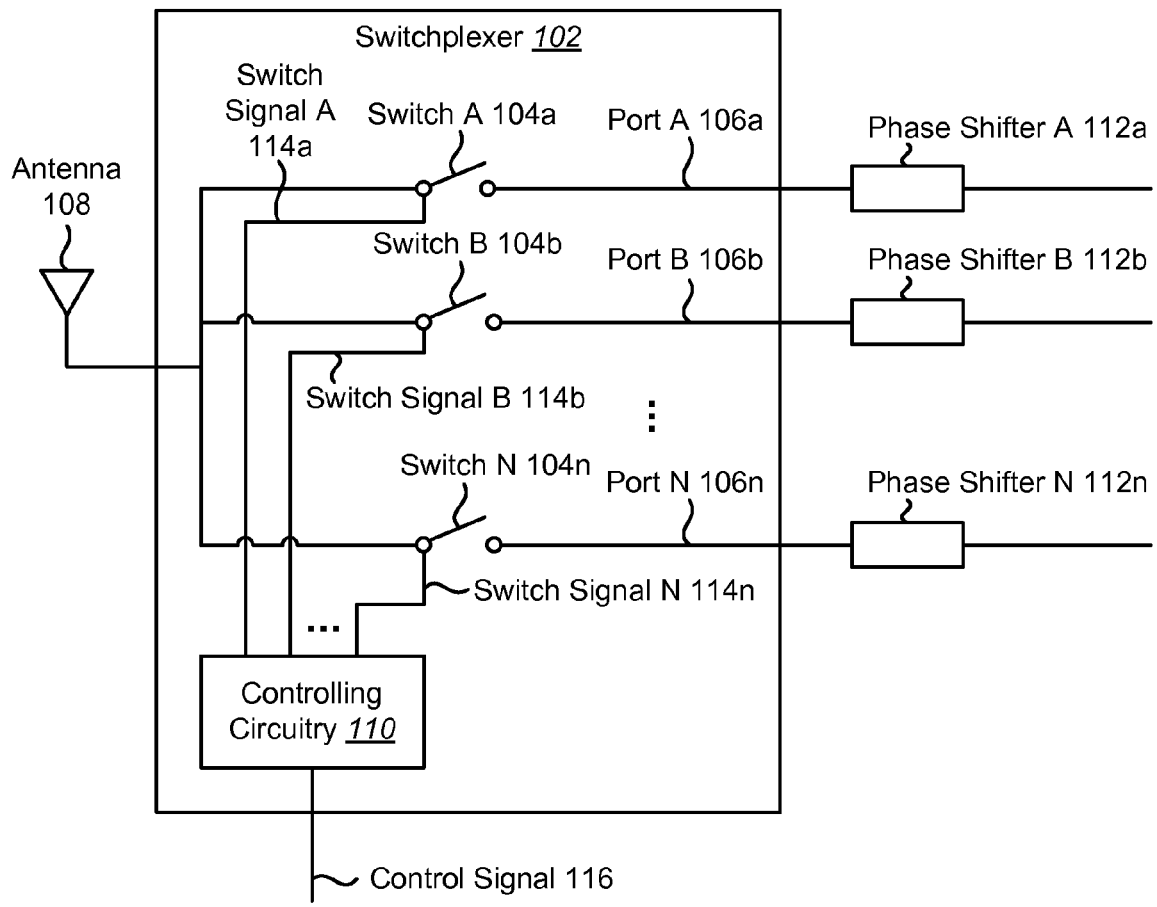
FIG. 1 is a block diagram illustrating one configuration of a switchplexer in accordance with the systems and methods disclosed herein.

The systems and methods disclosed herein may be applied to a variety of electronic devices. Examples of electronic devices include integrated circuits, cellular phones, voice recorders, video cameras, audio players (e.g., Moving Picture Experts Group-1 (MPEG-1) or MPEG-2 Audio Layer 3 (MP3) players), video players, audio recorders, laptop computers, netbook computers, tablet devices, personal digital assistants (PDAs), gaming systems, etc. One kind of electronic device is a communication device, which may communicate with another device. Examples of communication devices include telephones, laptop computers, desktop computers, cellular phones, smartphones, base stations, access points, wireless or wired modems, e-readers, tablet devices, wireless communication devices and gaming systems.

As used herein, the terms "circuit," "circuitry" and other variations of the term "circuit" may denote a structural element or component. For example, circuitry can be an aggregate of circuit components, such as integrated circuit components, in the form of processing and/or memory cells, units, blocks and/or other components. As used herein, the term "module" may indicate that an element or component may be implemented in hardware, software or a combination of both. For example, a "module" may be implemented in circuitry, in software that is run on a processor or as a combination of both.

It should be noted that the terms "couple," "coupling," "coupled" or other variations of the word couple as used herein may indicate either an indirect connection or a direct connection. For example, if a first component is "coupled" to a second component, the first component may be either indirectly connected (e.g., through one or more other components) to the second component or directly connected to the second component. Additionally, it should be noted that as used herein, designating a component, element or entity (e.g., transistor, capacitor, resistor, power supply, circuit, filter, switch, block, module, etc.) as a "first," "second," "third" or "fourth" component, etc., may be used to distinguish components for explanatory clarity. It should also be noted that labels used to designate a "second," "third" or "fourth," etc., do not necessarily imply that elements using preceding labels "first," "second" or "third," etc., are included or used.

It should be noted that the systems and methods disclosed herein may be described in terms of one or more specifications, such as the 3rd Generation Partnership Project (3GPP) Release-8 (Rel-8), 3GPP Release-9 (Rel-9), 3GPP Release-10 (Rel-10), Long-Term Evolution (LTE), LTE-Advanced (LTE-A), etc. For example, the systems and methods disclosed herein may be applied to devices that adhere to Universal Mobile Telecommunications System (UMTS) specifications (e.g., High-Speed Downlink Packet Access (HSDPA), High-Speed Uplink Packet Access (HSUPA), Evolved High-Speed Packet Access (HSPA+)). Additionally or alternatively, they may be applied to devices that adhere to specifications such as CDMA (Code Division Multiple Access), WCDMA (Wideband Code Division Multiple Access), cdmaOne and CDMA2000. However, at least some of the concepts described herein may be applied to other wireless communication systems. For example, the term User Equipment (UE) may be used to refer to the more general term "wireless communication device." Furthermore, one or more of the terms Node B, Evolved Node B (eNB), Home Evolved Node B (HeNB), etc., may be used to refer to the more general term "base station."

Some examples of the systems and methods given herein may be described in terms of standard wireless communication frequency bands. Table (1) below summarizes some wireless communication frequency bands with approximate uplink and downlink frequency ranges (in megahertz (MHz)). For convenience herein, the UMTS bands given in Table (1) may be referred to herein as "Band 1," "Band 2," etc. For convenience, the "supplemental downlink" band as given in Table (1) may be referred to herein and/or illustrated in one or more Figures as "SD." The supplemental downlink may reside within Band 12 and may be only used for downlink communications. It should be noted that the term "uplink" may denote communications from a wireless communication device to a base station and the term "downlink" may denote communications from a base station to a wireless communication device in some configurations.

TABLE (1)

| Name | Band (MHz) | Uplink (e.g., Tx) Frequencies (MHz) | Downlink (e.g., Rx) Frequencies (MHz) |
| --- | --- | --- | --- |
| UMTS Band 1 | 2100 | 1920-1980 | 2110-2170 |
| UMTS Band 2 | 1900 | 1850-1910 | 1930-1990 |
| UMTS Band 3 | 1800 | 1710-1785 | 1805-1880 |
| UMTS Band 4 | 1700 | 1710-1755 | 2110-2155 |
| UMTS Band 5 | 850 | 824-849 | 869-894 |
| UMTS Band 12 | 700 | 698-716 | 728-746 |
| UMTS Band 13 | 700 | 777-787 | 746-756 |
| UMTS Band 14 | 700 | 788-798 | 758-768 |
| UMTS Band 17 | 700 | 704-716 | 734-746 |
| GSM 850 | 850 | 824-849 | 869-894 |
| GSM 900 | 900 | 880-915 | 925-960 |
| GSM 1800 | 1800 | 1710-1785 | 1805-1880 |
| GSM 1900 | 1900 | 1850-1910 | 1930-1990 |
| Supplemental Downlink (SD) | 700 | — | 716-728 |

Wireless communication devices typically use specified frequency bands to communicate. For example, some wireless communication devices have operated in frequency bands given by Global System for Mobile Communications (GSM) specifications, while others have operated in frequency bands given by Code Division Multiple Access (CDMA) or Wideband Code Division Multiple Access (WCDMA) (e.g., UMTS) specifications. More flexibility for operating in multiple frequency bands and for carrier aggregation is being sought.

In order to provide multiple band operation and carrier aggregation, a wireless communication device (e.g., cellular phone) may use front-end circuitry in order to switch an antenna between transmit and/or receive circuitries (e.g., transmit chains and/or receive chains) that allow communication according to different modes (e.g., GSM, WCDMA, etc.) and/or that allow carrier aggregation (e.g., transmitting and/or receiving multiple bands at the same time). Known front-end circuitry may include one or more duplexers, one or more diplexers and a switch to switch the antenna. However, this known approach wastes circuit space and may degrade receiver sensitivity.

The systems and methods disclosed herein may help to solve the problems described above. For example, the systems and methods disclosed herein describe a switchplexer, an approach for enabling multiple modes and/or an approach for enabling carrier aggregation.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a switchplexer 102 in accordance with the systems and methods disclosed herein. The switchplexer 102 may include two or more switches 104a-n. One example of a switch 104 is a transistor. Each of the switches 104a-n is coupled to an antenna 108. The switchplexer 102 may also include two or more ports 106a-n. Each of the switches 104a-n is coupled to one of the ports 106a-n.

The switchplexer 102 may also include controlling circuitry 110. The controlling circuitry 110 may be coupled to each of the switches 104a-n. The controlling circuitry 110 may obtain (e.g., receive) a control signal 116. The controlling circuitry 110 may control the switches 104a-n based on the control signal 116. For example, the controlling circuitry 110 may generate switch signals 114a-n based on the control signal. The switch signals 114a-n may cause one or more of the switches 104a-n to open or close.

For example, the controlling circuitry 110 may close (e.g., activate, "turn on," etc.) one or more of the switches 104a-n. In some cases, for instance, the control signal 116 may indicate that multiple switches 104a-n should be closed. When the control signal 116 indicates that multiple switches 104a-n should be closed, the controlling circuitry 110 may close two or more of the switches 104a-n. One example of the controlling circuitry 110 is a decoder. For instance, the controlling circuitry 110 may decode the control signal 116 to generate the switch signals 114a-n in order to control the switches 104a-n.

According to known approaches, only one port may be linked to an antenna at a time. However, in accordance with the systems and methods disclosed herein, multiple ports 106a-n (e.g., two or more) may be linked to the antenna 108 (e.g., a single antenna) at a time. For example, the controlling circuitry 110 may concurrently close two or more of the switches 104a-n in order to link two or more of the ports 106a-n at a time. It should be noted that as used herein, the term "concurrently" and variations thereof may indicate that two events or states overlap each other in time, though the events or states may or may not begin and/or end at exactly the same time.

One or more of the ports 106a-n may be optionally coupled to one or more phase shifters 112a-n. In some configurations, the phase shifter(s) 112a-n may be included within the switchplexer 102. In other configurations, the phase shifter(s) 112a-n may not be included within the switchplexer 102 (but may be coupled to the switchplexer 102, for instance). Additionally or alternatively, one or more of the phase shifters 112a-n may be implemented as part of one or more filters. Additionally or alternatively, one or more filters may be included in the switchplexer 102. The controlling circuitry 110 may control the one or more phase shifters 112a-n in some configurations. For example, the controlling circuitry 110 may control an amount of phase shift applied by one or more of the phase shifters 112a-n to receive and/or transmit signals. For instance, the phase shifter(s) 112a-n may be programmable.

In some configurations, the switchplexer 102 may be included within radio frequency (RF) front end circuitry (of a communication device, for example). In particular, the switchplexer 102 may be a reconfigurable front-end switchplexer. The switchplexer 102 may support single or multi-band operations.

It should be noted that each of the ports 106a-n may be coupled to a transmitter (e.g., transmit chain) and/or a receiver (e.g., receive chain). In some configurations, each transmitter or receiver may support communications in one or more bands and/or one or more modes corresponding to GSM, CDMA, WCDMA, LTE, Time Division Synchronous Code Division Multiple Access (TD-SCDMA), wireless personal area network (PAN) (e.g., Bluetooth), and/or Institute of Electrical and Electronics Engineers (IEEE) 802.11 specifications.

Additionally, the switchplexer 102 may support carrier aggregation, Multiple-Input and Multiple-Output (MIMO) operation and/or may be applied to a diversity receiver. For example, one or more of the switches 104a-n may be closed in order to link one or more of the ports 106a-n to the antenna 108 at a time, allowing communications in multiple bands to occur concurrently. According to known approaches, however, only one port may be linked (to a single antenna, for example) at a time.

In some configurations, the systems and methods disclosed herein may support concurrent communications with different wireless communication systems. For example, the switchplexer 102 (e.g., ports 106) may support concurrent wireless communications with two or more different wireless systems. For instance, one or more ports 106 may support concurrent communications with an LTE cellular network (e.g., a base station) in accordance with LTE specifications and with a wireless local area network (WLAN) (e.g., an access point) in accordance with IEEE 802.11 specifications. Additionally, the systems and methods disclosed herein may allow improved (e.g., optimized) communications with one or more wireless communication systems. For example, the switchplexer 102 may improve communication performance on one or more bands corresponding to one or more different wireless communication systems.

The switchplexer 102 may be referred to as a "multi-pole switch" in some configurations. The switchplexer 102 may support single or concurrent operation (e.g., one or multiple of the switches 104a-n may be activated, closed or "turned on" at the same time).

The switchplexer 102 may use a single or multi-wire interface for decoding a single or concurrent operation control signal 116. For example, the control signal 116 may be carried on one or more wires to the controlling circuitry 110. The interface may be used to control the switches 104a-n and/or the phase shifter(s) 112a-n. In some configurations, the interface may be implemented using an existing standard (e.g., Mobile Industry Processor Interface (MIPI) RF Front-End (RFFE), 3-wire bus, Inter-Integrated Circuit (I²C), etc.).

In some configurations, the switchplexer 102 may support a single antenna 108 or multiple antennas 108. For example, the switchplexer 102 may include one or more sets of switches 104, where each set of switches 104 is coupled to a separate antenna. In some configurations, each set of switches 104 may include two or more switches 104. For example, as used herein, a "set of switches" and/or a "switchplexer" may be a "multi-pole switch," where multiple single-pole switches with one terminal coupled together may form a multi-pole switch. It should be noted that the switchplexer 102 may be coupled to the antenna 108 without a diplexer in some configurations.

Figure 2:
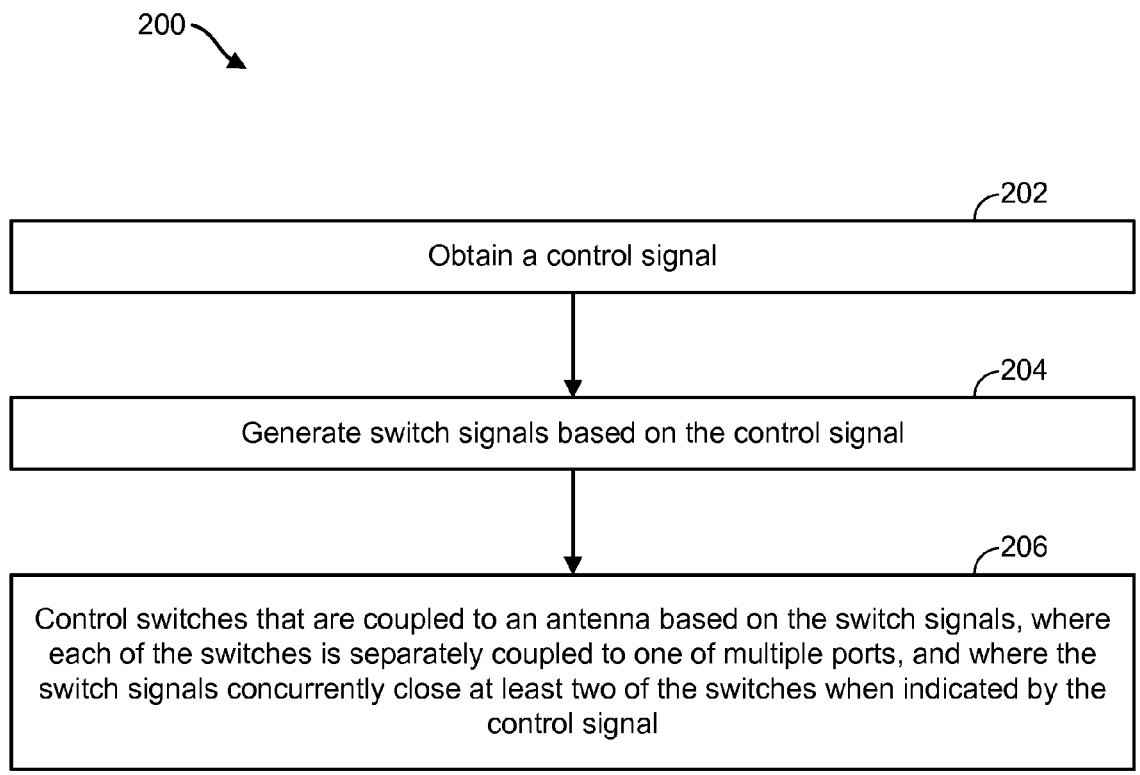
FIG. 2 is a flow diagram illustrating one configuration of a method for switching an antenna.

FIG. 2 is a flow diagram illustrating one configuration of a method 200 for switching an antenna 108. A switchplexer 102 may obtain 202 a control signal 116. For example, the controlling circuitry 110 may receive the control signal 116 via a single or multi-wire interface. In some configurations, the control signal 116 may be provided by a processor (e.g., baseband processor) or some other circuitry.

The switchplexer 102 may generate 204 switch signals 114 based on the control signal 116. For example, the switchplexer 102 may translate the control signal 116 into switch signals 114. In some configurations, the controlling circuitry 110 may decode the control signal 116. For instance, the control signal 116 may be received by the controlling circuitry 110 in a particular format. The controlling circuitry 110 (e.g., decoder) may then decode or reformat the control signal 116 into multiple switch signals 114 that cause the switches 104 to open and/or close. For example, the switches 104 may be transistors and the controlling circuitry 110 may provide one of two voltage levels as switch signals 114 to the switches 104. For instance, the controlling circuitry 110 may provide a high switch signal 114 to the one or more switches 104 to be closed and a low switch signal 114 to the one or more switches 104 to be open.

The switchplexer 102 may control 206 switches 104 that are coupled to the antenna 108 based on the switch signals 114. Each of the switches 104 may be separately coupled to one of the multiple ports 106. Furthermore, the switch signals 114 may concurrently close at least two of the switches 104 when indicated by the control signal 116. For example, the control signal 116 may indicate that one or more switches 104 should be closed. When the control signal 116 indicates that two or more of the switches 104 should be closed, the switchplexer 102 (e.g., controlling circuitry 110) may cause the corresponding two or more switches 104 to close (by providing two or more switch signals 114 that cause two or more switches 104 to close, for example). It should be noted that when the control signal 116 indicates that only one switch 104 should be closed, that the switchplexer 102 (e.g., controlling circuitry 110) may cause only the corresponding switch 104 to close (by providing a switch signal 114 that causes one switch 104 to close, for example). In some configurations, the switchplexer 102 may additionally control a separate set of switches that is coupled to another antenna.

Figure 3:
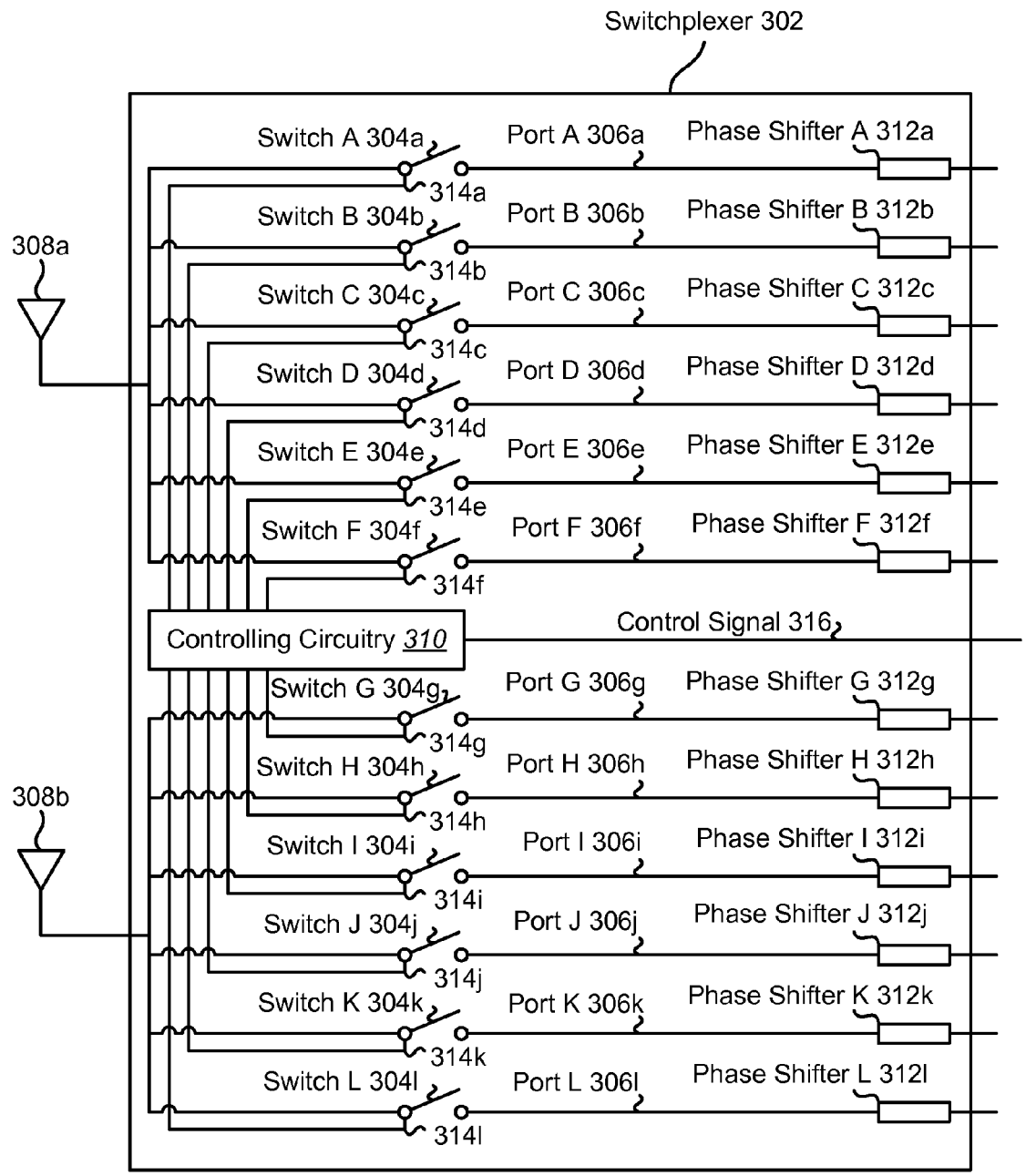
FIG. 3 is a block diagram illustrating an example of a more specific configuration of a switchplexer in accordance with the systems and methods disclosed herein.

FIG. 3 is a block diagram illustrating an example of a more specific configuration of a switchplexer 302 in accordance with the systems and methods disclosed herein. In this example, the switchplexer 302 includes two sets of switches 304a-1 and ports 306a-1. The switchplexer 302 also includes phase shifters 312a-1. The first set of switches 304a-f is coupled to a first (single) antenna 308a. Each of the first set of switches 304a-f is separately coupled to one of the first set of ports 306a-f. Additionally, the second set of switches 304g-1 is coupled to a second (single) antenna 308b. Each of the second set of switches 304g-1 is separately coupled to one of the second set of ports 306g-1. In this example, each of the ports 306a-1 is separately and respectively coupled to each of the phase shifters 312a-1.

The switchplexer 302 may include controlling circuitry 310 that is coupled to the first set of switches 304a-f and to the second set of switches 304g-1. Based on a control signal 316, the controlling circuitry 310 may control the switches 304a-1 by generating switch signals 314a-1. For example, the controlling circuitry 310 may close one or more of the switches 304a-1. When indicated by the control signal 316, the controlling circuitry 310 may close two or more of the first set of switches 304a-f and may close two or more of the second set of switches 304g-1.

The switchplexer 302 illustrated in FIG. 3 may be included within an RF front end of a communication device. The switchplexer 302 may enable MIMO signal transmission and reception. In general, multiple sets of two or more switches and ports may be implemented in a switchplexer in accordance with the systems and methods disclosed herein.

Figure 4:
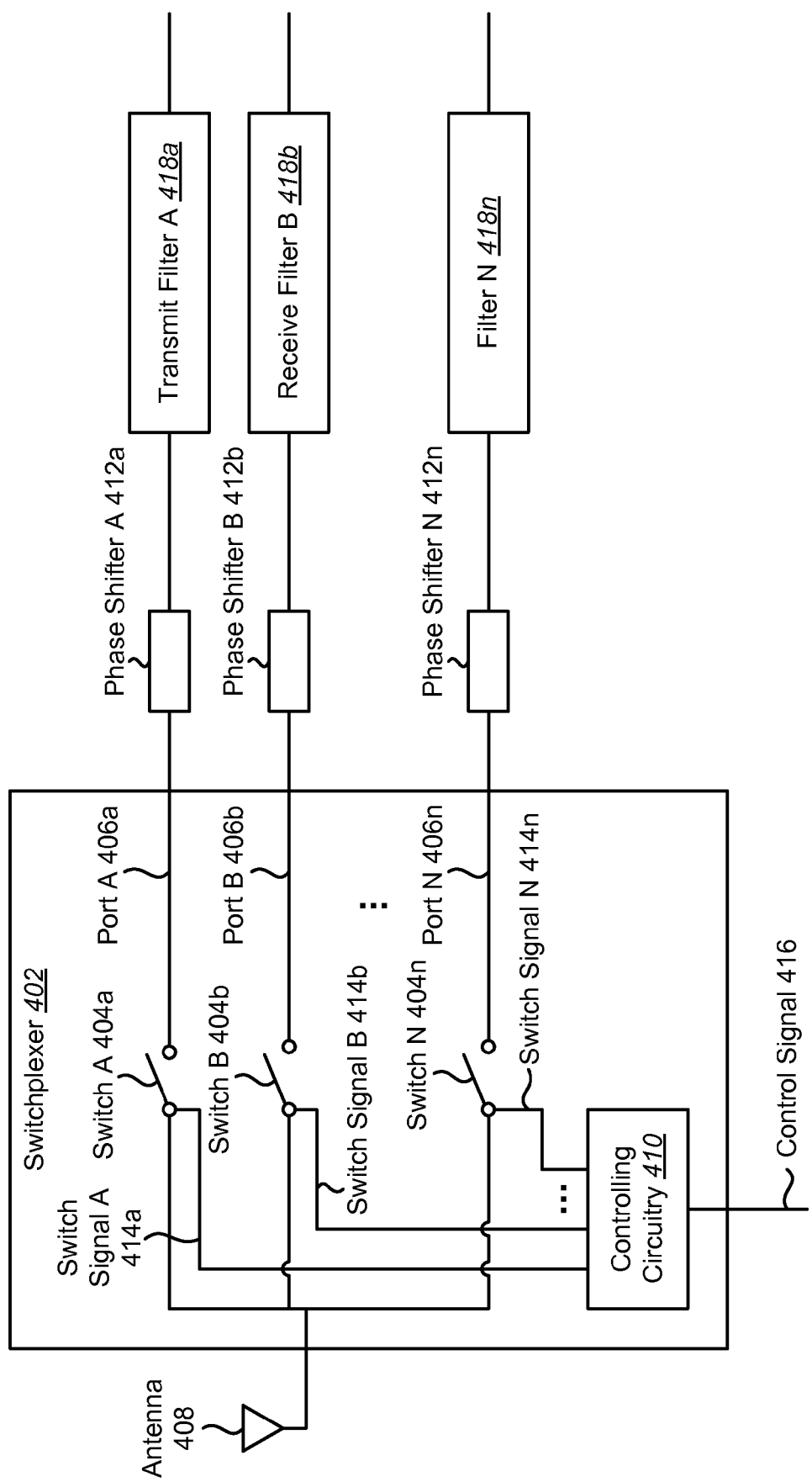
FIG. 4 is a block diagram illustrating one configuration of a switchplexer and filters in accordance with the systems and methods disclosed herein.

FIG. 4 is a block diagram illustrating one configuration of a switchplexer 402 and filters 418a-n in accordance with the systems and methods disclosed herein. The switchplexer 402 may be configured similarly to the switchplexer 102 described in connection with FIG. 1 above. Additionally, the antenna 408, switches 404a-n, ports 406a-n, controlling circuitry 410, control signal 416, switch signals 414a-n and phase shifters 412a-n may be configured similarly to corresponding elements described in connection with FIG. 1 above. In some configurations, the phase shifters 412 and/or the filters 418 may be included in the switchplexer 402.

It should be noted that each of the ports 406a-n may be coupled to a transmitter (e.g., transmit chain) or a receiver (e.g., receive chain). In some configurations, each transmitter or receiver may support communications in one or more bands and/or one or more modes corresponding to GSM, CDMA, WCDMA and/or LTE specifications.

The switchplexer 402 may be referred to as a "multi-pole switch" in some configurations. The switchplexer 402 may support single or concurrent operation (e.g., one or multiple of the switches 404a-n may be activated, closed or "turned on" at the same time).

In some configurations, the switchplexer 402 may support a single antenna 408 or multiple antennas 408. For example, the switchplexer 402 may include one or more sets of switches 404, where each set of switches 404 is coupled to a separate antenna. In some configurations, each set of switches 404 may include two or more switches 404.

Each of the ports 406a-n in the switchplexer 402 may be coupled to a filter 418a-n. In some configurations, (one end of) each port 406a-n may be coupled to a single filter. In these configurations, the switchplexer 402 is not coupled to any duplexers. In other configurations, (one end of) one or more of the ports 406a-n may be coupled a duplexer (including multiple filters, for instance). According to some configurations, at least one port 406 (e.g., port A 406a) of the switchplexer 402 may be coupled to a transmit filter (e.g., transmit filter A 418a) and another port 406 (e.g., port B 406b) may be coupled to a receive filter (e.g., receive filter B 418b). One or more other filters 418 (e.g., transmit and/or receive filters) may be coupled to the port(s) 406. Examples of filters described herein include band-pass filters, high-pass filters, low-pass filters, etc.

In known approaches, an antenna may be linked to a duplexer to enable concurrent signal transmission and reception. A duplexer may include two filters (e.g., a transmit filter and a receive filter) connected to each other at one end (e.g., directly connected or connected through phase shifters). Thus, a duplexer enables concurrent transmission and reception signals (in different bands, for example) to coexist on an antenna (at the connected end). Thus, one branch of a duplexer may include a transmit filter (and is coupled to a transmitter or transmit chain, for instance) while the other branch may include a receive filter (and is coupled to a receiver or receive chain, for instance).

Some configurations of the systems and methods disclosed herein, however, may employ at least one pair of filters, including a transmit (Tx) filter and a receive (Rx) filter, where each of the pair of filters is independently linkable to an antenna. This is different from a duplexer, where both filters are not independently linkable (e.g., only both filters or neither filter can be linked to an antenna at a time). As illustrated in FIG. 4, transmit filter A 418a may be linked (e.g., switched) to the antenna 408 (via port A 406a) independently from receive filter B 418b (via port B 406b). Accordingly, both transmit filter A 418a and receive filter B 418b, one of transmit filter A 418a and receive filter B 418b or neither may be linked to the antenna 408 at a time. For example, the controlling circuitry 410 may close one of switch A 404a and switch B 404b, close both switch A 404a and switch B 404b or close neither based on the control signal 416. In some configurations, a pair of independently linkable filters 418 may filter transmit and receive frequencies assigned to a band specified by a standard (e.g., UMTS, CDMA, WCDMA, GSM, LTE, etc.). For example, transmit filter A 418a may pass signals in the uplink frequencies specified in Band 1 as illustrated in Table (1), while receive filter B 418b may pass signals in the downlink frequencies specified in Band 1.

Accordingly, separate transmit and receive filters 418 (that may be independently linked to an antenna) may be used instead of duplexers (e.g., duplexers may be replaced with separate transmit and receive filters 418). The transmit and receive filters 418 may be applicable to (e.g., implemented in) front-end RF circuitry.

In some configurations, one or more ports 406 (on receive paths) and/or one or more receive filters 418 may support multiple modes of operation. This may allow sharing of filters between operating modes. For example, a single receive filter could be used to support both GSM and WCDMA communications, rather than using separate filters (in multiple duplexers) for each operating mode. This may allow fewer filters to be used, thus decreasing chip area and improving receiver sensitivity. For example, port B 406b that is coupled to receive filter B 418b may support multiple signal types (e.g., LTE, WCDMA and GSM) and/or multiple bands. A port that supports multiple signal types and/or multiple bands may be referred to as a multiple mode port. A receive filter that supports multiple signal types (e.g., LTE, CDMA, WCDMA, GSM, etc.) and/or multiple bands may be referred to as a multiple mode receive filter. Additionally or alternatively, a port or receive filter that is coupled to a receiver that is capable of receiving multiple signal types and/or multiple bands may be respectively referred to as a multiple mode port or a multiple mode receive filter.

For instance, port B 406b may be a multiple mode port and receive filter B 418b may be a multiple mode filter. In one example, port B 406b and receive filter B 418b may support both GSM 1800 Rx and Band 3 Rx. In another example, port B 406b and receive filter B 418b may support both Band 1 Rx and Band 4 Rx. Accordingly, switch B 404b may be closed when the antenna 408 is receiving a Band 1 signal or when receiving a Band 4 signal. Thus, one receiver (e.g., receive chain) can be shared to receive signals in Band 1 and Band 4 (instead of two receivers, where one is coupled to a duplexer for Band 1 and the other is coupled to a duplexer for Band 4, for instance).

This approach (e.g., using independently linkable transmit filters 418 and receive filters 418) may offer performance, cost and size benefits. For example, a single receiver may be shared between GSM 1800 Rx and Band 3 (in WCDMA/CDMA, for example) for better sensitivity. Additionally or alternatively, a single receiver may be enabled to be shared between GSM 1900 Rx and Band 2 (in WCDMA/CDMA, for example) for better sensitivity. Additionally or alternatively, a single receiver may be enabled to be shared between Band 1 and Band 4. Additionally or alternatively, a single transmitter may be enabled to be shared between Band 3 and Band 4.

In a known approach, however, each individual communication band requires a surface acoustic wave (SAW) filter or duplexer. Using this approach, it is not possible to share Band 1 Rx with Band 4 Rx, for example. Furthermore, duplexer sharing between GSM 1800 with Band 3 Rx may result in GSM sensitivity degradation, for instance.

Figure 5:
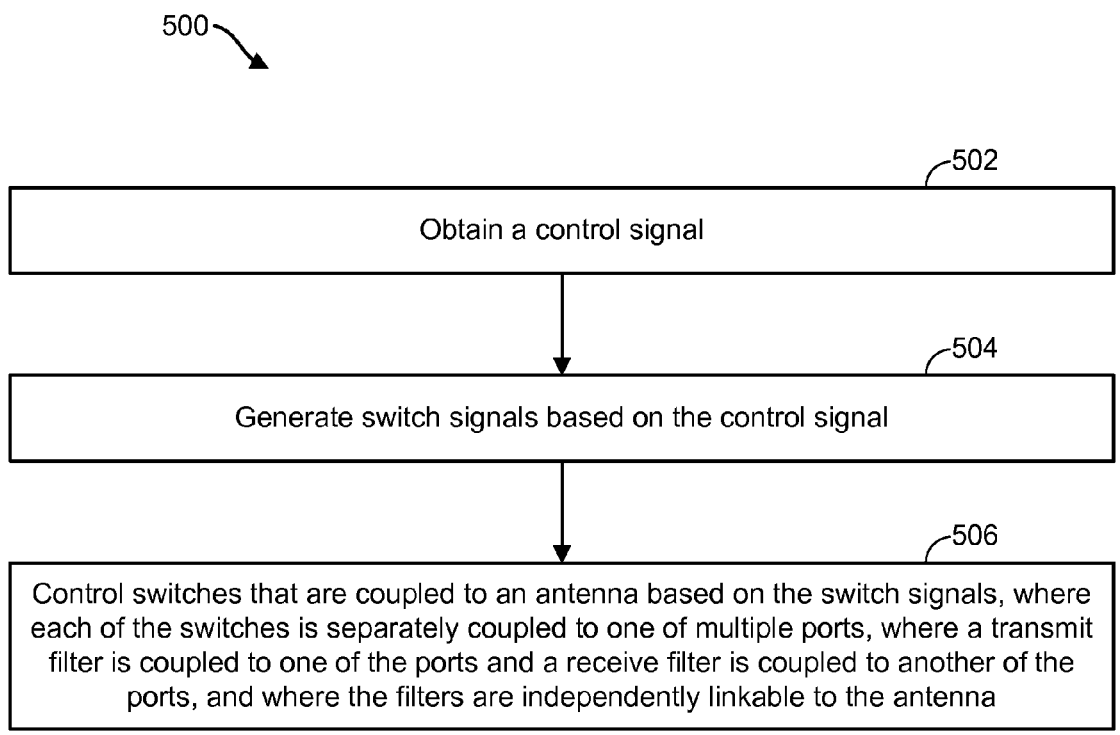
FIG. 5 is a flow diagram illustrating one configuration of a method for switching an antenna with independently linkable filters.

FIG. 5 is a flow diagram illustrating one configuration of a method 500 for switching an antenna 408 with independently linkable filters. A switchplexer 402 may obtain 502 a control signal 416. For example, the controlling circuitry 410 may receive the control signal 416 via a single or multi-wire interface. In some configurations, the control signal 416 may be provided by a processor (e.g., baseband processor) or some other circuitry.

The switchplexer 402 may generate 504 switch signals 414 based on the control signal 416. This may be done similarly to generating 204 switch signals 114 as described above in connection with FIG. 2.

The switchplexer 402 may control 506 switches 404 that are coupled to the antenna 408 based on the switch signals 414. Each of the switches 404 may be separately coupled to one of the multiple ports 406. A transmit filter (e.g., transmit filter A 418a) may be coupled to one of the ports 406 (e.g., port A 406a) and a receive filter (e.g., receive filter B 418b) may be coupled to another of the ports 406 (e.g., port B 406b). The filters (e.g., transmit filter A 418a and receive filter B 418b) may be independently linkable to the antenna 408.

Furthermore, the switch signals 414 may concurrently close at least two of the switches 404 when indicated by the control signal 416. For example, the control signal 416 may indicate that one or more switches 404 should be closed. When the control signal 416 indicates that two or more of the switches 404 should be closed, the switchplexer 402 (e.g., controlling circuitry 410) may cause the corresponding two or more switches 404 to close (by providing two or more switch signals 414 that cause two or more switches 404 to close, for example). For instance, switch A 404a and switch B 404b may be concurrently closed, thereby allowing bi-directional signaling without the use of a duplexer.

In some cases, controlling 506 the switches 404 may include closing a switch (e.g., switch B 404b) in order to link a multiple mode port and/or multiple mode receive filter (e.g., receive filter B 418b) to the antenna 408 for multiple modes. For example, the switchplexer 402 may link a multiple mode port and/or multiple mode receive filter (e.g., receive filter B 418b) to the antenna 408 for signals corresponding to multiple signal types and/or bands. In one configuration, for instance, the switchplexer 402 may link receive filter B 418b to the antenna 408 when signals are received corresponding to Band 1 or Band 4. In another configuration, for instance, the switchplexer 402 may link receive filter B 418b to the antenna 408 when signals are received corresponding to GSM 1800 or Band 3.

Figure 6:
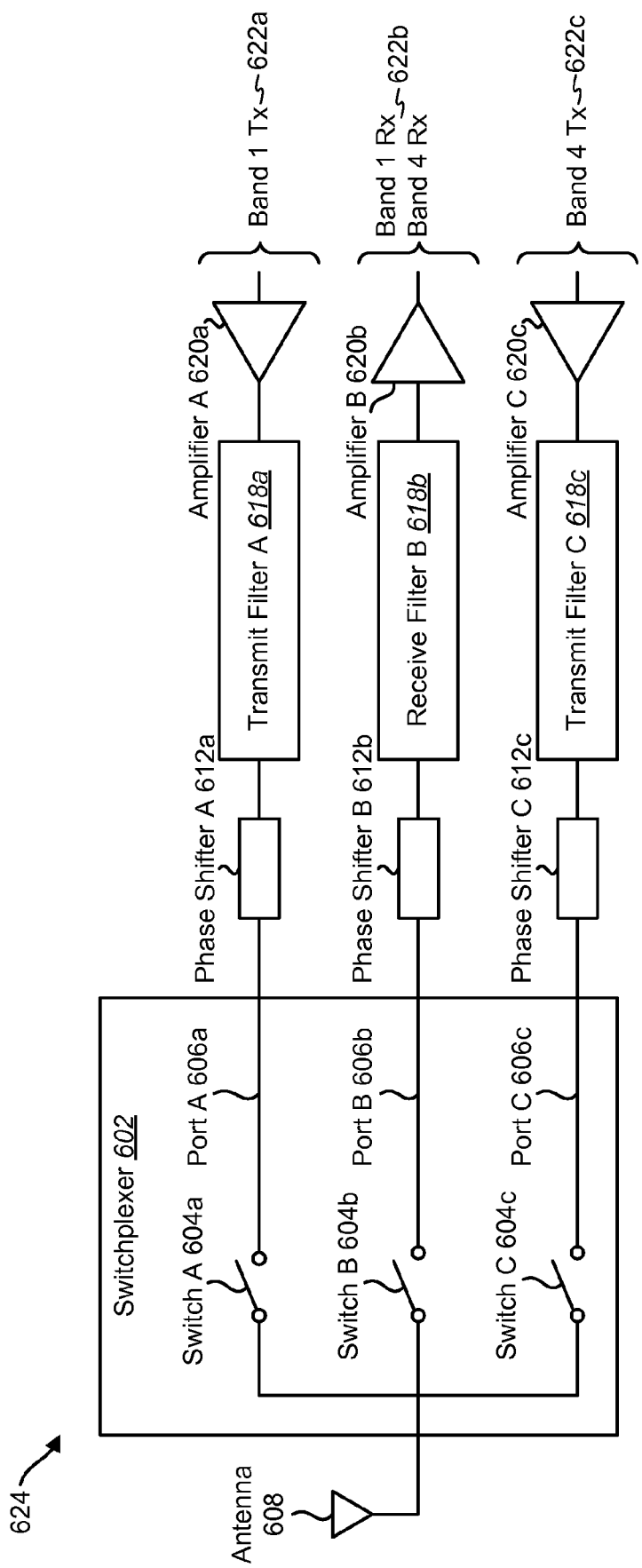
FIG. 6 is a block diagram illustrating one example of a radio frequency (RF) front end in accordance with the systems and methods disclosed herein.

FIG. 6 is a block diagram illustrating one example of a radio frequency (RF) front end 624 in accordance with the systems and methods disclosed herein. In this example, an antenna 608 is coupled to a switchplexer 602. The switchplexer 602 may include switches 604a-c and ports 606a-c. Each of the ports 606a-c may be coupled to a phase shifter 612a-c. The switchplexer 602, switches 604, ports 606 and phase shifters 612 illustrated in FIG. 6 may be configured similarly to the switchplexer 102, switches 104, ports 106 and phase shifters 112 described above in connection with FIG. 1. The switchplexer 602 illustrated in FIG. 6 may include controlling circuitry that controls the switches (with switch signals) that is configured similarly to the controlling circuitry 110 described in connection with FIG. 1. The ports 606a-c may be respectively coupled to filters 618a-c. The filters 618a-c may be respectively coupled to amplifiers 620a-c.

In one example of a known approach, an antenna is switched between ports for a Band 1 duplexer and a Band 4 duplexer, where only one of the ports is linked to the antenna at a time. Each of the duplexers include a pair of phase shifters and a pair of filters. Each duplexer is coupled to a pair of amplifiers. Each duplexer is coupled to a transmitter (e.g., transmit chain) and a receiver (e.g., receive chain). Thus, two transmitters and two receivers may be used to support Band 1 and Band 4 communications in this approach.

In the example illustrated in FIG. 6, however, Band 1 and Band 4 may be supported with a single receiver. In this example, the antenna 608 may be coupled to three switches 604a-c (included in the switchplexer 602, for instance). Each of the switches 604a-c may be respectively coupled to three ports 606a-c. Port A 606a may support signals in Band 1 Tx 622a. Port A 606a may be coupled to transmit filter A 618a that is in turn coupled to amplifier A 620a (e.g., a power amplifier (PA)). Phase shifter A 612a may be optionally coupled between port A 606a and transmit filter A 618a. Port B 606b may be a multiple mode port and support signals in Band 1 Rx and Band 4 Rx 622b. Port B 606b may be coupled to receive filter B 618b that is in turn coupled to amplifier B 620b (e.g., a low noise amplifier (LNA)). Receive filter B 618b (e.g., a multiple mode filter) may support signals in both Band 1 Rx and Band 4 Rx 622b. Phase shifter B 612b may optionally be coupled between port B 606b and receive filter B 618b. Port C 606c may support signals in Band 4 Tx 622c. Port C 606c may be coupled to transmit filter C 618c that is in turn coupled to amplifier C 620c (e.g., a power amplifier (PA)). Phase shifter C 612c may be optionally coupled between port C 606c and transmit filter C 618c. In some configurations, the phase shifters 612 may be included in the switchplexer 602. In yet other configurations, the phase shifters 612 and the filters 618 may be included in the switchplexer 602.

Table (2) illustrates two modes of operation. In particular, Table (2) illustrates which switches 604 may be closed ("ON") or open ("OFF") based on the mode. In some configurations, the switchplexer 602 may be controlled based on a control signal that reflects or indicates the mode. For example, controlling circuitry included in the switchplexer 602 may control the switches 604 based on the control signal. As illustrated, switch A 604a and switch B 604b may be closed or "ON" when Band 1 signals are transmitted and/or received. Furthermore, switch B 604b and switch C 604c may be closed or "ON" when Band 4 signals are transmitted and/or received.

TABLE (2)

| Switch A | Switch B | Switch C | Mode |
| --- | --- | --- | --- |
| ON | ON | OFF | Band 1 (UMTS) |
| OFF | ON | ON | Band 4 (UMTS) |

The switchplexer 602 given in this example (in accordance with the systems and methods disclosed herein) allows one or multiple switches 604 to be concurrently closed (e.g., activated or turned "on"). In comparison with the example of the known approach, this example saves a receive filter and a Band 4 filter (e.g., SAW filter) and a receiver, since receive filter B 618b is shared between Band 1 and Band 4. Furthermore, no duplexers are employed in this example.

Figure 7:
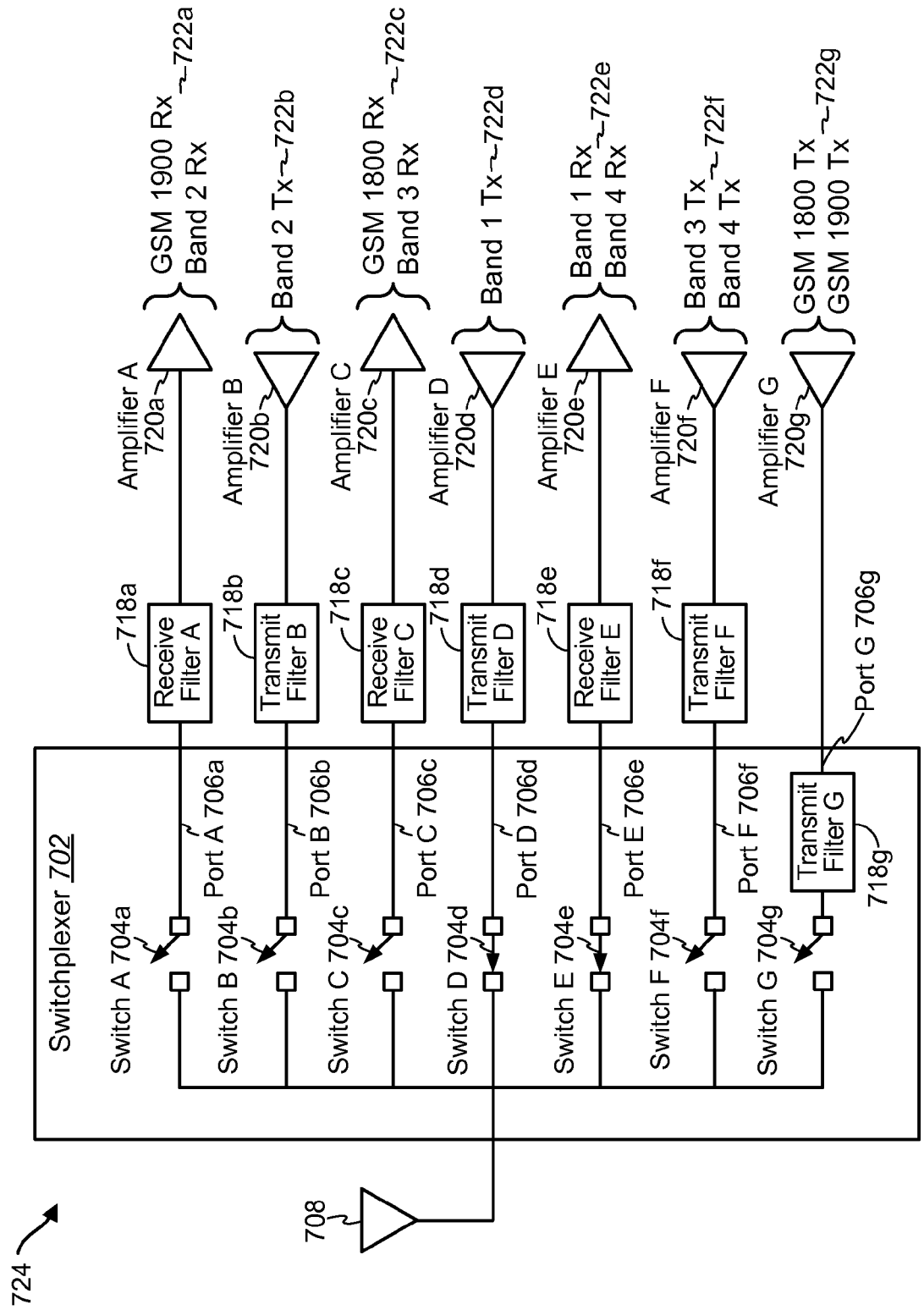
FIG. 7 is a block diagram illustrating another example of a radio frequency (RF) front end in accordance with the systems and methods disclosed herein.

FIG. 7 is a block diagram illustrating another example of a radio frequency (RF) front end 724 in accordance with the systems and methods disclosed herein. In this example, an antenna 708 is coupled to a switchplexer 702. The switchplexer 702 may include switches 704a-g and ports 706a-g. One or more of the ports 706a-g may be optionally and respectively coupled to one or more phase shifters (not shown). The switchplexer 702, switches 704 and ports 706 illustrated in FIG. 7 may be configured similarly to the switchplexer 102, switches 104 and ports 106 described above in connection with FIG. 1. The switchplexer 702 illustrated in FIG. 7 may include controlling circuitry that controls the switches (with switch signals) that is configured similarly to the controlling circuitry 110 described in connection with FIG. 1. The ports 706a-g may be respectively coupled to filters 718a-g. The filters 718a-g may be respectively coupled to amplifiers 720a-g.

In another example of a known approach, an antenna is switched between ports for signals in GSM 1900 Rx/Band 2, GSM 1800 Rx/Band 3, Band 2 Rx/Tx, Band 3 Rx/Tx, Band 1 Rx/Tx, Band 4 Rx/Tx and GSM 1800/1900 Tx, where only one of the ports is linked to the antenna at a time. The ports for GSM 1900 Rx/Band 2 and GSM 1800 Rx/Band 3 signals are each connected to filters that are connected to amplifiers. The port for signals in GSM 1800/1900 Tx is connected to a high-pass filter that is connected to an amplifier. The ports for signals in Band 2 Rx/Tx, Band 3 Rx/Tx, Band 1 Rx/Tx and Band 4 Rx/Tx are each coupled to a pair of filters (e.g., duplexer) that are each connected to amplifiers. Thus, this known approach uses a single-pole switch, eleven filters, six receive amplifiers (which may be coupled to six receivers) and five transmit amplifiers (which may be coupled to five transmitters).

In the example illustrated in FIG. 7, however, multiple bands and multiple modes may be supported by the RF front end 724. For instance, Bands 1-4, GSM 1800 and GSM 1900 may be supported. In this example, an antenna 708 may be coupled to seven switches 704a-g (included in a switchplexer 702, for instance). Each of the switches 704a-g may be respectively coupled to seven ports 706a-g. Port A 706a may support signals in GSM 1900 Rx and Band 2 Rx 722a. Port A 706a (e.g., a multiple mode port) may be coupled to a receive filter A 718a (e.g., a multiple mode filter) that is in turn coupled to amplifier A 720a. Port B 706b may support signals in Band 2 Tx 722b. Port B 706b may be coupled to transmit filter B 718b that is in turn coupled to amplifier B 720b. Port C 706c may support signals in GSM 1800 Rx and Band 3 Rx 722c. Port C 706c may be coupled to receive filter C 718c (e.g., multiple mode receive filter) that is in turn coupled to amplifier C 720c.

Port D 706d may support signals in Band 1 Tx 722d. Port D 706d may be coupled to transmit filter D 718d that is in turn coupled to amplifier D 720d. Port E 706e may support signals in Band 1 Rx and Band 4 Rx 722e. Port E 706e may be coupled to receive filter E 718e (e.g., a multiple mode receive filter) that is in turn coupled to amplifier E 720e. Port F 706f may support signals in Band 3 Tx and Band 4 Tx 722f. Port F 706f may be coupled to transmit filter F 718f that is in turn coupled to amplifier F 720f. Port G 706g may support signals in GSM 1800 Tx and GSM 1900 Tx 722g. Port G 706g may be coupled to transmit filter G 718g (e.g., a high-pass filter) that is in turn coupled to amplifier G 720g. In this example, one or more phase shifters may be optionally coupled between respective switches 704a-g and filters 718a-g. In some configurations, one or more phase shifters may be implemented as part of the switchplexer 702. Additionally or alternatively, one or more phase shifters may be implemented as part of one or more filters.

The switchplexer 702 given in this example (in accordance with the systems and methods disclosed herein) allows one or multiple switches 704 to be concurrently closed (e.g., activated or turned "on"). In comparison with the foregoing example of the known approach, this example saves three receivers and one transmitter (e.g., a Band 3 power amplifier (PA)). Furthermore, this saves four duplexers or filters, since no duplexers are needed in this example in accordance with the systems and methods disclosed herein.

In an alternative configuration in accordance with the systems and methods disclosed herein, a port for Band 3 Tx and GSM 1800 Tx (coupled to a filter and amplifier) could be implemented. Furthermore, a port for Band 2 Tx and GSM 1900 Tx (coupled to a filter and amplifier) could be implemented.

As illustrated by the examples, the systems and methods disclosed herein may reduce size, cost and area without sacrificing performance (for WCDMA/GSM Rx, for example). As described above, a design that uses four duplexers and two filters may be reduced to six filters. Furthermore, a Band 3 power amplifier (PA) may be saved using the systems and methods disclosed herein.

Figure 8:
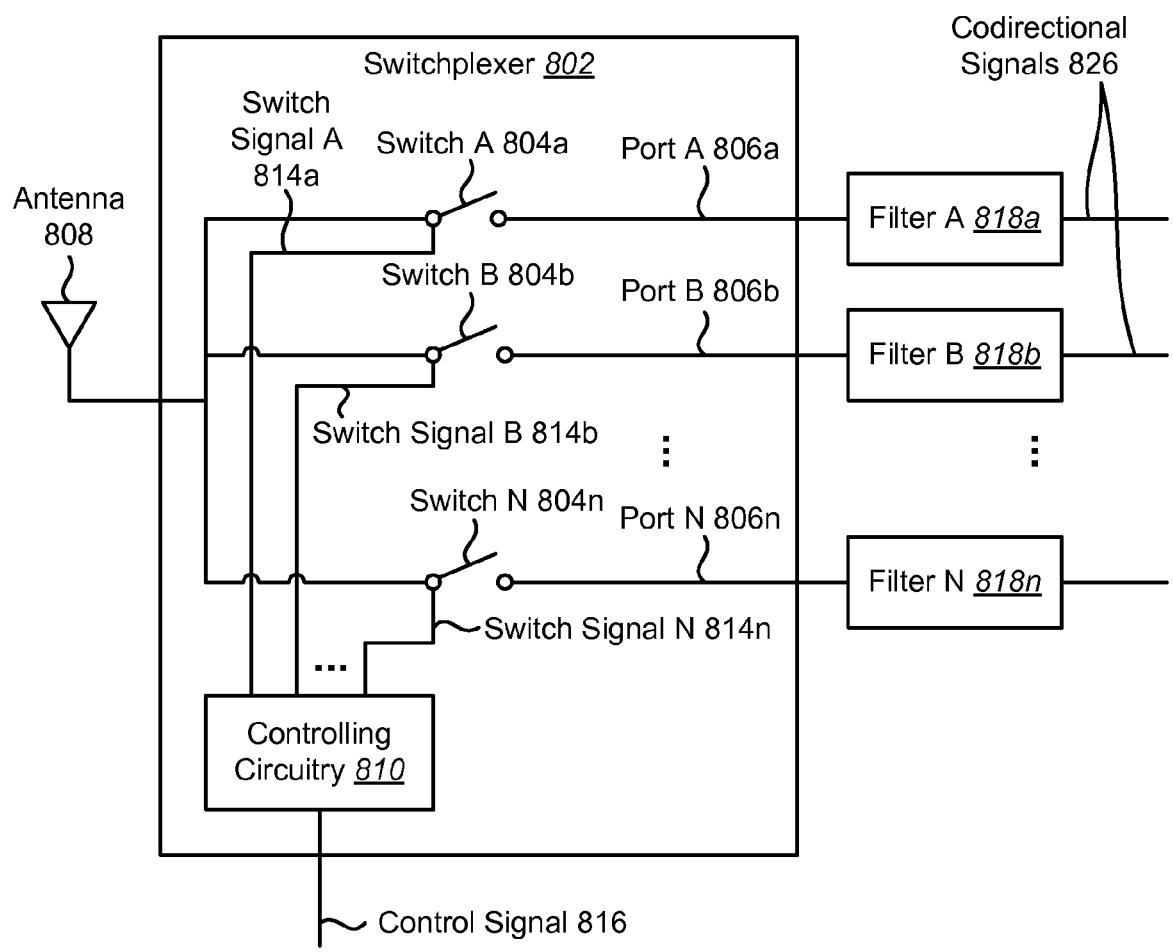
FIG. 8 is a block diagram illustrating another configuration of a switchplexer and filters in accordance with the systems and methods disclosed herein.

FIG. 8 is a block diagram illustrating another configuration of a switchplexer 802 and filters 818a-n in accordance with the systems and methods disclosed herein. The switchplexer 802 may be configured similarly to the switchplexer 102 described in connection with FIG. 1 above. Additionally, the antenna 808, switches 804a-n, ports 806a-n, controlling circuitry 810, control signal 816 and switch signals 814a-n may be configured similarly to corresponding elements described in connection with FIG. 1 above. One or more of the ports 806a-n may be optionally and respectively coupled to one or more phase shifters (not illustrated in FIG. 8). It should be noted that one or more phase shifters and/or one or more of the filters 818 may be included in the switchplexer 802 in some configurations.

The switchplexer 802 may support carrier aggregation, Multiple-Input and Multiple-Output (MIMO) operation and/or may be applied to a diversity receiver. For example, two or more of the switches 804a-n may be concurrently closed in order to link two or more of the ports 806a-n to the antenna 808 that support codirectional signals 826, allowing communications in multiple bands in the same direction to occur concurrently. For instance, two or more receive signals in different bands (e.g., on different carrier frequencies) may be received at a time, thereby enabling carrier aggregation. Additionally or alternatively, two or more transmit signals in different bands (e.g., on different carrier frequencies) may be transmitted at a time, thereby enabling dual transmission. According to known approaches, however, only one port may be linked (to a single antenna, for example) at a time, thus requiring a diplexer to allow codirectional signals on the same port.

The switchplexer 802 may be referred to as a "multi-pole switch" in some configurations. The switchplexer 802 may support single or concurrent operation (e.g., one or multiple of the switches 804a-n may be activated, closed or "turned on" at the same time).

In some configurations, the switchplexer 802 may support a single antenna 808 or multiple antennas 808. For example, the switchplexer 802 may include one or more sets of switches 804, where each set of switches 804 is coupled to a separate antenna. In some configurations, each set of switches 804 may include two or more switches 804.

Each of the ports 806a-n in the switchplexer 802 may be coupled to a filter 818a-n. In some configurations, (one end of) each port 806a-n may be coupled to a single filter. In these configurations, the switchplexer 802 is not coupled to any diplexers. In other configurations, (one end of) one or more of the ports 806*a-n* may be coupled a duplexer and/or diplexer (including multiple filters, for instance). According to some configurations, at least two ports 806 (e.g., port A 806*a* and port B 806*b*) of the switchplexer 802 may support codirectional signals 826. In this case, the at least two ports are respectively coupled to two filters (e.g., filter A 818*a* and filter B 818*b*) that support codirectional signals 826 (for carrier aggregation or multiple (e.g., dual) transmission). In one configuration, filter A 818*a* and filter B 818*b* may both be receive filters (that are respectively coupled to two receivers, for example) that may concurrently support receive signals. For example, port A 806*a* and filter A 818*a* may support Band 1 reception and may be concurrently linked to the antenna 808 with port B 806*b* and filter B 818*b*, which may support Band 3 reception (for carrier aggregation). In another configuration, filter A 818*a* and filter B 818*b* may both be transmit filters (that are respectively coupled to two transmitters, for example) that may concurrently support transmit signals (for dual transmission, for instance). One or more other filters 818 (e.g., transmit and/or receive filters) may be coupled to the port(s) 806. Examples of filters described herein include band-pass filters, high-pass filters, low-pass filters, etc.

It should be noted that one or more of the filters 818*a-n* and/or one or more of the ports 806*a-n* may support multiple modes as described above in connection with FIG. 6. For example, port B 806*b* may be a multiple mode port and filter B 818*b* may be a multiple mode filter.

Accordingly, some aspects of the systems and methods disclosed herein may be applied for carrier aggregation. These aspects may also be applicable to front-end RF circuitry or devices. Carrier aggregation is a requirement in 3GPP Release 10. This requires the concurrent use of receivers in multiple bands for bandwidth aggregation. One approach for carrier aggregation involves connecting duplexers using a diplexer. However, this introduces loss in any bands that need to be concurrently signaled (e.g., received and/or transmitted). The systems and methods disclosed herein may offer performance, cost and size benefits, however. For example, the systems and methods disclosed herein may not require a diplexer. Furthermore, single band performance may be improved. For example, only a required band may be enabled, thereby providing lower (e.g., reduced) loss. Concurrent performance may also be improved. For instance, only required receive bands may be enabled, thereby providing lower (e.g., reduced) loss. The systems and methods disclosed herein may also save transmit and/or receive filters, may support dual transmission and may be applicable to a diversity receiver for concurrent carrier aggregation.

Figure 9:
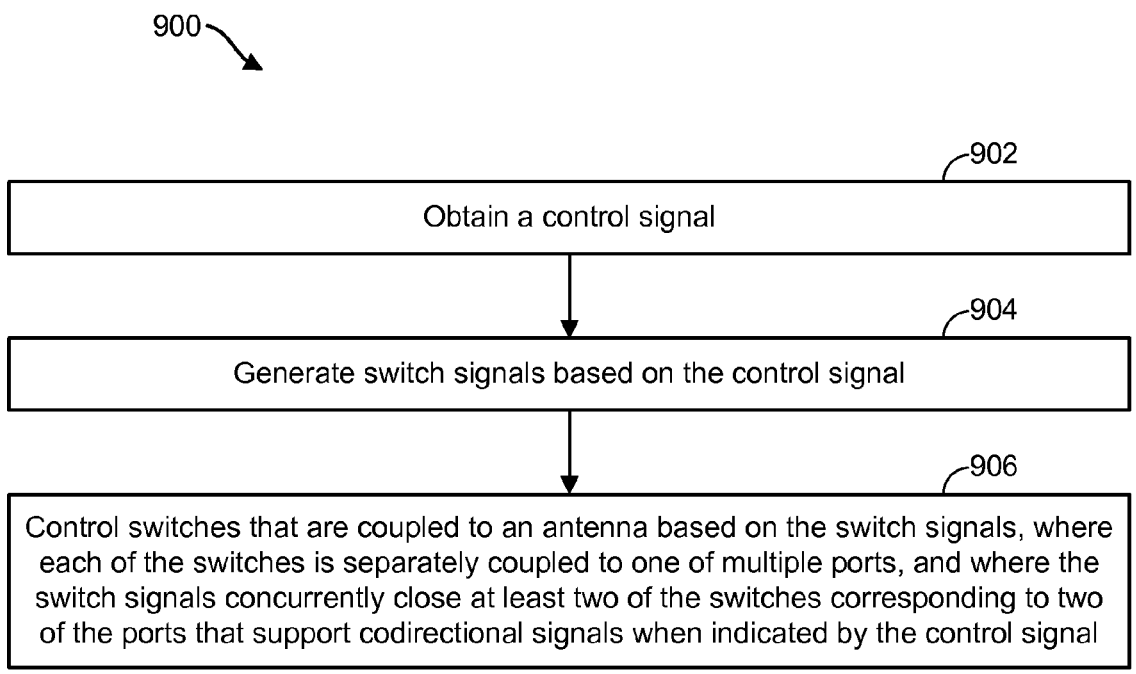
FIG. 9 is a flow diagram illustrating one configuration of a method for switching an antenna with codirectional signals.

FIG. 9 is a flow diagram illustrating one configuration of a method 900 for switching an antenna 808 with codirectional signals 826. A switchplexer 802 may obtain 902 a control signal 816. For example, the controlling circuitry 810 may receive the control signal 816 via a single or multi-wire interface. In some configurations, the control signal 816 may be provided by a processor (e.g., baseband processor) or some other circuitry.

The switchplexer 802 may generate 904 switch signals 814 based on the control signal 816. This may be done similarly to generating 204 switch signals 114 as described above in connection with FIG. 2.

The switchplexer 802 may control 906 switches 804 that are coupled to the antenna 808 based on the switch signals 814. Each of the switches 804 may be separately coupled to one of the multiple ports 806. The switch signals 814 may concurrently close at least two of the switches 804 that are coupled to ports 806 that support codirectional signals when indicated by the control signal 816. For example, when indicated by the control signal 816, the switchplexer 802 may concurrently close switch A 804*a* that is coupled to port A 806*a* and switch B 804*b* that is coupled to port B 806*b* that support codirectional signals (e.g., receive signals or transmit signals). This may enable carrier aggregation or dual transmission, for instance.

Thus, the switch signals 814 may concurrently close at least two of the switches 804 when indicated by the control signal 816. For example, the control signal 816 may indicate that one or more switches 804 should be closed. When the control signal 816 indicates that two or more of the switches 804 should be closed, the switchplexer 802 (e.g., controlling circuitry 810) may cause the corresponding two or more switches 804 to close (by providing two or more switch signals 814 that cause two or more switches 804 to close, for example). For instance, switch A 804*a* and switch B 804*b* may be concurrently closed, thereby allowing codirectional signaling without the use of a diplexer.

In some configurations, controlling 906 the switches 804 may also include closing a switch (e.g., switch B 804*b*) in order to link a multiple mode port (e.g., port B 806*b*) and/or multiple mode receive filter (e.g., receive filter B 818*b*) to the antenna 808 for multiple modes. For example, the switchplexer 802 may link a multiple mode port and/or multiple mode receive filter (e.g., receive filter B 818*b*) to the antenna 808 for multiple signal types and/or bands.

Figure 10:
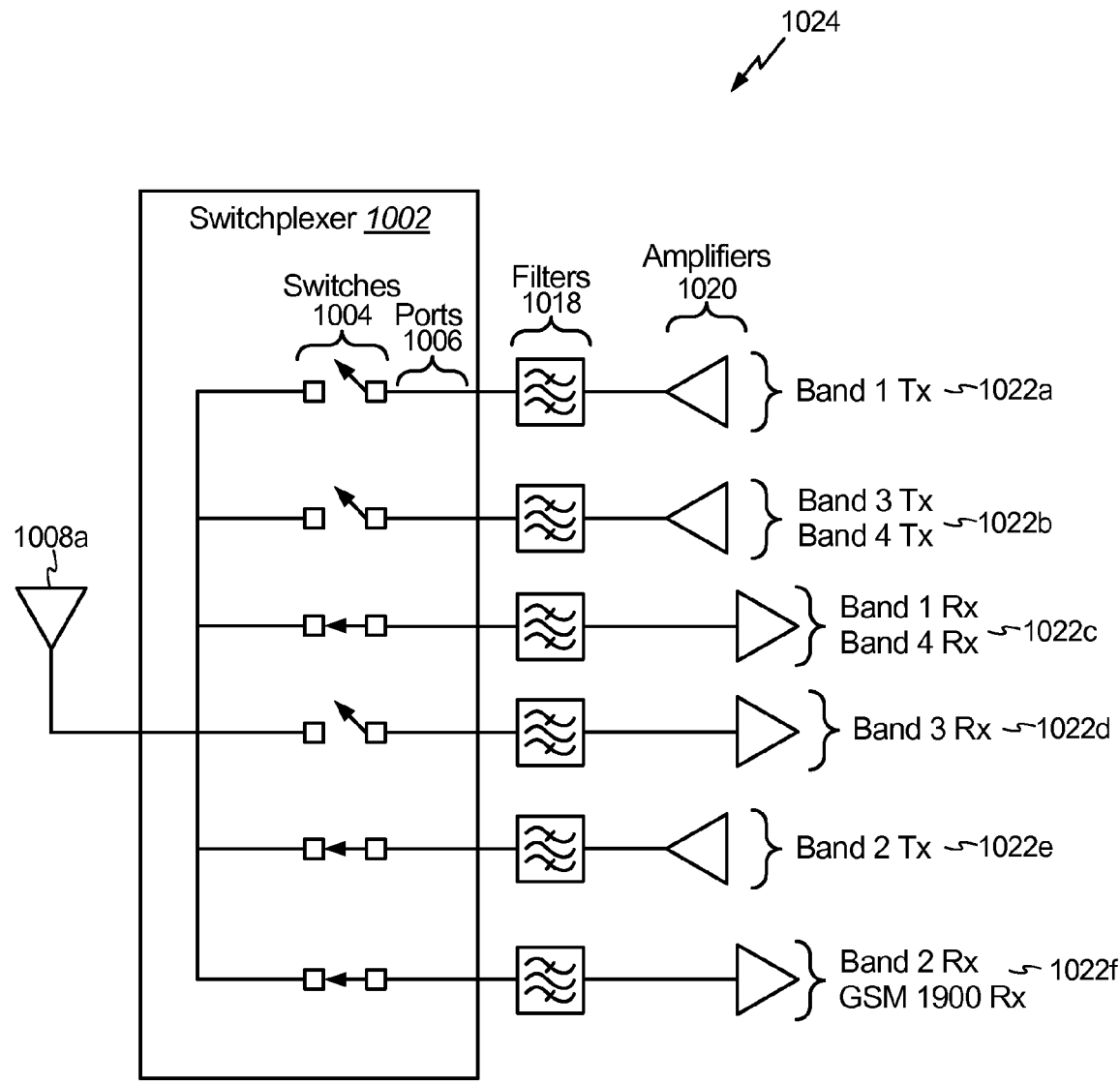
FIG. 10 is a block diagram illustrating another example of a radio frequency (RF) front end in accordance with the systems and methods disclosed herein.

FIG. 10 is a block diagram illustrating another example of a radio frequency (RF) front end 1024 in accordance with the systems and methods disclosed herein. In this example, an antenna 1008 is coupled to a switchplexer 1002. The switchplexer 1002 may include switches 1004 and ports 1006. One or more of the ports 1006 may be optionally and respectively coupled to one or more phase shifters (not shown). The switchplexer 1002, switches 1004 and ports 1006 illustrated in FIG. 10 may be configured similarly to the switchplexer 102, switches 104 and ports 106 described above in connection with FIG. 1. The switchplexer 1002 illustrated in FIG. 10 may include controlling circuitry that controls the switches (with switch signals) that is configured similarly to the controlling circuitry 110 described in connection with FIG. 1. The ports 1006 may be respectively coupled to filters 1018. The filters 1018 may be respectively coupled to amplifiers 1020.

One example of a known approach for carrier aggregation (for carrier aggregation between Band 2 and Band 4 and between Band 1 and Band 3) is given as follows. This known approach requires a surface acoustic wave (SAW) filter or duplexer for each individual mode and/or band. In this example of a known approach, an antenna is switched between three ports. The first port is for signals in GSM 1900 Rx. The second port is for signals in Band 1 Rx/Tx and Band 3 Rx/Tx. The third port is for signals in Band 2 Rx/Tx and Band 4 Rx/Tx, where only one of the ports is linked to the antenna at a time. The first port for GSM 1900 Rx is connected to a filter that is connected to an amplifier. The second port for signals in Band 1 Rx/Tx and Band 3 Rx/Tx is connected to a diplexer, where one branch of the diplexer is connected to a pair of filters (e.g., duplexer) and amplifiers for Band 1 Rx/Tx and the other branch of the diplexer is connected to another pair of filters (e.g., duplexer) and amplifiers for Band 3 Rx/Tx. The diplexer may cause a 1 decibel (dB) signal loss. The third port for signals in Band 2 Rx/Tx and Band 4 Rx/Tx is connected to a another diplexer, where one branch of the diplexer is connected to a pair of filters (e.g., duplexer) and amplifiers for Band 2 Rx/Tx and the other branch of the diplexer is connected to another pair of filters (e.g., duplexer) and amplifiers for Band 4 Rx/Tx. This diplexer may also cause a 1 decibel (dB) signal loss.

In the example of the systems and methods disclosed herein illustrated in FIG. 10, an antenna 1008 may be coupled to six switches 1004 (included in the switchplexer 1002, for instance). Each of the switches 1004 may be respectively coupled to six ports 1006. The first port 1006 may support signals in Band 1 Tx 1022a. The first port 1006 may be coupled to the first (transmit) filter 1018 that is in turn coupled to the first amplifier 1020. The second port 1006 may support signals in Band 3 Tx and Band 4 Tx 1022b. The second port 1006 may be coupled to a second (transmit) filter 1018 that is in turn coupled to the second amplifier 1020. It should be noted that one or more of the filters 1018 may support more than one band. The third port 1006 may support signals in Band 1 Rx and Band 4 Rx 1022c. The third port 1006 may be coupled to a third (receive) filter 1018 that is in turn coupled to the third amplifier 1020.

The fourth port 1006 may support signals in Band 3 Rx 1022d. The fourth port 1006 may be coupled to the fourth (receive) filter 1018 that is in turn coupled to the fourth amplifier 1020. The fifth port 1006 may support signals in Band 2 Tx 1022e. The fifth port 1006 may be coupled to the fifth (transmit) filter 1018 that is in turn coupled to the fifth amplifier 1020. The sixth port 1006 may support signals in Band 2 Rx and GSM 1900 Rx 1022f. The sixth port 1006 may be coupled to the sixth (receive) filter 1018 that is in turn coupled to the sixth amplifier 1020.

The switchplexer 1002 given in this example (in accordance with the systems and methods disclosed herein) allows one or multiple switches 1004 to be concurrently closed (e.g., activated or turned "on"). For instance, the third, fifth and sixth switches 1004 may be closed, thereby providing concurrent use of multiple receiver bands and one transmit band. In comparison with the foregoing example of the known approach, this example saves a receiver and a transmitter. Furthermore, this eliminates the two diplexers, which reduces signal loss.

Figure 11:
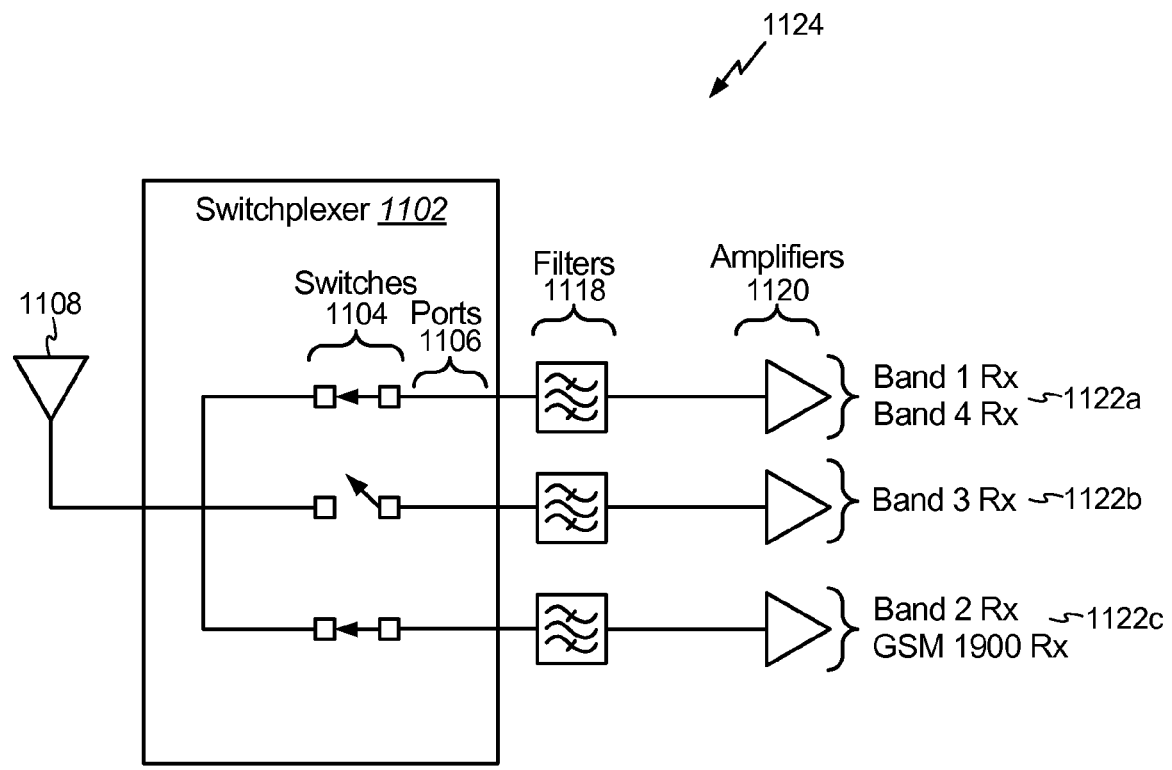
FIG. 11 is a block diagram illustrating another example of a radio frequency (RF) front end in accordance with the systems and methods disclosed herein.

FIG. 11 is a block diagram illustrating another example of a radio frequency (RF) front end 1124 in accordance with the systems and methods disclosed herein. In this example, an antenna 1108 is coupled to a switchplexer 1102. The switchplexer 1102 may include switches 1104 and ports 1106. One or more of the ports 1106 may be optionally and respectively coupled to one or more phase shifters (not shown). The switchplexer 1102, switches 1104 and ports 1106 illustrated in FIG. 11 may be configured similarly to the switchplexer 102, switches 104 and ports 106 described above in connection with FIG. 1. The switchplexer 1102 illustrated in FIG. 11 may include controlling circuitry that controls the switches (with switch signals) that is configured similarly to the controlling circuitry 110 described in connection with FIG. 1. The ports 1106 may be respectively coupled to filters 1118. The filters 1118 may be respectively coupled to amplifiers 1120.

Another example of a known approach for carrier aggregation (for carrier aggregation between Band 2 and Band 4 and between Band 1 and Band 3) is given as follows. This known approach may be applied to a diversity receiver. In this known approach, an antenna is switched between two ports. The first port is for signals in Band 1 Rx and Band 3 Rx. The second port is for signals in Band 2 Rx and Band 4 Rx. Only one of the ports is linked to the antenna at a time. The first port for signals in Band 1 Rx and Band 3 Rx is connected to a diplexer. One branch of the diplexer is connected to a filter that is connected to an amplifier for Band 1 Rx signals, while the other branch of the diplexer is connected to a filter that is connected to an amplifier for Band 3 Rx signals. The second port for signals in Band 2 Rx and Band 4 Rx is connected to another diplexer. One branch of this diplexer is connected to a filter that is connected to an amplifier for Band 2 Rx signals, while the other branch of the diplexer is connected to a filter that is connected to an amplifier for Band 4 Rx signals.

In the example of the systems and methods disclosed herein illustrated in FIG. 11, an antenna 1108 may be coupled to three switches 1104 (included in a switchplexer 1102, for instance). Each of the switches 1104 may be respectively coupled to three ports 1106. The first port 1106 may support signals in Band 1 Rx and Band 4 Rx 1122a. The first port 1106 may be coupled to a first (receive) filter 1118 that is in turn coupled to the first amplifier 1120. The second port 1106 may support signals in Band 3 Rx 1122b. The second port 1106 may be coupled to the second (receive) filter 1118 that is in turn coupled to the second amplifier 1120. The third port 1106 may support signals in Band 2 Rx and GSM 1900 Rx 1122c. The third port 1106 may be coupled to a third (receive) filter 1118 that is in turn coupled to the third amplifier 1120.

The switchplexer 1102 given in this example (in accordance with the systems and methods disclosed herein) allows one or multiple switches 1104 to be concurrently closed (e.g., activated or turned "on"). For instance, the switches 1104 coupled to the first and third ports 1106 may be closed, thereby providing concurrent use of multiple receiver bands. In comparison with the foregoing example of the known approach, this example saves a receiver. Furthermore, this eliminates the two diplexers, which reduces signal loss. The example illustrated in FIG. 11 may be applied to a diversity receiver and may support Band 2 and Band 4 carrier aggregation and/or Band 1 and Band 3 carrier aggregation.

Figure 12:
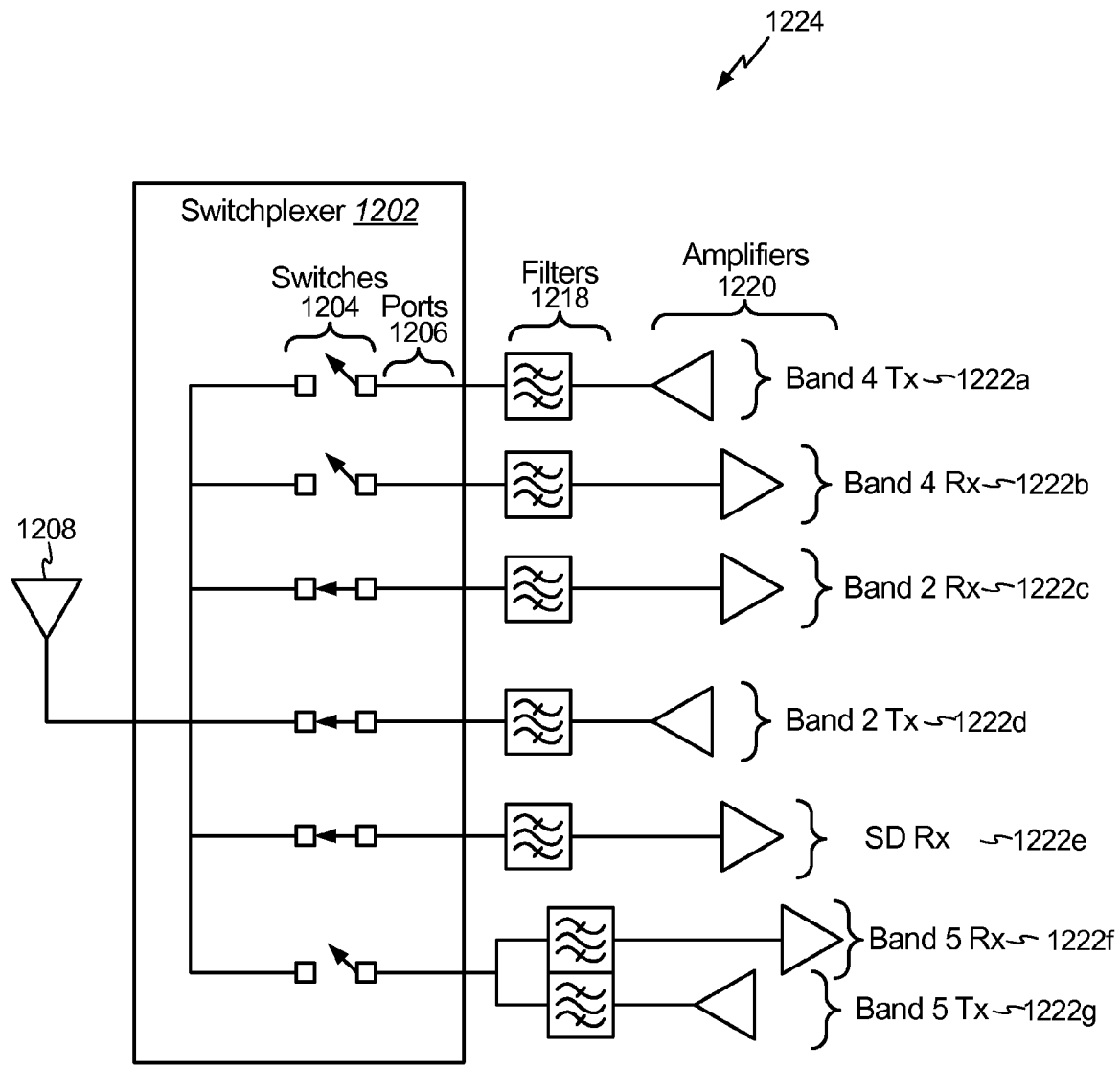
FIG. 12 is a block diagram illustrating another example of a radio frequency (RF) front end in accordance with the systems and methods disclosed herein.

FIG. 12 is a block diagram illustrating another example of a radio frequency (RF) front end 1224 in accordance with the systems and methods disclosed herein. In this example, an antenna 1208 is coupled to a switchplexer 1202. The switchplexer 1202 may include switches 1204 and ports 1206. One or more of the ports 1206 may be optionally and respectively coupled to one or more phase shifters (not shown). The switchplexer 1202, switches 1204 and ports 1206 illustrated in FIG. 12 may be configured similarly to the switchplexer 102, switches 104 and ports 106 described above in connection with FIG. 1. The switchplexer 1202 illustrated in FIG. 12 may include controlling circuitry that controls the switches 1204 (with switch signals) that is configured similarly to the controlling circuitry 110 described in connection with FIG. 1. The ports 1206 may be respectively coupled to filters 1218. The filters 1218 may be respectively coupled to amplifiers 1220.

In this example, the systems and methods disclosed herein may allow Band 4 and supplemental downlink Rx carrier aggregation and Band 2 and supplemental downlink Rx carrier aggregation using the switchplexer 1202 (e.g., multi-pole switch). This may provide lower loss and save a diplexer. It should be noted that in this example (and/or in other configurations of the systems and methods disclosed herein) the switchplexer may be coupled to the antenna without a diplexer.

Another example of a known approach for carrier aggregation (for carrier aggregation between Band 4 and supplemental downlink Rx and between Band 2 and supplemental downlink Rx) is given as follows. In this known approach, an antenna is connected to a diplexer that includes a low-pass filter and a high-pass filter. The low-pass filter is connected to a first single-pole switch that switches between a first port and a second port. The first port is for signals in Band 2 Rx and Band 2 Tx. The second port is for signals in Band 4 Rx and Band 4 Tx. Only one of the first port and the second port is linked to the antenna (through the diplexer) at a time. The first port for signals in Band 2 Rx and Band 2 Tx is connected to a pair of filters (e.g., duplexer) that are connected to a pair of amplifiers. The second port for signals in Band 4 Rx and Band 4 Tx is connected to a pair of filters (e.g., duplexer) that are connected to a pair of amplifiers.

The high-pass filter (of the diplexer) is connected to a second single-pole switch that switches between a third port and a fourth port. The third port is for signals in supplemental downlink Rx. The fourth port is for signals in Band 5 Rx and Band 5 Tx. Only one of the third port and the fourth port is linked to the antenna (through the diplexer) at a time. The third port for signals in supplemental downlink Rx is connected to a filter that is connected to an amplifier. The fourth port for signals in Band 5 Rx and Band 5 Tx is connected to a pair of filters (e.g., duplexer) that are connected to a pair of amplifiers. This example of a known approach may be applied to a primary transmitter/receiver.

In the example of the systems and methods disclosed herein illustrated in FIG. 12, an antenna 1208 may be coupled to six switches 1204 (included in the switchplexer 1202, for instance). Each of the switches 1204 may be respectively coupled to six ports 1206. The first port 1206 may support signals in Band 4 Tx 1222a. The first port 1206 may be coupled the first (transmit) filter 1218 that is in turn coupled to the first amplifier 1220. The second port 1206 may support signals in Band 4 Rx 1222b. The second port 1206 may be coupled to the second (receive) filter 1218 that is in turn coupled to the second amplifier 1220. The third port 1206 may support signals in Band 2 Rx 1222c. The third port 1206 may be coupled to the third (receive) filter 1218 that is in turn coupled to the third amplifier 1220. The fourth port 1206 may support signals in Band 2 Tx 1222d. The fourth port 1206 may be coupled to the fourth (transmit) filter 1218 that is in turn coupled to the fourth amplifier 1220. The fifth port 1206 may support signals in supplemental downlink Rx 1222e. The fifth port 1206 may be coupled to the fifth (receive) filter 1218e that is in turn coupled to the fifth amplifier 1220. The sixth port 1206 may support signals in Band 5 Rx 1222f and Band 5 Tx 1222g. The sixth port 1206 may be coupled to a pair of filters (e.g., a receive filter and a transmit filter or a duplexer) that is respectively coupled to a pair of amplifiers 1220.

The switchplexer 1202 given in this example (in accordance with the systems and methods disclosed herein) allows one or multiple switches 1204 to be concurrently closed (e.g., activated or turned "on"). For instance, the switches 1204 coupled to the third, fourth and the fifth ports 1206 may be closed, thereby providing concurrent use of multiple bands (e.g., Band 2 Rx, Band 2 Tx and supplemental downlink Rx). In comparison with the foregoing example of the known approach, this example eliminates the diplexer and two duplexers.

Figure 13:
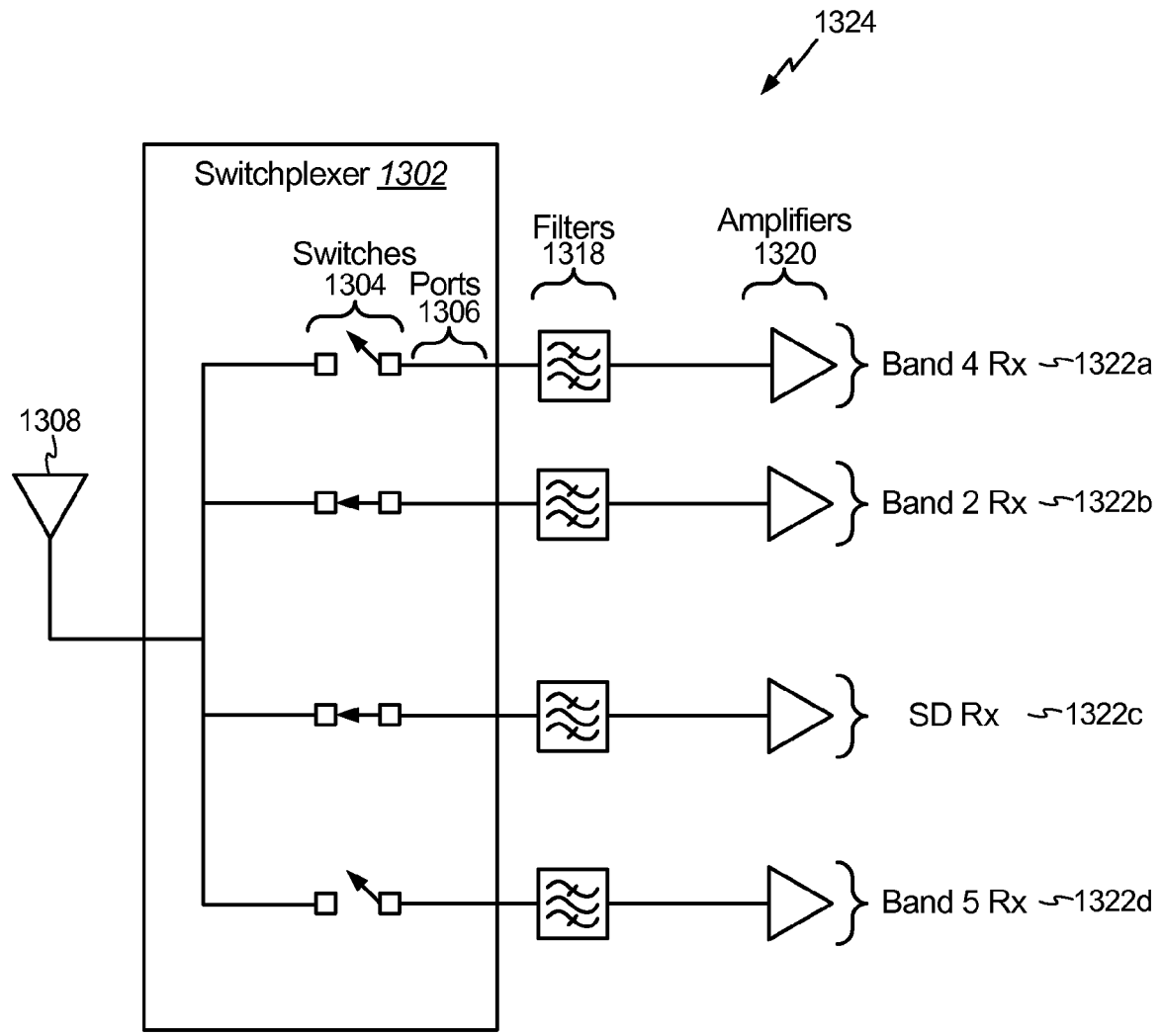
FIG. 13 is a block diagram illustrating another example of a radio frequency (RF) front end in accordance with the systems and methods disclosed herein.

FIG. 13 is a block diagram illustrating another example of a radio frequency (RF) front end 1324 in accordance with the systems and methods disclosed herein. In this example, an antenna 1308 is coupled to a switchplexer 1302. The switchplexer 1302 may include switches 1304 and ports 1306. One or more of the ports 1306 may be optionally and respectively coupled to one or more phase shifters (not shown). The switchplexer 1302, switches 1304 and ports 1306 illustrated in FIG. 13 may be configured similarly to the switchplexer 102, switches 104 and ports 106 described above in connection with FIG. 1. The switchplexer 1302 illustrated in FIG. 13 may include controlling circuitry that controls the switches (with switch signals) that is configured similarly to the controlling circuitry 110 described in connection with FIG. 1. The ports 1306 may be respectively coupled to filters 1318. The filters 1318 may be respectively coupled to amplifiers 1320.

Another example of a known approach for carrier aggregation (for carrier aggregation between Band 4 and supplemental downlink Rx and between Band 2 and supplemental downlink Rx) is given as follows. In this known approach, an antenna is connected to a diplexer that includes a low-pass filter and a high-pass filter. The low-pass filter is connected to a first single-pole switch that switches between a first port and a second port. The first port is for signals in Band 2 Rx. The second port is for signals in Band 4 Rx. Only one of the first port and the second port is linked to the antenna (through the diplexer) at a time. The first port for signals in Band 2 Rx is connected to a filter that is in turn connected to an amplifier. The second port for signals in Band 4 Rx is connected to a filter that is in turn connected to an amplifier.

The high-pass filter is connected to a second single-pole switch that switches between a third port and a fourth port. The third port is for signals in supplemental downlink Rx. The fourth port is for signals in Band 5 Rx. Only one of the third port and the fourth port is linked to the antenna (through the diplexer) at a time. The third port for signals in supplemental downlink Rx is connected to a filter that is connected to an amplifier. The fourth port for signals in Band 5 Rx is connected to a filter that is connected to an amplifier. This example of a known approach may be applied to a diversity receiver.

In the example of the systems and methods disclosed herein illustrated in FIG. 13, an antenna 1308 may be coupled to four switches 1304 (included in the switchplexer 1302, for instance). Each of the switches 1304 may be respectively coupled to four ports 1306. The first port 1306 may support signals in Band 4 Rx 1322a. The first port 1306 may be coupled to the first (receive) 1318 that is in turn coupled to the first amplifier 1320. The second port 1306 may support signals in Band 2 Rx 1322b. The second port 1306 may be coupled to the second (receive) filter 1318 that is in turn coupled to the second amplifier 1320. The third port 1306 may support signals in supplemental downlink Rx 1322c. The third port 1306 may be coupled to the third (receive) filter 1318 that is in turn coupled to the third amplifier 1320. The fourth port 1306 may support signals in Band 5 Rx 1322d. The fourth port 1306 may be coupled to the fourth (receive) filter 1318 that is in turn coupled to the fourth amplifier 1320.

The switchplexer 1302 given in this example (in accordance with the systems and methods disclosed herein) allows one or multiple switches 1304 to be concurrently closed (e.g., activated or turned "on"). For instance, the switches 1304 coupled to the second and the third ports 1306 may be closed, thereby providing concurrent use of multiple bands (e.g., Band 2 Rx and supplemental downlink Rx). In comparison with the foregoing example of the known approach, this example eliminates the diplexer.

FIGS. 14-31 illustrate various other examples that may be implemented in accordance with the systems and methods disclosed herein. One or more of the concepts, approaches, configurations, implementations, descriptions, etc., in accordance with the systems and methods disclosed above may be applicable to one or more of the examples illustrated in FIGS. 14-31.

Figure 14:
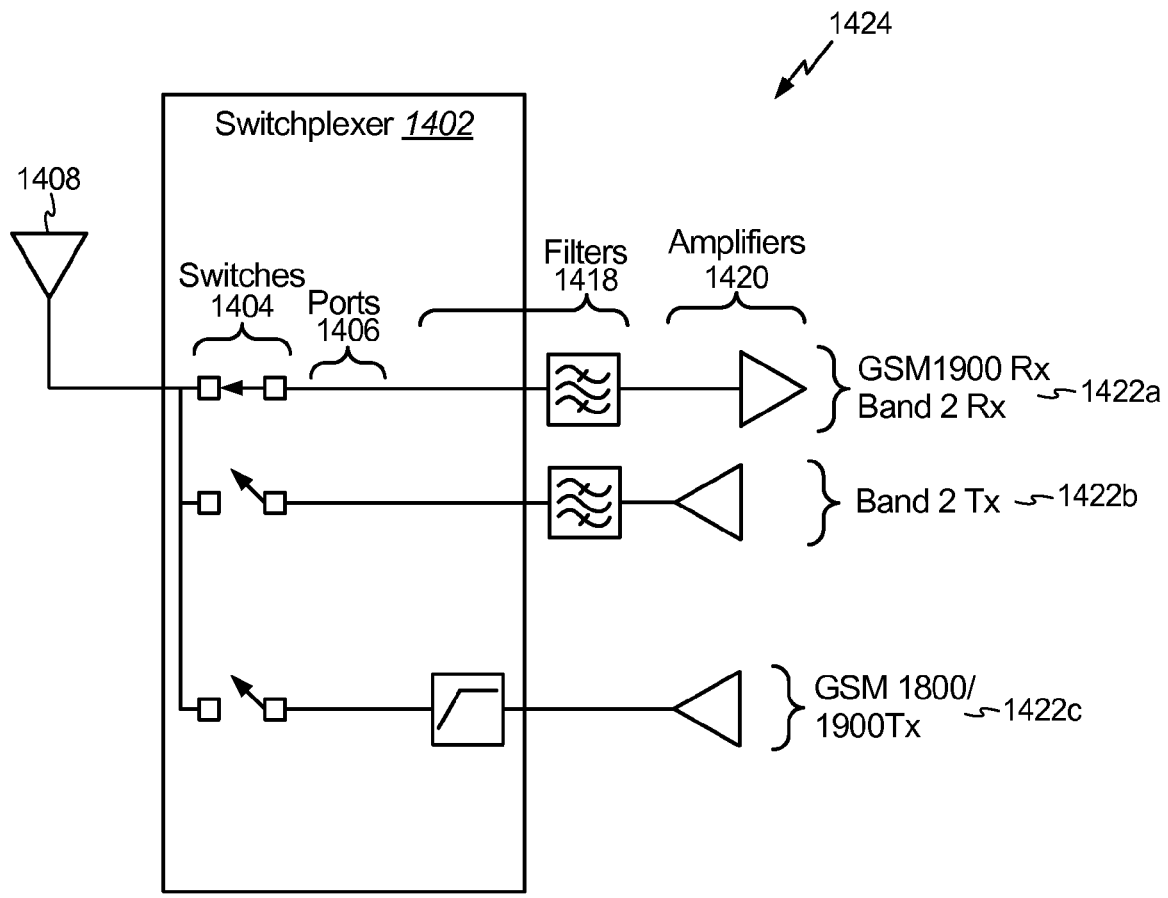
FIG. 14 is a block diagram illustrating another example of a radio frequency (RF) front end in accordance with the systems and methods disclosed herein.

FIG. 14 is a block diagram illustrating another example of a radio frequency (RF) front end 1424 in accordance with the systems and methods disclosed herein. In this example, an antenna 1408 is coupled to a switchplexer 1402. The switchplexer 1402 may include switches 1404 and ports 1406. One or more of the ports 1406 may be optionally and respectively coupled to one or more phase shifters (not shown). The switchplexer 1402, switches 1404 and ports 1406 illustrated in FIG. 14 may be configured similarly to the switchplexer 102, switches 104 and ports 106 described above in connection with FIG. 1. The switchplexer 1402 illustrated in FIG. 14 may include controlling circuitry that controls the switches (with switch signals) that is configured similarly to the controlling circuitry 110 described in connection with FIG. 1. The ports 1406 may be respectively coupled to filters 1418. The filters 1418 may be respectively coupled to amplifiers 1420. The switchplexer 1402 given in this example allows one or multiple switches 1404 to be concurrently closed (e.g., activated or turned "on"). This may enable signaling (e.g., communication) in one or more bands and/or modes corresponding to switches 1404 that are closed.

The first port 1406, first filter 1418 and first amplifier 1420 may support signals in GSM 1900 Rx and Band 2 Rx 1422*a*. The second port 1406, second filter 1418 and second amplifier 1420 may support signals in Band 2 Tx 1422*b*. The third port 1406, third filter 1418 and third amplifier 1420 may support signals in GSM 1800 Tx and GSM 1900 Tx 1422*c*.

Table (3) below illustrates some switch states corresponding to modes that may be applied by the switchplexer 1402 in the example illustrated in FIG. 14.

TABLE (3)

| First Switch | Second Switch | Third Switch | Mode |
| --- | --- | --- | --- |
| ON | OFF | OFF | GSM 1900 Rx |
| ON | ON | OFF | UMTS Band 2 |
| OFF | OFF | ON | GSM 1800/1900 Tx |
| OFF | ON | OFF | GSM 1900 Tx |

Figure 15:
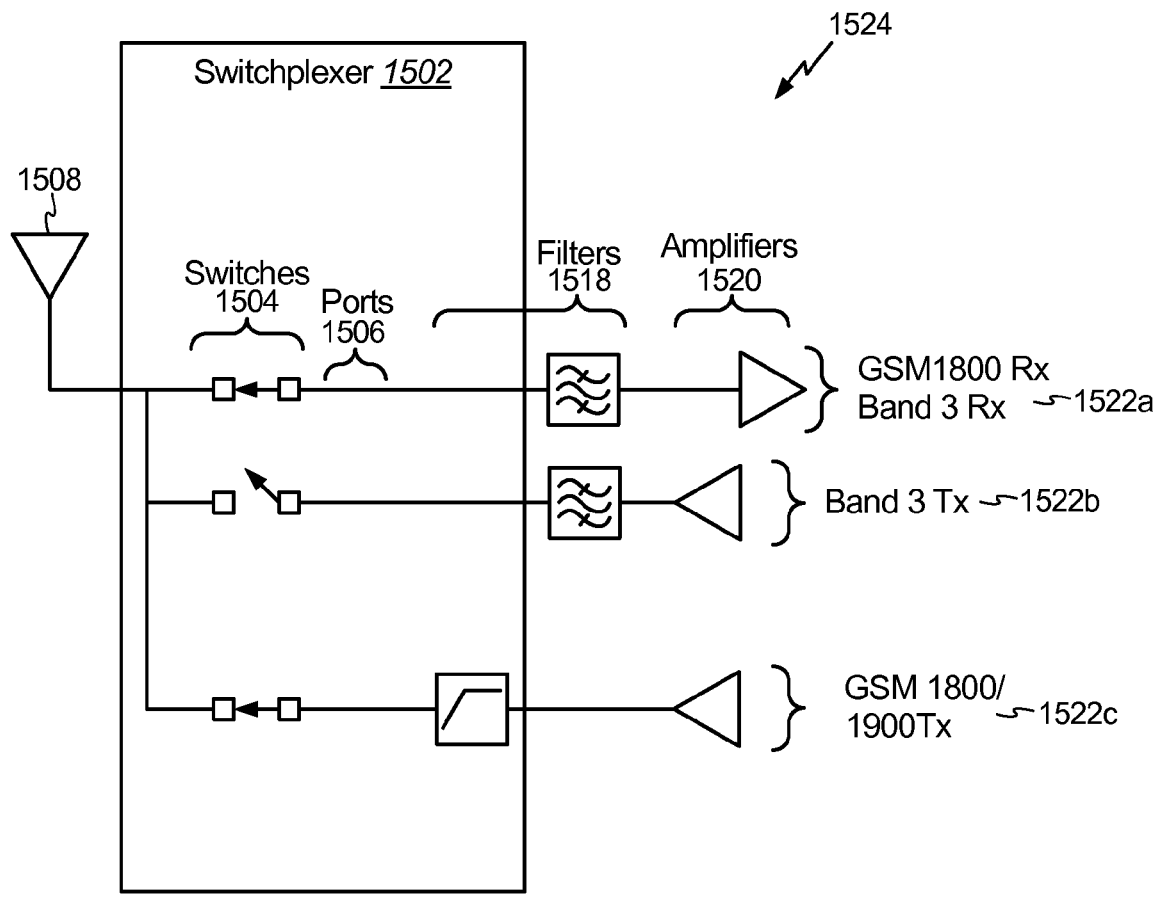
FIG. 15 is a block diagram illustrating another example of a radio frequency (RF) front end in accordance with the systems and methods disclosed herein.

FIG. 15 is a block diagram illustrating another example of a radio frequency (RF) front end 1524 in accordance with the systems and methods disclosed herein. In this example, an antenna 1508 is coupled to a switchplexer 1502. The switchplexer 1502 may include switches 1504 and ports 1506. One or more of the ports 1506 may be optionally and respectively coupled to one or more phase shifters (not shown). The switchplexer 1502, switches 1504 and ports 1506 illustrated in FIG. 15 may be configured similarly to the switchplexer 102, switches 104 and ports 106 described above in connection with FIG. 1. The switchplexer 1502 illustrated in FIG. 15 may include controlling circuitry that controls the switches (with switch signals) that is configured similarly to the controlling circuitry 110 described in connection with FIG. 1. The ports 1506 may be respectively coupled to filters 1518. The filters 1518 may be respectively coupled to amplifiers 1520. The switchplexer 1502 given in this example allows one or multiple switches 1504 to be concurrently closed (e.g., activated or turned "on"). This may enable signaling (e.g., communication) in one or more bands and/or modes corresponding to switches 1504 that are closed.

The first port 1506, first filter 1518 and first amplifier 1520 may support signals in GSM 1800 Rx and Band 3 Rx 1522*a*. The second port 1506, second filter 1518 and second amplifier 1520 may support signals in Band 3 Tx 1522*b*. The third port 1506, third filter 1518 and third amplifier 1520 may support signals in GSM 1800 Tx and GSM 1900 Tx 1522*c*.

Table (4) below illustrates some switch states corresponding to modes that may be applied by the switchplexer 1502 in the example illustrated in FIG. 15.

TABLE (4)

| First Switch | Second Switch | Third Switch | Mode |
| --- | --- | --- | --- |
| ON | OFF | OFF | GSM 1800 Rx |
| ON | ON | OFF | UMTS Band 3 |
| OFF | OFF | ON | GSM 1800/1900 Tx |
| OFF | ON | OFF | GSM 1800 Tx |

Figure 16:
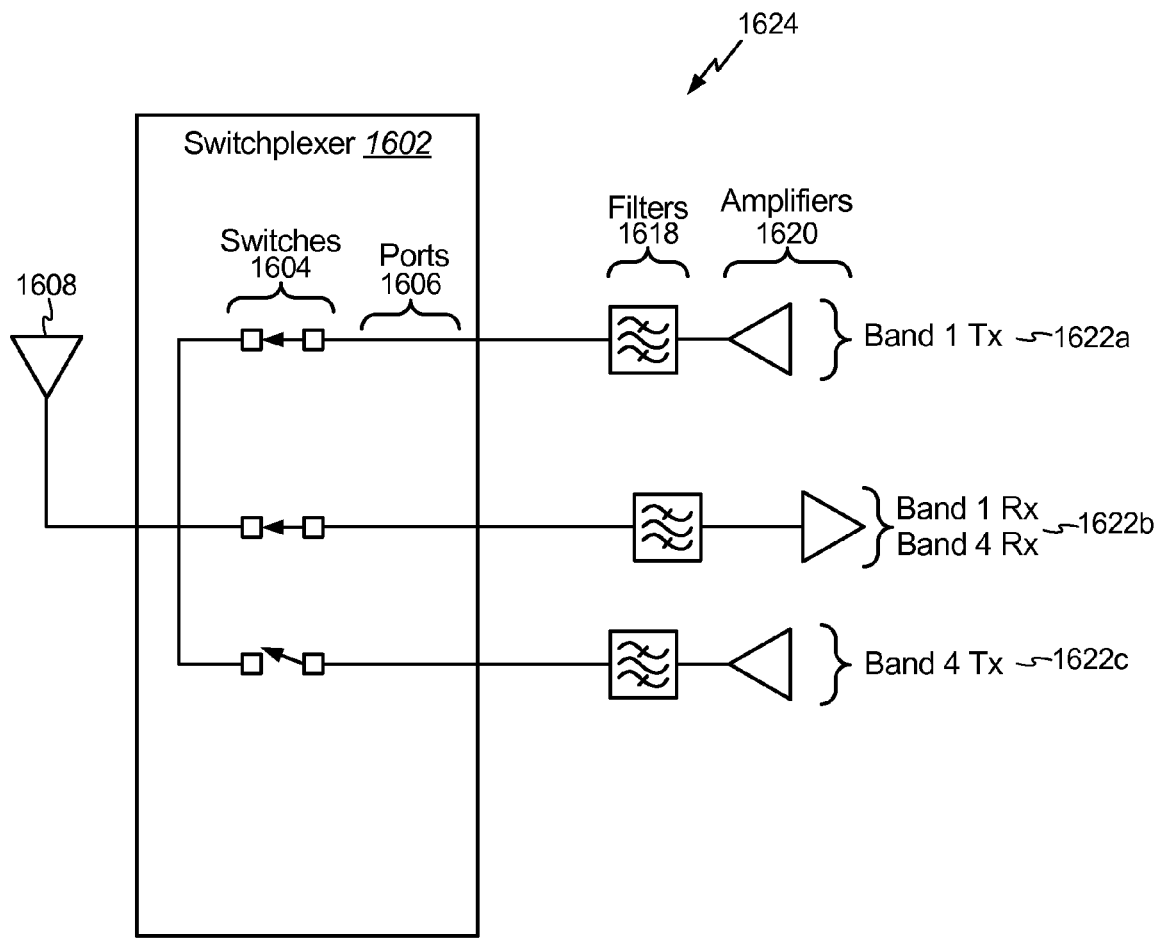
FIG. 16 is a block diagram illustrating another example of a radio frequency (RF) front end in accordance with the systems and methods disclosed herein.

FIG. 16 is a block diagram illustrating another example of a radio frequency (RF) front end 1624 in accordance with the systems and methods disclosed herein. In this example, an antenna 1608 is coupled to a switchplexer 1602. The switchplexer 1602 may include switches 1604 and ports 1606. One or more of the ports 1606 may be optionally and respectively coupled to one or more phase shifters (not shown). The switchplexer 1602, switches 1604 and ports 1606 illustrated in FIG. 16 may be configured similarly to the switchplexer 102, switches 104 and ports 106 described above in connection with FIG. 1. The switchplexer 1602 illustrated in FIG. 16 may include controlling circuitry that controls the switches (with switch signals) that is configured similarly to the controlling circuitry 110 described in connection with FIG. 1. The ports 1606 may be respectively coupled to filters 1618. The filters 1618 may be respectively coupled to amplifiers 1620. The switchplexer 1602 given in this example allows one or multiple switches 1604 to be concurrently closed (e.g., activated or turned "on"). This may enable signaling (e.g., communication) in one or more bands and/or modes corresponding to switches 1604 that are closed.

The first port 1606, first filter 1618 and first amplifier 1620 may support signals in Band 1 Tx 1622*a*. The second port 1606, second filter 1618 and second amplifier 1620 may support signals in Band 1 Rx and Band 4 Rx 1622*b*. The third port 1606, third filter 1618 and third amplifier 1620 may support signals in Band 4 Tx 1622*c*.

Table (5) below illustrates some switch states corresponding to modes that may be applied by the switchplexer 1602 in the example illustrated in FIG. 16.

TABLE (5)

| First Switch | Second Switch | Third Switch | Mode |
| --- | --- | --- | --- |
| ON | ON | OFF | UMTS Band 1 |
| OFF | ON | ON | UMTS Band 4 |

Figure 17:
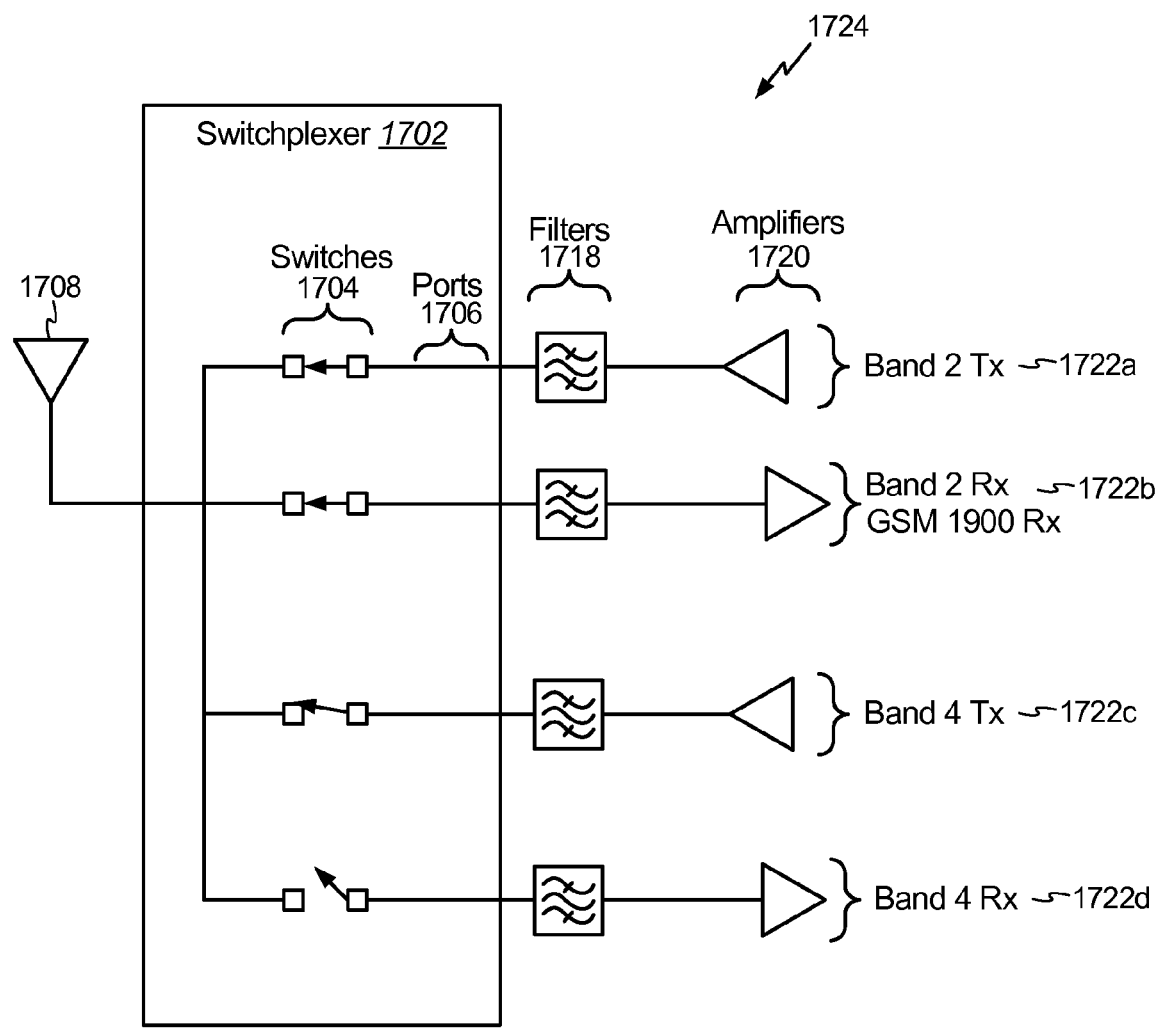
FIG. 17 is a block diagram illustrating another example of a radio frequency (RF) front end in accordance with the systems and methods disclosed herein.

FIG. 17 is a block diagram illustrating another example of a radio frequency (RF) front end 1724 in accordance with the systems and methods disclosed herein. In this example, an antenna 1708 is coupled to a switchplexer 1702. The switchplexer 1702 may include switches 1704 and ports 1706. One or more of the ports 1706 may be optionally and respectively coupled to one or more phase shifters (not shown). The switchplexer 1702, switches 1704 and ports 1706 illustrated in FIG. 17 may be configured similarly to the switchplexer 102, switches 104 and ports 106 described above in connection with FIG. 1. The switchplexer 1702 illustrated in FIG. 17 may include controlling circuitry that controls the switches (with switch signals) that is configured similarly to the controlling circuitry 110 described in connection with FIG. 1. The ports 1706 may be respectively coupled to filters 1718. The filters 1718 may be respectively coupled to amplifiers 1720. The switchplexer 1702 given in this example allows one or multiple switches 1704 to be concurrently closed (e.g., activated or turned "on"). This may enable signaling (e.g., communication) in one or more bands and/or modes corresponding to switches 1704 that are closed.

The first port 1706, first filter 1718 and first amplifier 1720 may support signals in Band 2 Tx 1722a. The second port 1706, second filter 1718 and second amplifier 1720 may support signals in Band 2 Rx and GSM 1900 Rx 1722b. The third port 1706, third filter 1718 and third amplifier 1720 may support signals in Band 4 Tx 1722c. The fourth port 1706, fourth filter 1718 and fourth amplifier 1720 may support signals in Band 4 Rx 1722d.

Table (6) below illustrates some switch states corresponding to modes that may be applied by the switchplexer 1702 in the example illustrated in FIG. 17. This example may support carrier aggregation. Furthermore, this may provide lower insertion loss for individual band operation, for Bands 2 and 4. This may also save a GSM 1900 receive chain. It should be noted that GSM 1800 Tx may also be supported depending on filter performance.

TABLE (6)

| First Switch | Second Switch | Third Switch | Fourth Switch | Mode |
|---|---|---|---|---|
| ON | ON | OFF | OFF | UMST Band 2 |
| OFF | OFF | ON | ON | UMTS Band 4 |
| OFF | ON | OFF | OFF | GSM 1900 Rx |
| ON | ON | OFF | ON | Band 2 Tx/Rx & Band 4 Rx |
| OFF | ON | ON | ON | Band 4 Tx/Rx & Band 2 Rx |

Figure 18:
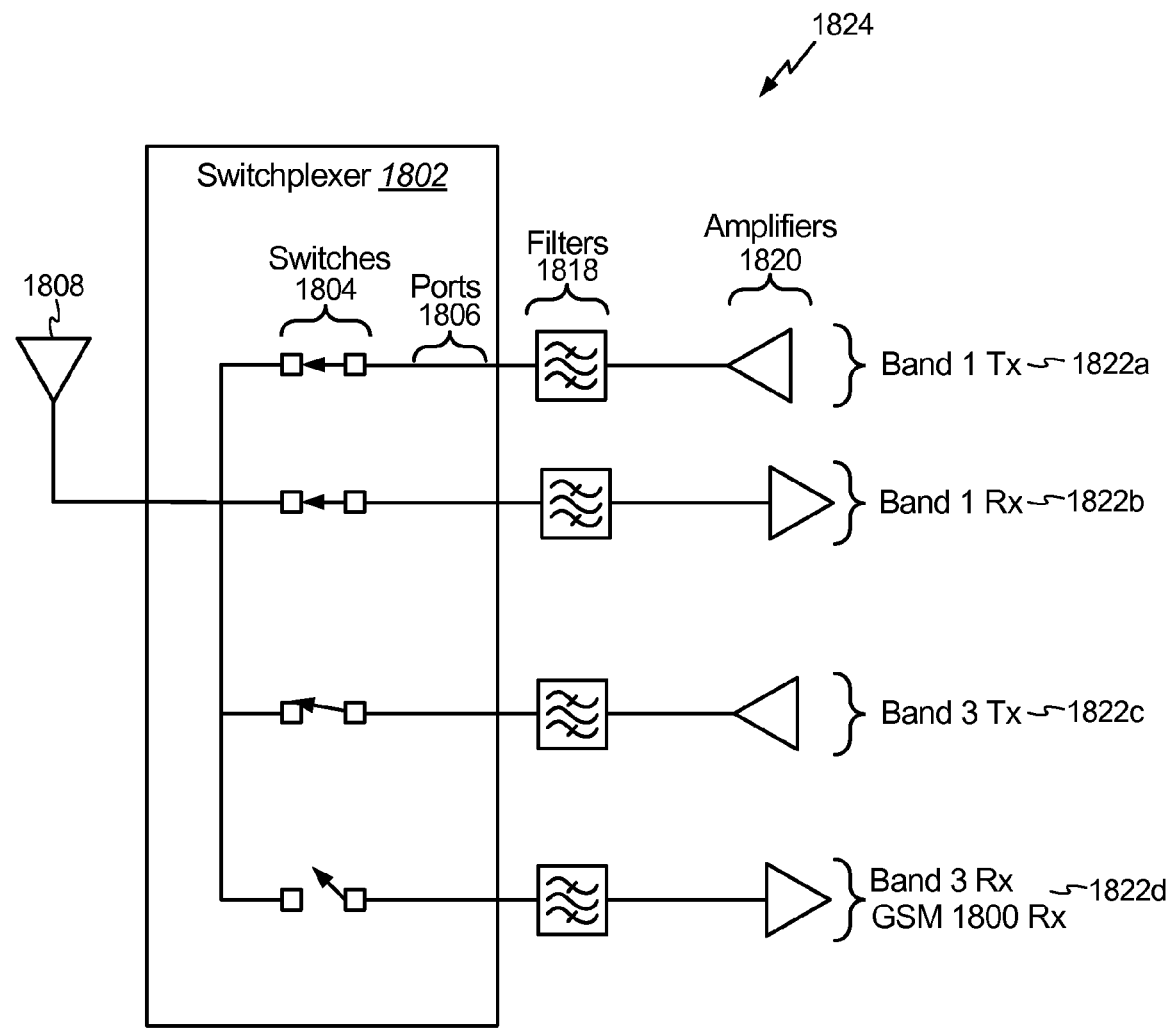
FIG. 18 is a block diagram illustrating another example of a radio frequency (RF) front end in accordance with the systems and methods disclosed herein.

FIG. 18 is a block diagram illustrating another example of a radio frequency (RF) front end 1824 in accordance with the systems and methods disclosed herein. In this example, an antenna 1808 is coupled to a switchplexer 1802. The switchplexer 1802 may include switches 1804 and ports 1806. One or more of the ports 1806 may be optionally and respectively coupled to one or more phase shifters (not shown). The switchplexer 1802, switches 1804 and ports 1806 illustrated in FIG. 18 may be configured similarly to the switchplexer 102, switches 104 and ports 106 described above in connection with FIG. 1. The switchplexer 1802 illustrated in FIG. 18 may include controlling circuitry that controls the switches (with switch signals) that is configured similarly to the controlling circuitry 110 described in connection with FIG. 1. The ports 1806 may be respectively coupled to filters 1818. The filters 1818 may be respectively coupled to amplifiers 1820. The switchplexer 1802 given in this example allows one or multiple switches 1804 to be concurrently closed (e.g., activated or turned "on"). This may enable signaling (e.g., communication) in one or more bands and/or modes corresponding to switches 1804 that are closed.

The first port 1806, first filter 1818 and first amplifier 1820 may support signals in Band 1 Tx 1822a. The second port 1806, second filter 1818 and second amplifier 1820 may support signals in Band 1 Rx 1822b. The third port 1806, third filter 1818 and third amplifier 1820 may support signals in Band 3 Tx 1822c. The fourth port 1806, fourth filter 1818 and fourth amplifier 1820 may support signals in Band 3 Rx and GSM 1800 Rx 1822d.

Table (7) below illustrates some switch states corresponding to modes that may be applied by the switchplexer 1802 in the example illustrated in FIG. 18. This example may support carrier aggregation. Furthermore, this may provide lower insertion loss for individual band operation, for Bands 1 and 3. This may also save a GSM 1800 receive chain. It should be noted that GSM 1800 Tx may also be supported on the third port 1806 depending on filter 1818 performance.

TABLE (7)

| First Switch | Second Switch | Third Switch | Fourth Switch | Mode |
|---|---|---|---|---|
| ON | ON | OFF | OFF | UMST Band 1 |
| OFF | OFF | ON | ON | UMTS Band 3 |
| ON | ON | OFF | ON | Band 1 Tx/Rx & Band 3 Rx |
| OFF | ON | ON | ON | Band 3 Tx/Rx & Band 1 Rx |

Figure 19:
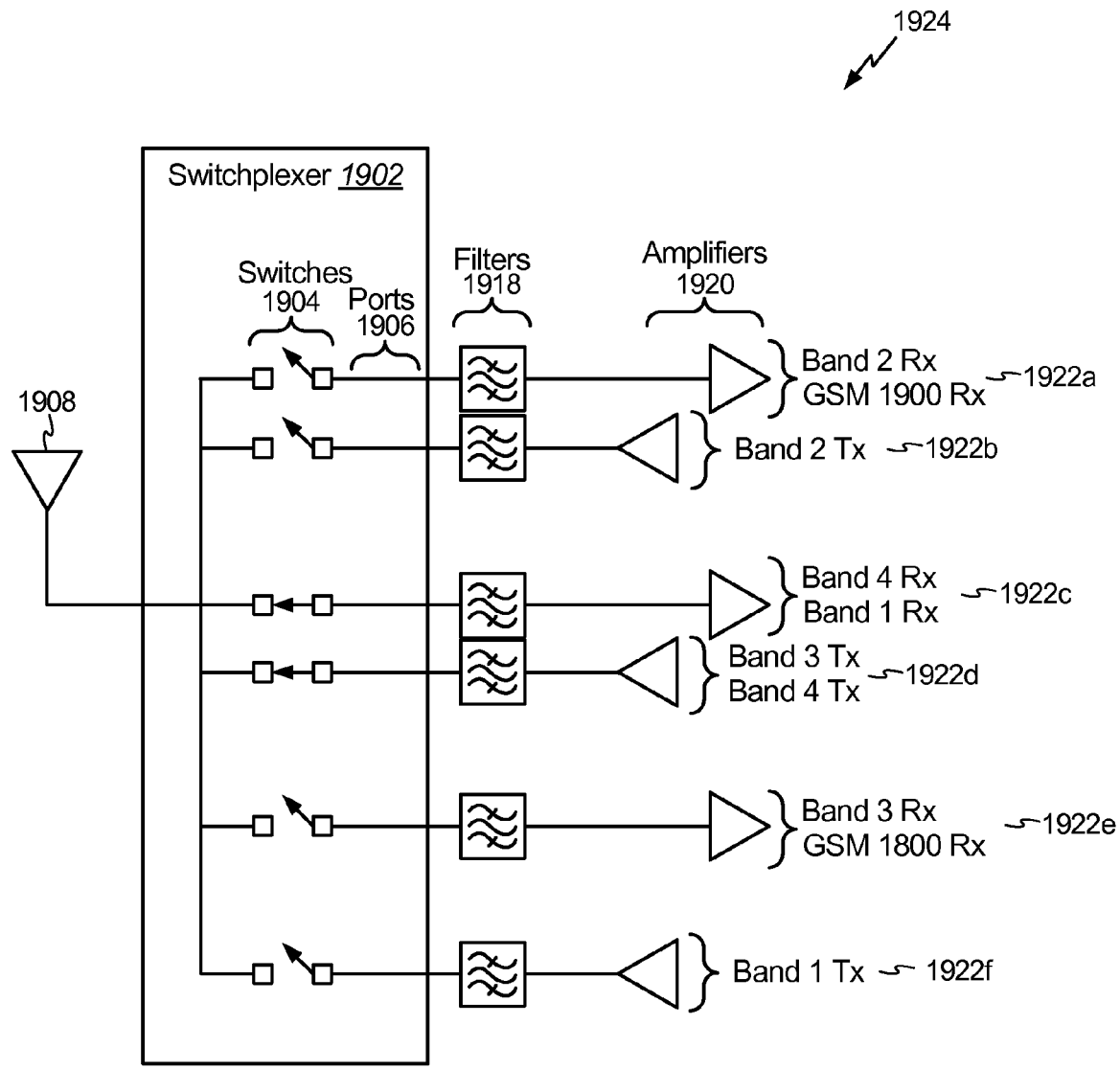
FIG. 19 is a block diagram illustrating another example of a radio frequency (RF) front end in accordance with the systems and methods disclosed herein.

FIG. 19 is a block diagram illustrating another example of a radio frequency (RF) front end 1924 in accordance with the systems and methods disclosed herein. In this example, an antenna 1908 is coupled to a switchplexer 1902. The switchplexer 1902 may include switches 1904 and ports 1906. One or more of the ports 1906 may be optionally and respectively coupled to one or more phase shifters (not shown). The switchplexer 1902, switches 1904 and ports 1906 illustrated in FIG. 19 may be configured similarly to the switchplexer 102, switches 104 and ports 106 described above in connection with FIG. 1. The switchplexer 1902 illustrated in FIG. 19 may include controlling circuitry that controls the switches (with switch signals) that is configured similarly to the controlling circuitry 110 described in connection with FIG. 1. The ports 1906 may be respectively coupled to filters 1918. The filters 1918 may be respectively coupled to amplifiers 1920. The switchplexer 1902 given in this example allows one or multiple switches 1904 to be concurrently closed (e.g., activated or turned "on"). This may enable signaling (e.g., communication) in one or more bands and/or modes corresponding to switches 1904 that are closed.

The first port 1906, first filter 1918 and first amplifier 1920 may support signals in Band 2 Rx and GSM 1900 Rx 1922a. The second port 1906, second filter 1918 and second amplifier 1920 may support signals in Band 2 Tx 1922b. The third port 1906, third filter 1918 and third amplifier 1920 may support signals in Band 4 Rx and Band 1 Rx 1922c. The fourth port 1906, fourth filter 1918 and fourth amplifier 1920 may support signals in Band 3 Tx and Band 4 Tx 1922d. The fifth port 1906, fifth filter 1918 and fifth amplifier 1920 may support signals in Band 3 Rx and GSM 1800 Rx 1922e. The sixth port 1906, sixth filter 1918 and sixth amplifier 1920 may support signals in Band 1 Tx 1922f.

Tables (8) and (9) below illustrate some switch states corresponding to modes that may be applied by the switchplexer 1902 in the example illustrated in FIG. 19. This example may support carrier aggregation. Furthermore, this may provide lower insertion loss for individual band operation, for Bands 1, 2, 3 and 4. This may also save a GSM 1800 receive chain and a GSM 1900 receive chain. GSM 1900 Tx may be optionally supported on the second port 1906 depending on filter 1918 performance. GSM 1800 Tx may be optionally supported on the fourth port 1906 depending on filter 1918 performance.

TABLE (8)

| First Switch | Second Switch | Third Switch | Fourth Switch | Mode |
|---|---|---|---|---|
| ON | ON | OFF | OFF | UMST Band 2 |
| OFF | OFF | ON | ON | UMTS Band 4 |
| ON | OFF | OFF | OFF | GSM 1900 Rx |

TABLE (8)-continued

| First Switch | Second Switch | Third Switch | Fourth Switch | Mode |
|---|---|---|---|---|
| ON | ON | ON | OFF | Band 2 Tx/Rx & Band 4 Rx |
| ON | OFF | ON | ON | Band 4 Tx/Rx & Band 2 Rx |

TABLE (9)

| Third Switch | Fourth Switch | Fifth Switch | Sixth Switch | Mode |
|---|---|---|---|---|
| OFF | ON | ON | OFF | UMST Band 3 |
| ON | OFF | OFF | ON | UMTS Band 1 |
| OFF | OFF | ON | OFF | GSM 1800 Rx |
| ON | ON | ON | OFF | Band 3 Tx/Rx & Band 1 Rx |
| ON | OFF | ON | ON | Band 4 Tx/Rx & Band 2 Rx |

Figure 20:
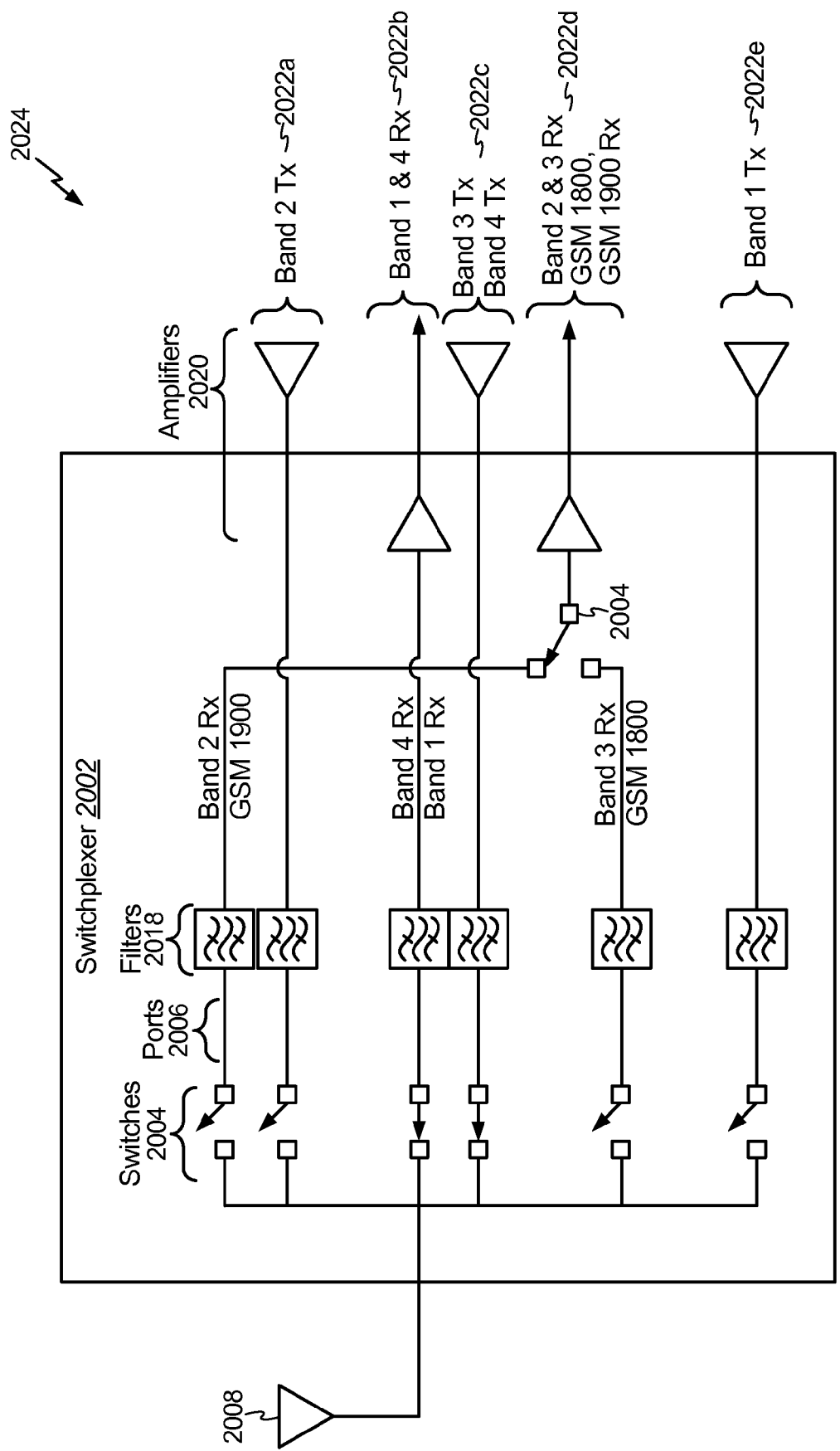
FIG. 20 is a block diagram illustrating another example of a radio frequency (RF) front end in accordance with the systems and methods disclosed herein.

FIG. 20 is a block diagram illustrating another example of a radio frequency (RF) front end 2024 in accordance with the systems and methods disclosed herein. In this example, an antenna 2008 is coupled to a switchplexer 2002. The switchplexer 2002 may include switches 2004 and ports 2006. One or more of the ports 2006 may be optionally and respectively coupled to one or more phase shifters (not shown). The switchplexer 2002, switches 2004 and ports 2006 illustrated in FIG. 20 may be configured similarly to the switchplexer 102, switches 104 and ports 106 described above in connection with FIG. 1. The switchplexer 2002 illustrated in FIG. 20 may include controlling circuitry that controls the switches (with switch signals) that is configured similarly to the controlling circuitry 110 described in connection with FIG. 1. The ports 2006 may be respectively coupled to filters 2018. The filters 2018 may be respectively coupled to amplifiers 2020. The switchplexer 2002 given in this example allows one or multiple switches 2004 to be concurrently closed (e.g., activated or turned "on"). This may enable signaling (e.g., communication) in one or more bands and/or modes corresponding to switches 2004 that are closed.

The first port 2006 and first filter 2018 may support signals in Band 2 Rx and GSM 1900 Rx. The second port 2006, second filter 2018 and second amplifier 2020 may support signals in Band 2 Tx 2022a. The third port 2006, third filter 2018 and third amplifier 2020 may support signals in Band 4 Rx and Band 1 Rx 2022b. The fourth port 2006, fourth filter 2018 and fourth amplifier 2020 may support signals in Band 3 Tx and Band 4 Tx 2022c. The fifth port 2006 and fifth filter 2018 may support signals in Band 3 Rx and GSM 1800 Rx. The sixth port 2006, sixth filter 2018 and sixth amplifier 2020 may support signals in Band 1 Tx 2022e. An additional switch 2004 may switch between the first port 2006 and the fifth port 2006. The additional switch 2004 may be coupled to the fourth amplifier 2020, which may provide support signals in Band 2 Rx, Band 3 Rx, GSM 1800 Rx and GSM 1900 Rx.

Tables (10) and (11) below illustrate some switch states corresponding to modes that may be applied by the switchplexer 2002 in the example illustrated in FIG. 20. This example may support carrier aggregation. Furthermore, this may provide lower insertion loss for individual band operation, for Bands 1, 2, 3 and 4. This may also save a GSM 1800 receive chain and a GSM 1900 receive chain. GSM 1900 Tx may be optionally supported on the second port 1906 depending on filter 2018 performance. GSM 1800 Tx may be optionally supported on the fourth port 2006 depending on filter 2018 performance.

TABLE (10)

| First Switch | Second Switch | Third Switch | Fourth Switch | Mode |
|---|---|---|---|---|
| ON | ON | OFF | OFF | UMST Band 2 |
| OFF | OFF | ON | ON | UMTS Band 4 |
| ON | OFF | OFF | OFF | GSM 1900 Rx |
| OFF | ON | OFF | OFF | GSM 1900 Tx |
| ON | ON | ON | OFF | Band 2 Tx/Rx & Band 4 Rx |
| ON | OFF | ON | ON | Band 4 Tx/Rx & Band 2 Rx |

TABLE (11)

| Third Switch | Fourth Switch | Fifth Switch | Sixth Switch | Mode |
|---|---|---|---|---|
| OFF | ON | ON | OFF | UMST Band 3 |
| ON | OFF | OFF | ON | UMTS Band 1 |
| OFF | ON | OFF | OFF | GSM 1800 Tx |
| OFF | OFF | ON | OFF | GSM 1800 Rx |
| ON | ON | ON | OFF | Band 3 Tx/Rx & Band 1 Rx |

Figure 21:
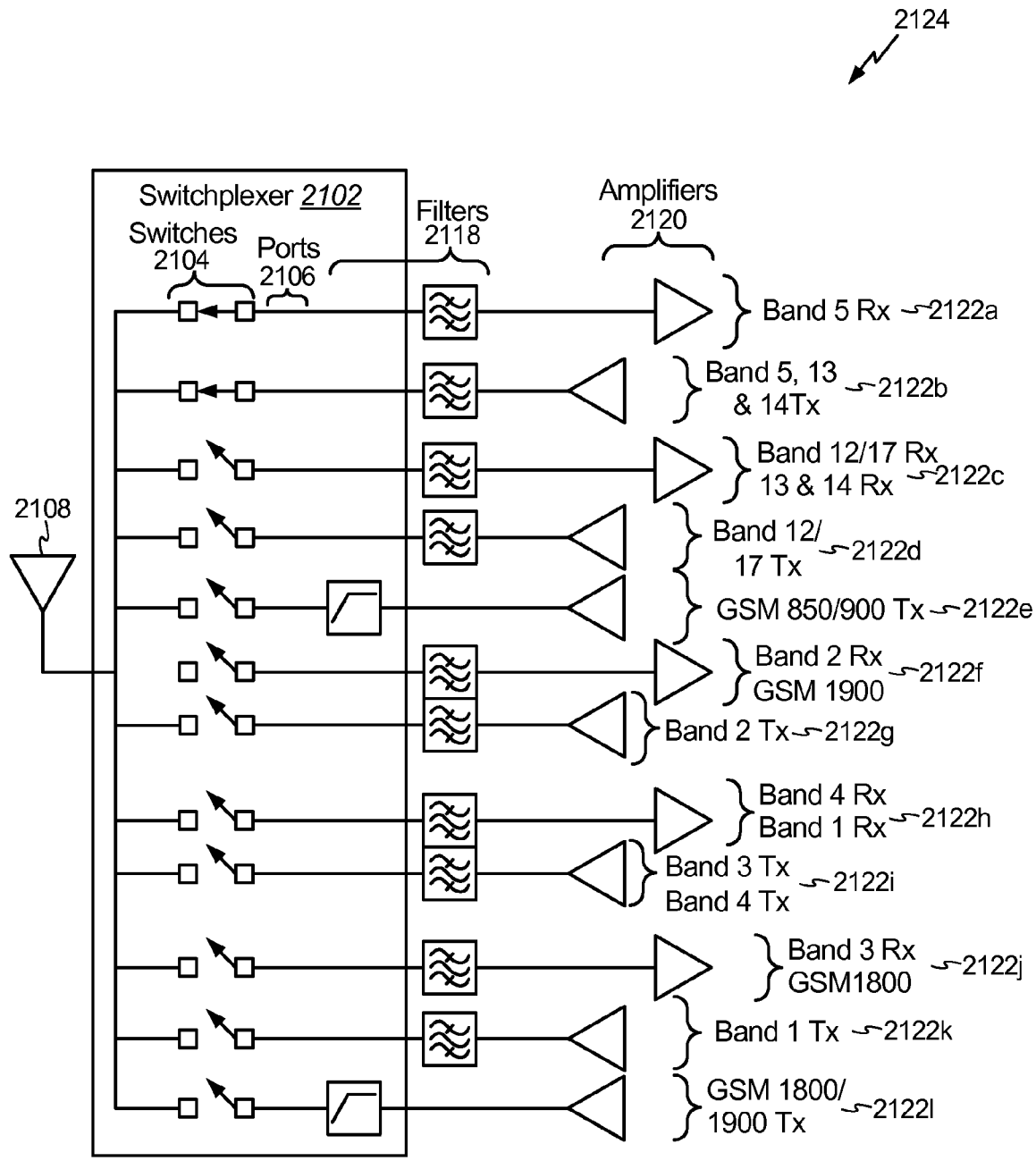
FIG. 21 is a block diagram illustrating another example of a radio frequency (RF) front end in accordance with the systems and methods disclosed herein.

FIG. 21 is a block diagram illustrating another example of a radio frequency (RF) front end 2124 in accordance with the systems and methods disclosed herein. In this example, an antenna 2108 is coupled to a switchplexer 2102. The switchplexer 2102 may include switches 2104 and ports 2106. One or more of the ports 2106 may be optionally and respectively coupled to one or more phase shifters (not shown). The switchplexer 2102, switches 2104 and ports 2106 illustrated in FIG. 21 may be configured similarly to the switchplexer 102, switches 104 and ports 106 described above in connection with FIG. 1. The switchplexer 2102 illustrated in FIG. 21 may include controlling circuitry that controls the switches (with switch signals) that is configured similarly to the controlling circuitry 110 described in connection with FIG. 1. The ports 2106 may be respectively coupled to filters 2118. The filters 2118 may be respectively coupled to amplifiers 2120. The switchplexer 2102 given in this example allows one or multiple switches 2104 to be concurrently closed (e.g., activated or turned "on"). This may enable signaling (e.g., communication) in one or more bands and/or modes corresponding to switches 2104 that are closed.

The first port 2106, first filter 2118 and first amplifier 2120 may support signals in Band 5 Rx 2122a. The second port 2106, second filter 2118 and second amplifier 2120 may support signals in Band 5 Tx, Band 13 Tx and Band 14 Tx 2122b. The third port 2106, third filter 2118 and third amplifier 2120 may support signals in Band 12 Rx, Band 17 Rx, Band 13 Rx and Band 14 Rx 2122c. The fourth port 2106, fourth filter 2118 and fourth amplifier 2120 may support signals in Band 12 Tx and Band 17 Tx 2122d. The fifth port 2106, fifth filter 2118 and fifth amplifier 2120 may support signals in GSM 850 Tx and GSM 900 Tx 2122e. The sixth port 2106, sixth filter 2118 and sixth amplifier 2120 may support signals in Band 2 Rx and GSM 1900 Rx 2122f. The seventh port 2106, seventh filter 2118 and seventh amplifier 2120 may support signals in Band 2 Tx 2122g. The eighth port 2106, eighth filter 2118 and eighth amplifier 2120 may support signals in Band 4 Rx and Band 1 Rx 2122h. The ninth port 2106, ninth filter 2118 and ninth amplifier 2120 may support signals in Band 3 Tx and Band 4 Tx 2122*i*. The tenth port 2106, tenth filter 2118 and tenth amplifier 2120 may support signals in Band 3 Rx and GSM 1800 Rx 2122*j*. The eleventh port 2106, eleventh filter 2118 and eleventh amplifier 2120 may support signals in Band 1 Tx 2122*k*. The twelfth port 2106, twelfth filter 2118 and twelfth amplifier 2120 may support signals in GSM 1800 Tx and GSM 1900 Tx 2122*l*.

GSM 1900 Tx may be optionally supported on the seventh port 2106 depending on filter 2118 performance. GSM 1800 Tx may be optionally supported on the ninth port 2106 depending on filter 2118 performance.

Figure 22:
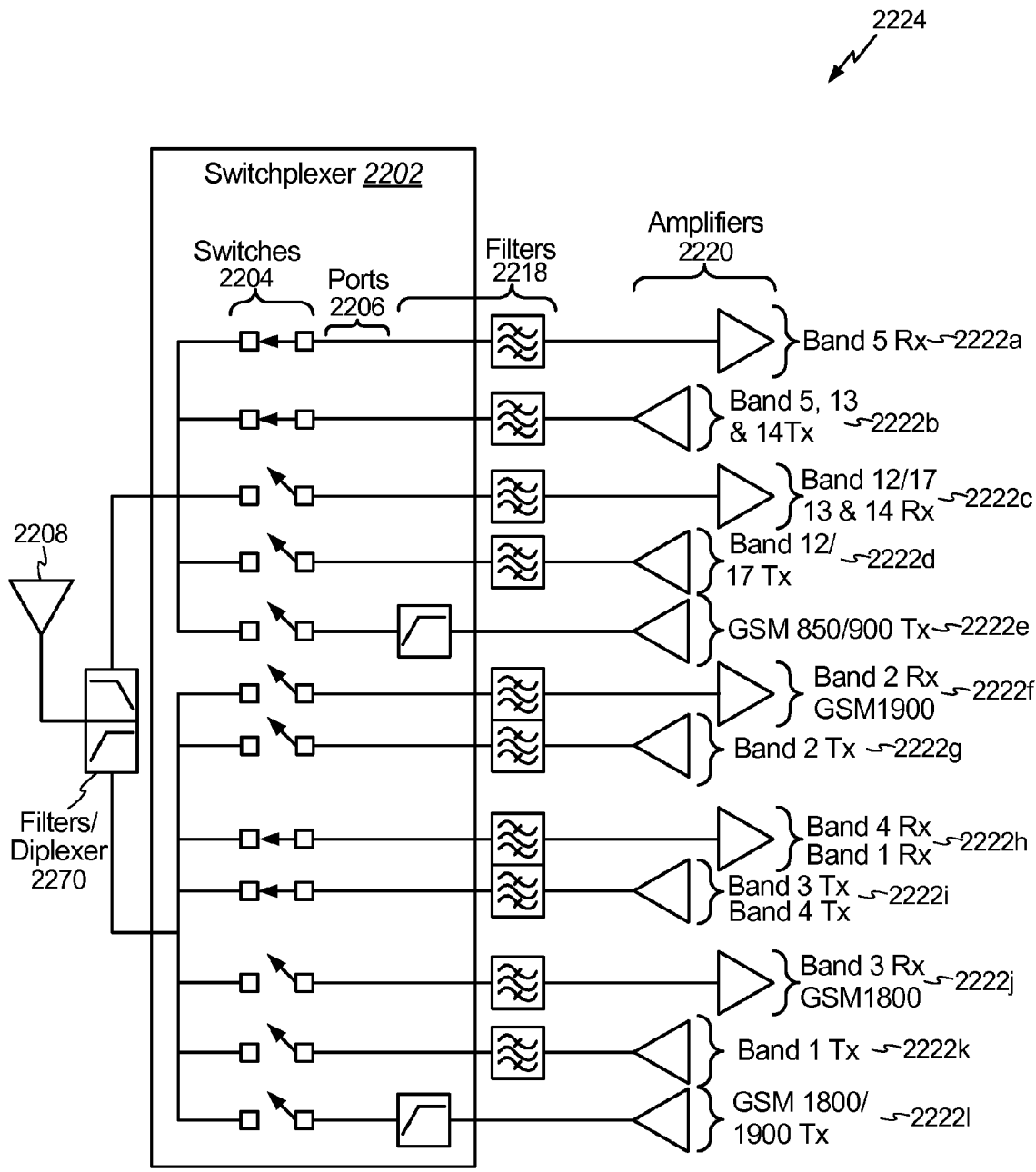
FIG. 22 is a block diagram illustrating another example of a radio frequency (RF) front end in accordance with the systems and methods disclosed herein.

FIG. 22 is a block diagram illustrating another example of a radio frequency (RF) front end 2224 in accordance with the systems and methods disclosed herein. In this example, an antenna 2208 is coupled to a switchplexer 2202 via a pair of filters 2270 (e.g., a low-pass filter and a high-pass filter or diplexer). The switchplexer 2202 may include switches 2204 and ports 2206. One or more of the ports 2206 may be optionally and respectively coupled to one or more phase shifters (not shown). The switchplexer 2202, switches 2204 and ports 2206 illustrated in FIG. 22 may be configured similarly to the switchplexer 102, switches 104 and ports 106 described above in connection with FIG. 1. The switchplexer 2202 illustrated in FIG. 22 may include controlling circuitry that controls the switches (with switch signals) that is configured similarly to the controlling circuitry 110 described in connection with FIG. 1. The ports 2206 may be respectively coupled to filters 2218. The filters 2218 may be respectively coupled to amplifiers 2220. The switchplexer 2202 given in this example allows one or multiple switches 2204 to be concurrently closed (e.g., activated or turned "on"). This may enable signaling (e.g., communication) in one or more bands and/or modes corresponding to switches 2204 that are closed.

The first port 2206, first filter 2218 and first amplifier 2220 may support signals in Band 5 Rx 2222*a*. The second port 2206, second filter 2218 and second amplifier 2220 may support signals in Band 5 Tx, Band 13 Tx and Band 14 Tx 2222*b*. The third port 2206, third filter 2218 and third amplifier 2220 may support signals in Band 12 Rx, Band 17 Rx, Band 13 Rx and Band 14 Rx 2222*c*. The fourth port 2206, fourth filter 2218 and fourth amplifier 2220 may support signals in Band 12 Tx and Band 17 Tx 2222*d*. The fifth port 2206, fifth filter 2218 and fifth amplifier 2220 may support signals in GSM 850 Tx and GSM 900 Tx 2222*e*. The sixth port 2206, sixth filter 2218 and sixth amplifier 2220 may support signals in Band 2 Rx and GSM 1900 Rx 2222*f*. The seventh port 2206, seventh filter 2218 and seventh amplifier 2220 may support signals in Band 2 Tx 2222*g*. The eighth port 2206, eighth filter 2218 and eighth amplifier 2220 may support signals in Band 4 Rx and Band 1 Rx 2222*h*. The ninth port 2206, ninth filter 2218 and ninth amplifier 2220 may support signals in Band 3 Tx and Band 4 Tx 2222*i*. The tenth port 2206, tenth filter 2218 and tenth amplifier 2220 may support signals in Band 3 Rx and GSM 1800 Rx 2222*j*. The eleventh port 2206, eleventh filter 2218 and eleventh amplifier 2220 may support signals in Band 1 Tx 2222*k*. The twelfth port 2206, twelfth filter 2218 and twelfth amplifier 2220 may support signals in GSM 1800 Tx and GSM 1900 Tx 2222*l*.

This example may support carrier aggregation. GSM 1900 Tx may be optionally supported on the seventh port 2206 depending on filter 2218 performance. GSM 1800 Tx may be optionally supported on the ninth port 2206 depending on filter 2218 performance.

Figure 23:
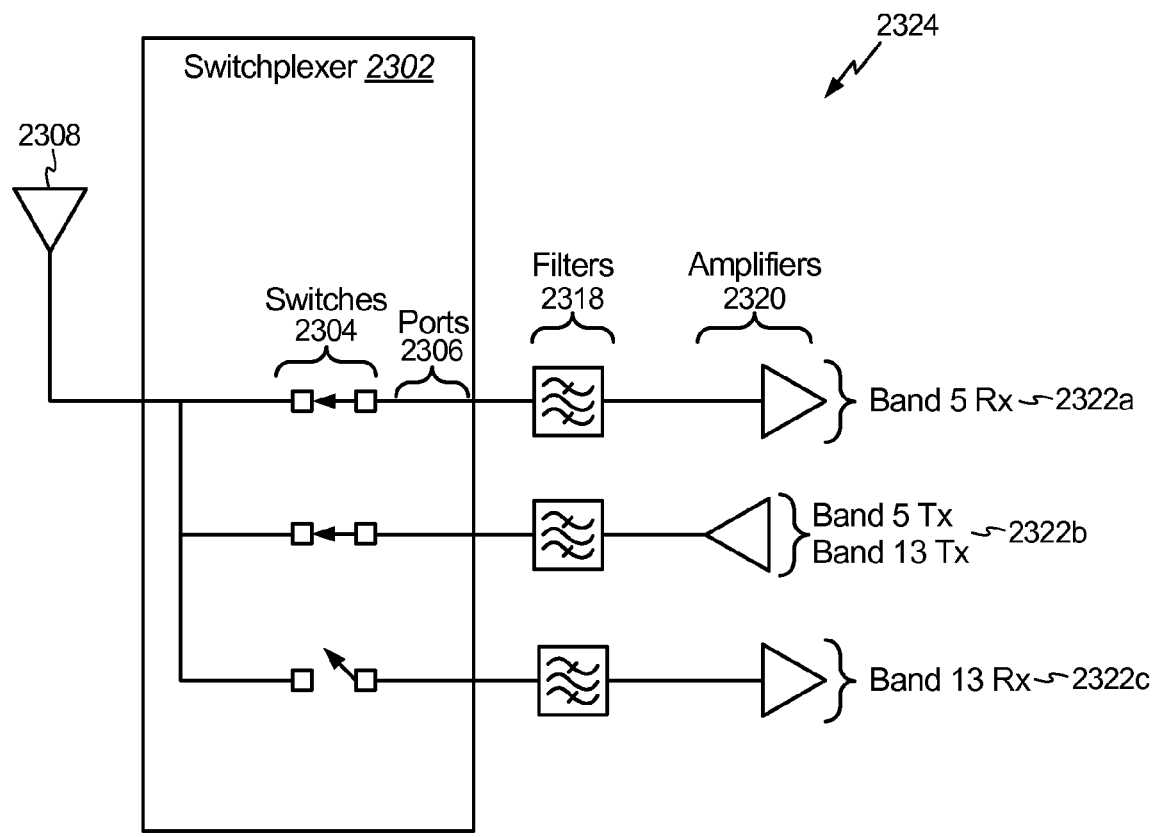
FIG. 23 is a block diagram illustrating another example of a radio frequency (RF) front end in accordance with the systems and methods disclosed herein.

FIG. 23 is a block diagram illustrating another example of a radio frequency (RF) front end 2324 in accordance with the systems and methods disclosed herein. In this example, an antenna 2308 is coupled to a switchplexer 2302. The switchplexer 2302 may include switches 2304 and ports 2306. One or more of the ports 2306 may be optionally and respectively coupled to one or more phase shifters (not shown). The switchplexer 2302, switches 2304 and ports 2306 illustrated in FIG. 23 may be configured similarly to the switchplexer 102, switches 104 and ports 106 described above in connection with FIG. 1. The switchplexer 2302 illustrated in FIG. 23 may include controlling circuitry that controls the switches (with switch signals) that is configured similarly to the controlling circuitry 110 described in connection with FIG. 1. The ports 2306 may be respectively coupled to filters 2318. The filters 2318 may be respectively coupled to amplifiers 2320. The switchplexer 2302 given in this example allows one or multiple switches 2304 to be concurrently closed (e.g., activated or turned "on"). This may enable signaling (e.g., communication) in one or more bands and/or modes corresponding to switches 2304 that are closed.

The first port 2306, first filter 2318 and first amplifier 2320 may support signals in Band 5 Rx 2322*a*. The second port 2306, second filter 2318 and second amplifier 2320 may support signals in Band 5 Tx and Band 13 Tx 2322*b*. The third port 2306, third filter 2318 and third amplifier 2320 may support signals in Band 13 Rx 2322*c*.

Table (12) below illustrates some switch states corresponding to modes that may be applied by the switchplexer 2302 in the example illustrated in FIG. 23.

TABLE (12)

| First Switch | Second Switch | Third Switch | Mode |
|---|---|---|---|
| ON | OFF | OFF | GSM 850 Rx |
| ON | ON | OFF | UMTS Band 5 |
| OFF | ON | ON | Band 13 |

Figure 24:
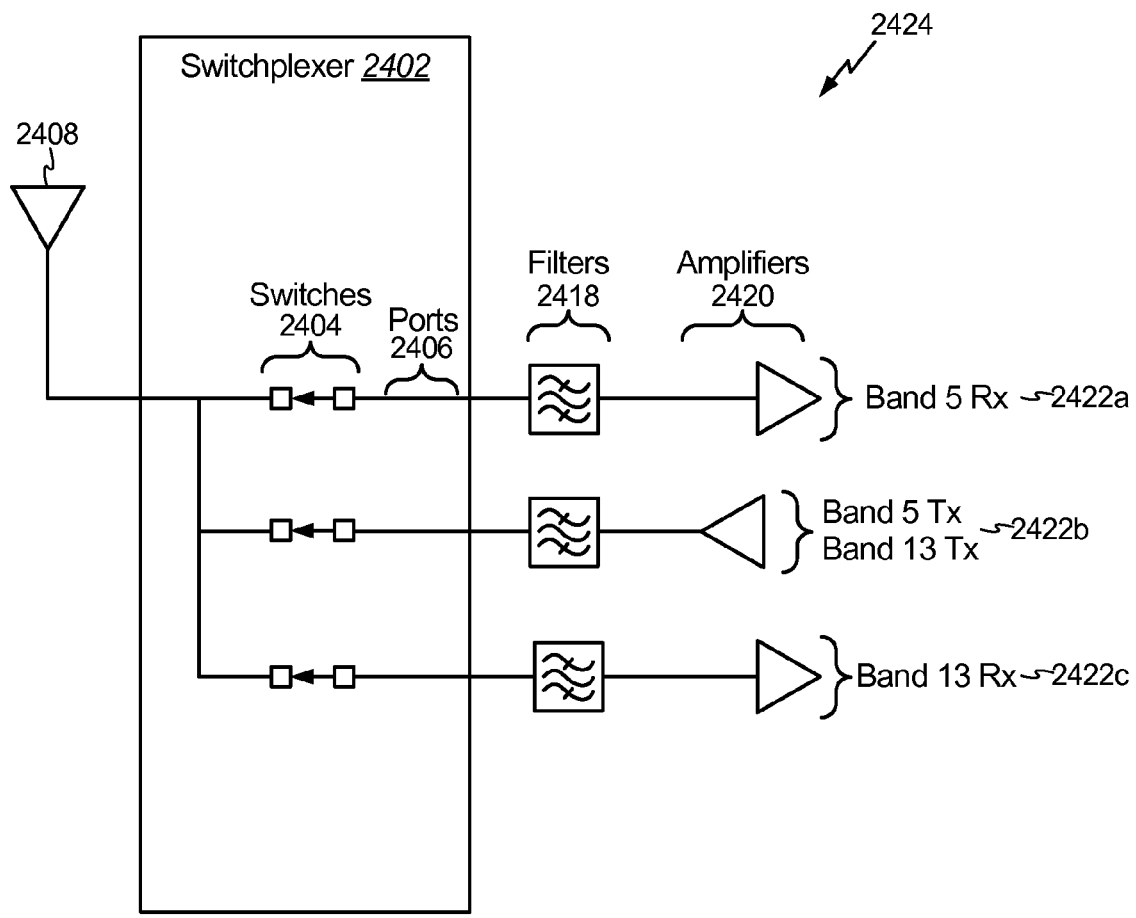
FIG. 24 is a block diagram illustrating another example of a radio frequency (RF) front end in accordance with the systems and methods disclosed herein.

FIG. 24 is a block diagram illustrating another example of a radio frequency (RF) front end 2424 in accordance with the systems and methods disclosed herein. In this example, an antenna 2408 is coupled to a switchplexer 2402. The switchplexer 2402 may include switches 2404 and ports 2406. One or more of the ports 2406 may be optionally and respectively coupled to one or more phase shifters (not shown). The switchplexer 2402, switches 2404 and ports 2406 illustrated in FIG. 24 may be configured similarly to the switchplexer 102, switches 104 and ports 106 described above in connection with FIG. 1. The switchplexer 2402 illustrated in FIG. 24 may include controlling circuitry that controls the switches (with switch signals) that is configured similarly to the controlling circuitry 110 described in connection with FIG. 1. The ports 2406 may be respectively coupled to filters 2418. The filters 2418 may be respectively coupled to amplifiers 2420. The switchplexer 2402 given in this example allows one or multiple switches 2404 to be concurrently closed (e.g., activated or turned "on"). This may enable signaling (e.g., communication) in one or more bands and/or modes corresponding to switches 2404 that are closed.

The first port 2406, first filter 2418 and first amplifier 2420 may support signals in Band 5 Rx 2422*a*. The second port 2406, second filter 2418 and second amplifier 2420 may support signals in Band 5 Tx and Band 13 Tx 2422*b*. The third port 2406, third filter 2418 and third amplifier 2420 may support signals in Band 13 Rx 2422*c*.

Table (13) below illustrates some switch states corresponding to modes that may be applied by the switchplexer 2402 in the example illustrated in FIG. 24. This example may support carrier aggregation. This approach may save a Band 13 amplifier (e.g., PA) and a transmit filter.

TABLE (13)

| First Switch | Second Switch | Third Switch | Mode |
|---|---|---|---|
| ON | OFF | OFF | GSM 850 Rx |
| ON | ON | OFF | UMTS Band 5 |
| OFF | ON | ON | Band 13 |
| ON | ON | ON | Band 5 & Band 13 Carrier Aggregation |

Figure 25:
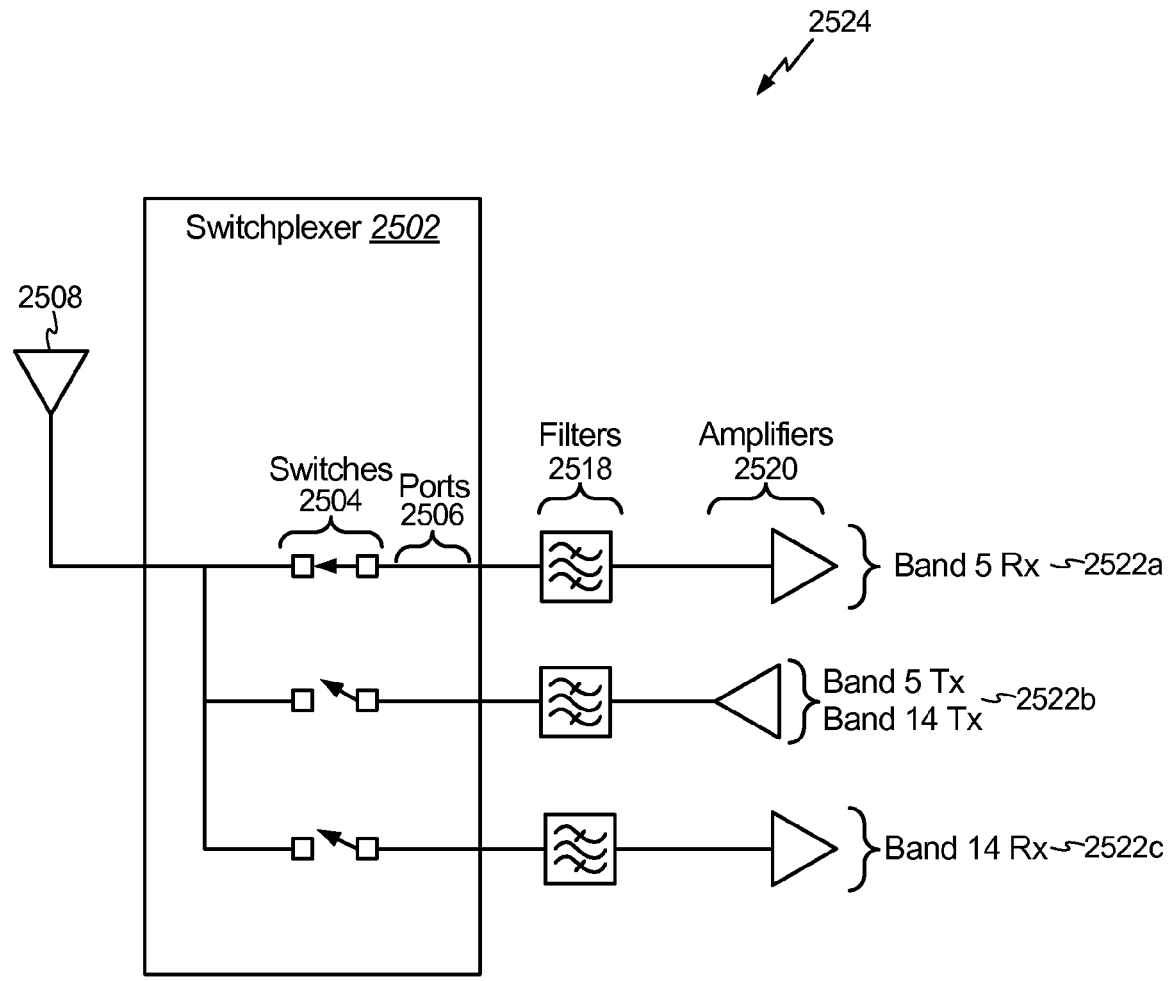
FIG. 25 is a block diagram illustrating another example of a radio frequency (RF) front end in accordance with the systems and methods disclosed herein.

FIG. 25 is a block diagram illustrating another example of a radio frequency (RF) front end 2524 in accordance with the systems and methods disclosed herein. In this example, an antenna 2508 is coupled to a switchplexer 2502. The switchplexer 2502 may include switches 2504 and ports 2506. One or more of the ports 2506 may be optionally and respectively coupled to one or more phase shifters (not shown). The switchplexer 2502, switches 2504 and ports 2506 illustrated in FIG. 25 may be configured similarly to the switchplexer 102, switches 104 and ports 106 described above in connection with FIG. 1. The switchplexer 2502 illustrated in FIG. 25 may include controlling circuitry that controls the switches (with switch signals) that is configured similarly to the controlling circuitry 110 described in connection with FIG. 1. The ports 2506 may be respectively coupled to filters 2518. The filters 2518 may be respectively coupled to amplifiers 2520. The switchplexer 2502 given in this example allows one or multiple switches 2504 to be concurrently closed (e.g., activated or turned "on"). This may enable signaling (e.g., communication) in one or more bands and/or modes corresponding to switches 2504 that are closed.

The first port 2506, first filter 2518 and first amplifier 2520 may support signals in Band 5 Rx 2522a. The second port 2506, second filter 2518 and second amplifier 2520 may support signals in Band 5 Tx and Band 14 Tx 2522b. The third port 2506, third filter 2518 and third amplifier 2520 may support signals in Band 14 Rx 2522c.

Table (14) below illustrates some switch states corresponding to modes that may be applied by the switchplexer 2502 in the example illustrated in FIG. 25. This example may support carrier aggregation. This approach may save a Band 14 amplifier (e.g., PA) and a transmit filter.

TABLE (14)

| First Switch | Second Switch | Third Switch | Mode |
|---|---|---|---|
| ON | OFF | OFF | GSM 850 Rx |
| ON | ON | OFF | UMTS Band 5 |
| OFF | ON | ON | Band 14 |

Figure 26:
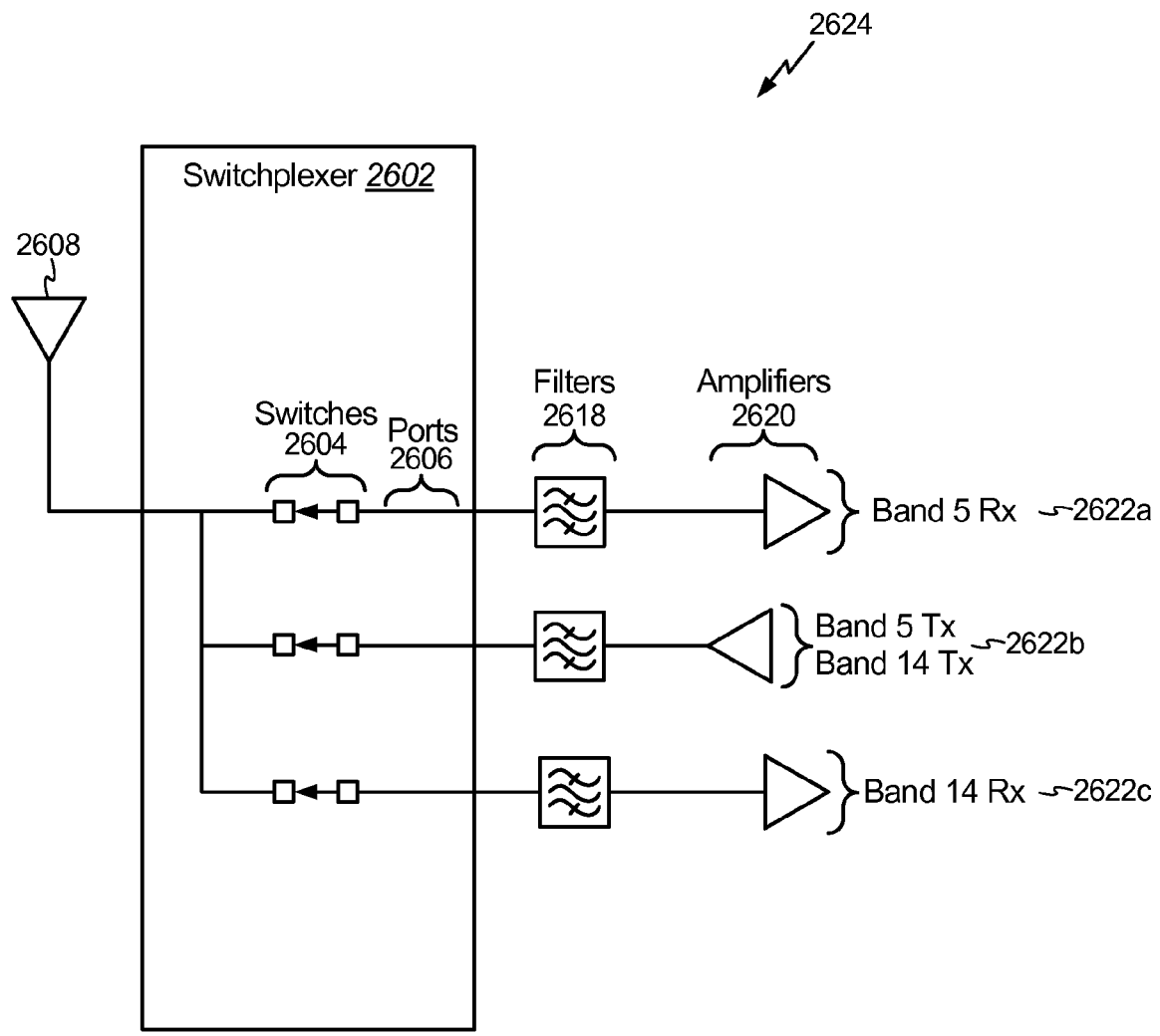
FIG. 26 is a block diagram illustrating another example of a radio frequency (RF) front end in accordance with the systems and methods disclosed herein.

FIG. 26 is a block diagram illustrating another example of a radio frequency (RF) front end 2624 in accordance with the systems and methods disclosed herein. In this example, an antenna 2608 is coupled to a switchplexer 2602. The switchplexer 2602 may include switches 2604 and ports 2606. One or more of the ports 2606 may be optionally and respectively coupled to one or more phase shifters (not shown). The switchplexer 2602, switches 2604 and ports 2606 illustrated in FIG. 26 may be configured similarly to the switchplexer 102, switches 104 and ports 106 described above in connection with FIG. 1. The switchplexer 2602 illustrated in FIG. 26 may include controlling circuitry that controls the switches (with switch signals) that is configured similarly to the controlling circuitry 110 described in connection with FIG. 1. The ports 2606 may be respectively coupled to filters 2618. The filters 2618 may be respectively coupled to amplifiers 2620. The switchplexer 2602 given in this example allows one or multiple switches 2604 to be concurrently closed (e.g., activated or turned "on"). This may enable signaling (e.g., communication) in one or more bands and/or modes corresponding to switches 2604 that are closed.

The first port 2606, first filter 2618 and first amplifier 2620 may support signals in Band 5 Rx 2622a. The second port 2606, second filter 2618 and second amplifier 2620 may support signals in Band 5 Tx and Band 14 Tx 2622b. The third port 2606, third filter 2618 and third amplifier 2620 may support signals in Band 14 Rx 2622c.

Table (15) below illustrates some switch states corresponding to modes that may be applied by the switchplexer 2602 in the example illustrated in FIG. 26. This example may support carrier aggregation. This approach may save a Band 14 amplifier (e.g., PA) and a transmit filter.

TABLE (15)

| First Switch | Second Switch | Third Switch | Mode |
|---|---|---|---|
| ON | OFF | OFF | GSM 850 Rx |
| ON | ON | OFF | UMTS Band 5 |
| OFF | ON | ON | Band 14 |
| ON | ON | ON | Band 5 & Band 14 Carrier Aggregation |

Figure 27:
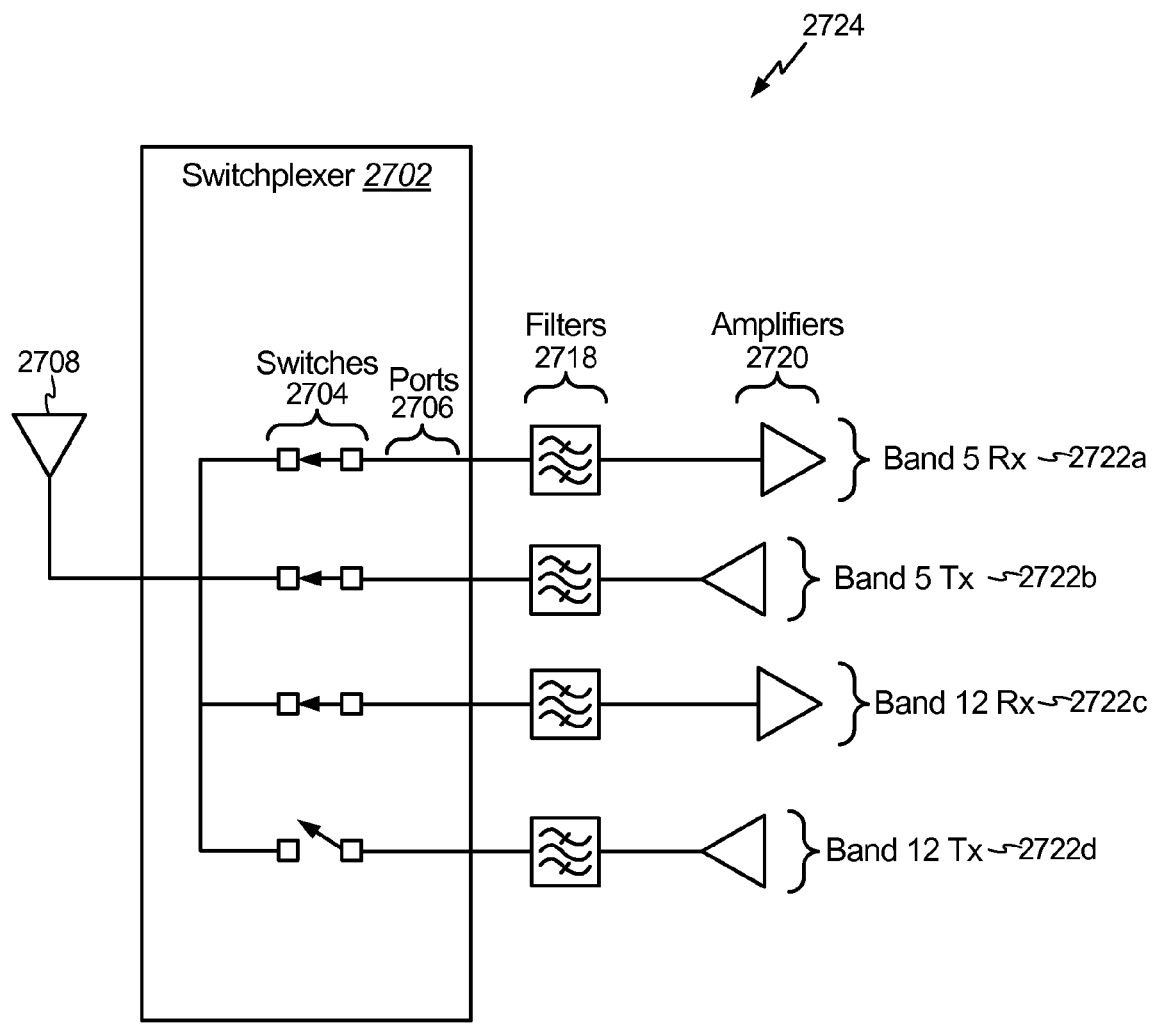
FIG. 27 is a block diagram illustrating another example of a radio frequency (RF) front end in accordance with the systems and methods disclosed herein.

FIG. 27 is a block diagram illustrating another example of a radio frequency (RF) front end 2724 in accordance with the systems and methods disclosed herein. In this example, an antenna 2708 is coupled to a switchplexer 2702. The switchplexer 2702 may include switches 2704 and ports 2706. One or more of the ports 2706 may be optionally and respectively coupled to one or more phase shifters (not shown). The switchplexer 2702, switches 2704 and ports 2706 illustrated in FIG. 27 may be configured similarly to the switchplexer 102, switches 104 and ports 106 described above in connection with FIG. 1. The switchplexer 2702 illustrated in FIG. 27 may include controlling circuitry that controls the switches (with switch signals) that is configured similarly to the controlling circuitry 110 described in connection with FIG. 1. The ports 2706 may be respectively coupled to filters 2718. The filters 2718 may be respectively coupled to amplifiers 2720. The switchplexer 2702 given in this example allows one or multiple switches 2704 to be concurrently closed (e.g., activated or turned "on"). This may enable signaling (e.g., communication) in one or more bands and/or modes corresponding to switches 2704 that are closed.

The first port 2706, first filter 2718 and first amplifier 2720 may support signals in Band 5 Rx 2722a. The second port 2706, second filter 2718 and second amplifier 2720 may support signals in Band 5 Tx 2722b. The third port 2706, third filter 2718 and third amplifier 2720 may support signals in Band 12 Rx 2722c. The fourth port 2706, fourth filter 2718 and fourth amplifier 2720 may support signals in Band 12 Tx 2722d.

Table (16) below illustrates some switch states corresponding to modes that may be applied by the switchplexer 2702 in the example illustrated in FIG. 27. This example may support carrier aggregation. This approach may provide lower Band 5 and Band 12 individual band insertion loss.

TABLE (16)

| First Switch | Second Switch | Third Switch | Fourth Switch | Mode |
|---|---|---|---|---|
| ON | ON | OFF | OFF | Band 5 |
| OFF | OFF | ON | ON | Band 12 |
| ON | ON | ON | OFF | Band 5 and Band 12 Rx |
| ON | OFF | ON | ON | Band 12 & Band 5 Rx |

Figure 28:
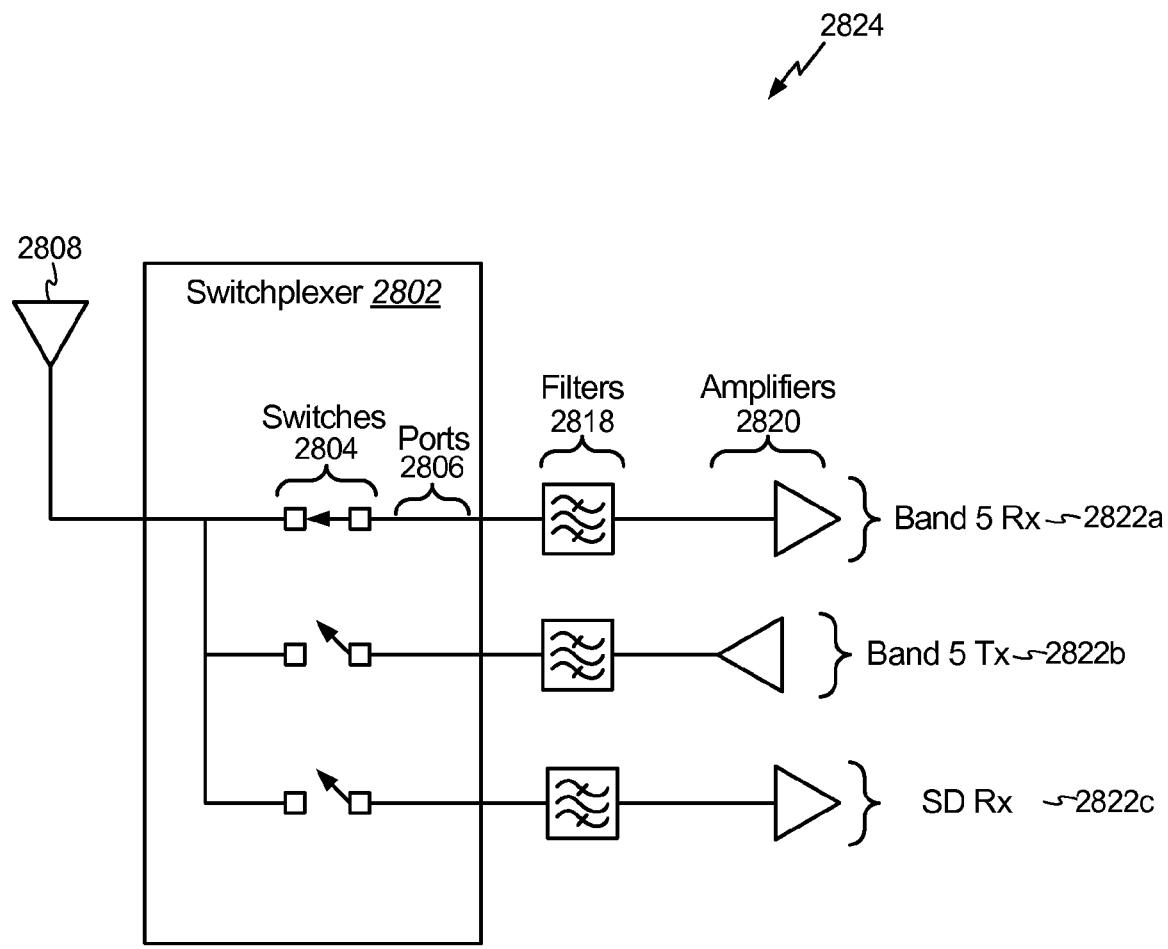
FIG. 28 is a block diagram illustrating another example of a radio frequency (RF) front end in accordance with the systems and methods disclosed herein.

FIG. 28 is a block diagram illustrating another example of a radio frequency (RF) front end 2824 in accordance with the systems and methods disclosed herein. In this example, an antenna 2808 is coupled to a switchplexer 2802. The switchplexer 2802 may include switches 2804 and ports 2806. One or more of the ports 2806 may be optionally and respectively coupled to one or more phase shifters (not shown). The switchplexer 2802, switches 2804 and ports 2806 illustrated in FIG. 28 may be configured similarly to the switchplexer 102, switches 104 and ports 106 described above in connection with FIG. 1. The switchplexer 2802 illustrated in FIG. 28 may include controlling circuitry that controls the switches (with switch signals) that is configured similarly to the controlling circuitry 110 described in connection with FIG. 1. The ports 2806 may be respectively coupled to filters 2818. The filters 2818 may be respectively coupled to amplifiers 2820. The switchplexer 2802 given in this example allows one or multiple switches 2804 to be concurrently closed (e.g., activated or turned "on"). This may enable signaling (e.g., communication) in one or more bands and/or modes corresponding to switches 2804 that are closed.

The first port 2806, first filter 2818 and first amplifier 2820 may support signals in Band 5 Rx 2822a. The second port 2806, second filter 2818 and second amplifier 2820 may support signals in Band 5 Tx 2822b. The third port 2806, third filter 2818 and third amplifier 2820 may support signals in supplemental downlink Rx 2822c.

Table (17) below illustrates some switch states corresponding to modes that may be applied by the switchplexer 2802 in the example illustrated in FIG. 28. This example may support carrier aggregation. This approach may provide lower insertion loss for Band 5.

TABLE (17)

| First Switch | Second Switch | Third Switch | Mode |
|---|---|---|---|
| ON | ON | OFF | Band 5 |
| OFF | OFF | ON | Band 12 |
| ON | ON | ON | Band 5 and Band 12 Rx |
| ON | OFF | ON | Band 12 & Band 5 Rx |

Figure 29:
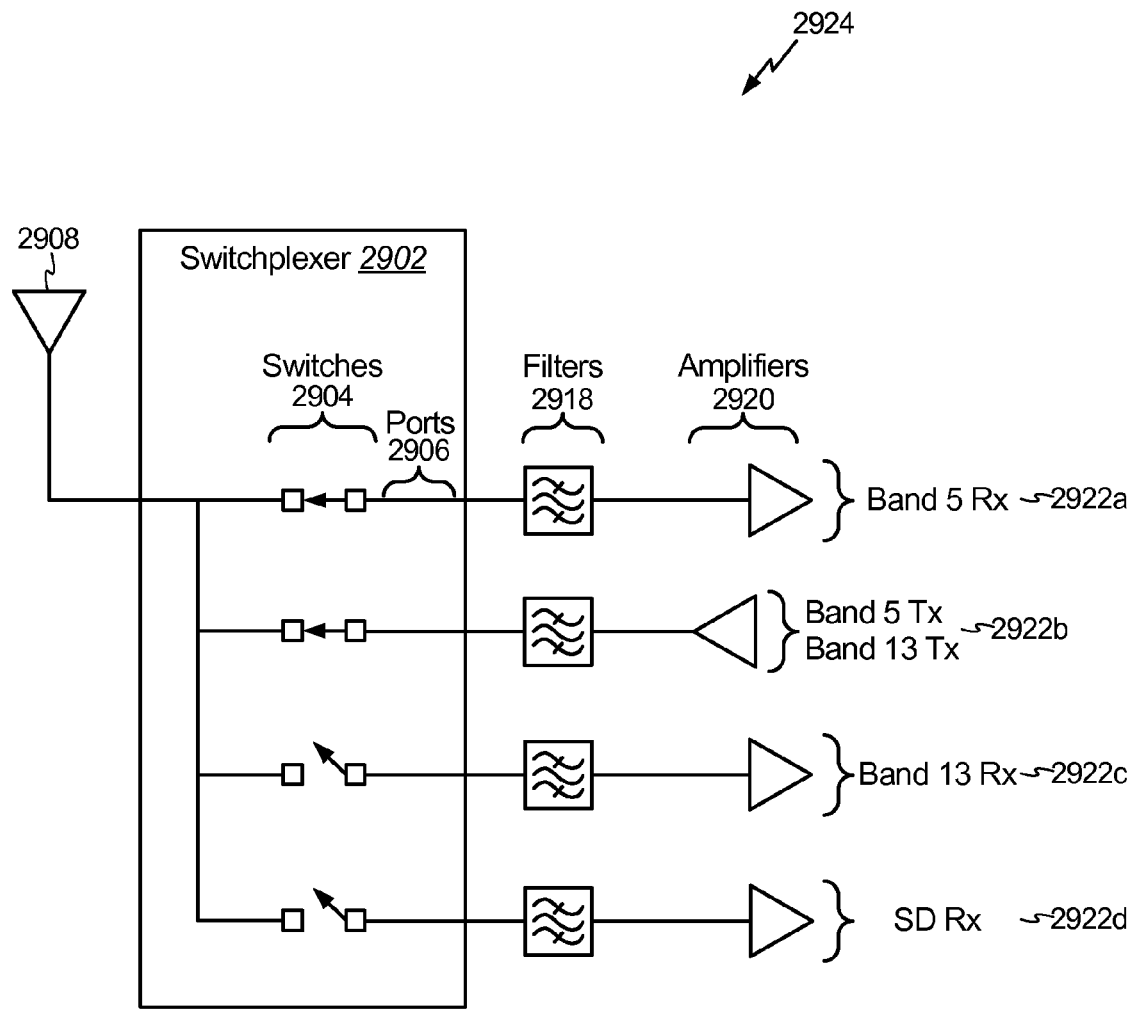
FIG. 29 is a block diagram illustrating another example of a radio frequency (RF) front end in accordance with the systems and methods disclosed herein.

FIG. 29 is a block diagram illustrating another example of a radio frequency (RF) front end 2924 in accordance with the systems and methods disclosed herein. In this example, an antenna 2908 is coupled to a switchplexer 2902. The switchplexer 2902 may include switches 2904 and ports 2906. One or more of the ports 2906 may be optionally and respectively coupled to one or more phase shifters (not shown). The switchplexer 2902, switches 2904 and ports 2906 illustrated in FIG. 29 may be configured similarly to the switchplexer 102, switches 104 and ports 106 described above in connection with FIG. 1. The switchplexer 2902 illustrated in FIG. 29 may include controlling circuitry that controls the switches (with switch signals) that is configured similarly to the controlling circuitry 110 described in connection with FIG. 1. The ports 2906 may be respectively coupled to filters 2918. The filters 2918 may be respectively coupled to amplifiers 2920. The switchplexer 2902 given in this example allows one or multiple switches 2904 to be concurrently closed (e.g., activated or turned "on"). This may enable signaling (e.g., communication) in one or more bands and/or modes corresponding to switches 2904 that are closed.

The first port 2906, first filter 2918 and first amplifier 2920 may support signals in Band 5 Rx 2922a. The second port 2906, second filter 2918 and second amplifier 2920 may support signals in Band 5 Tx and Band 13 Tx 2922b. The third port 2906, third filter 2918 and third amplifier 2920 may support signals in Band 13 Rx 2922c. The fourth port 2906, fourth filter 2918 and fourth amplifier 2920 may support signals in supplemental downlink Rx 2922d.

Table (18) below illustrates some switch states corresponding to modes that may be applied by the switchplexer 2902 in the example illustrated in FIG. 29. This example may support carrier aggregation.

TABLE (18)

| First Switch | Second Switch | Third Switch | Fourth Switch | Mode |
|---|---|---|---|---|
| ON | ON | OFF | OFF | Band 5 |
| OFF | ON | ON | OFF | Band 13 |
| ON | ON | OFF | ON | Band 5 and supplemental downlink Rx |
| OFF | ON | ON | ON | Band 13 & supplemental downlink Rx |

Figure 30:
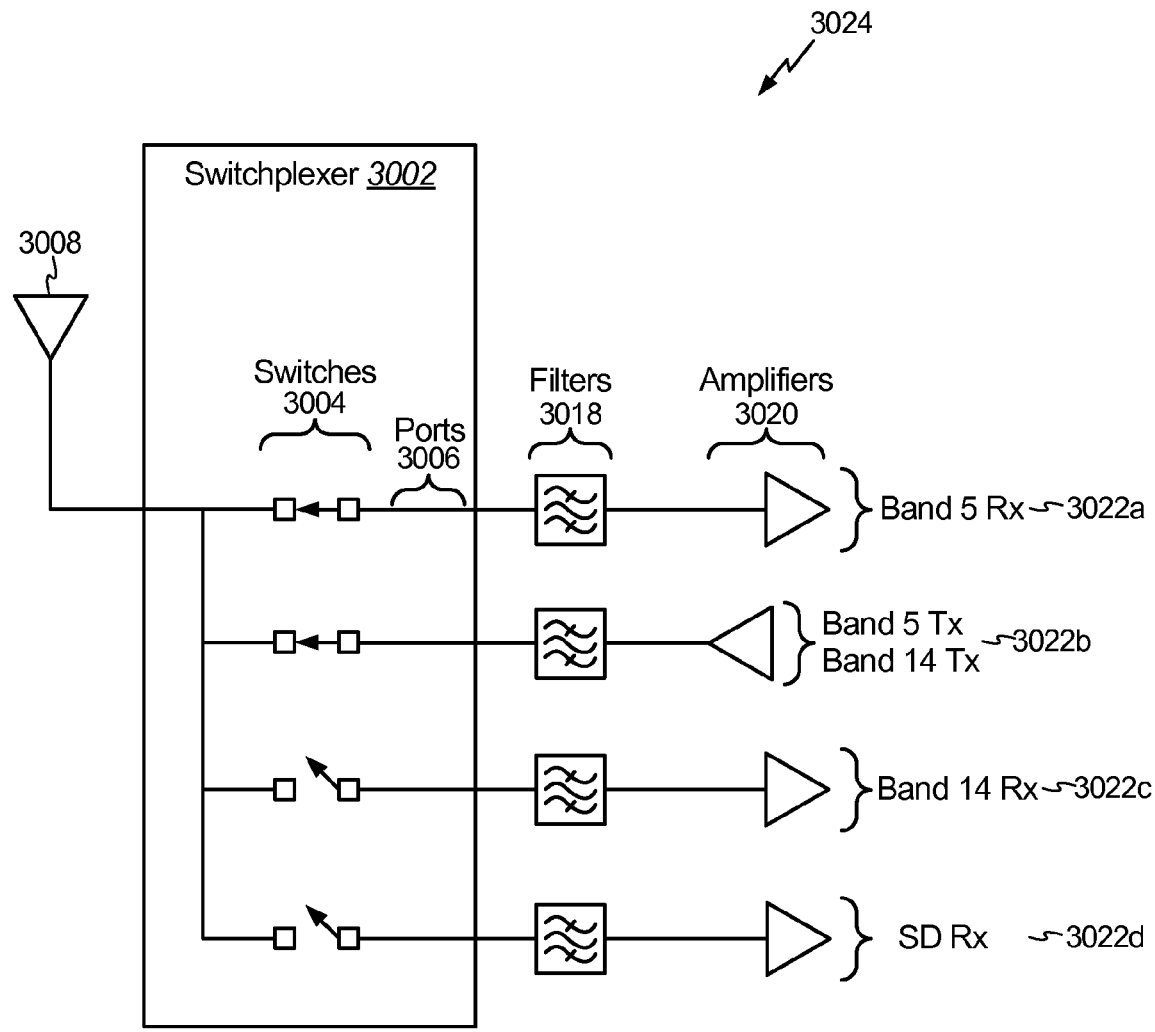
FIG. 30 is a block diagram illustrating another example of a radio frequency (RF) front end in accordance with the systems and methods disclosed herein.

FIG. 30 is a block diagram illustrating another example of a radio frequency (RF) front end 3024 in accordance with the systems and methods disclosed herein. In this example, an antenna 3008 is coupled to a switchplexer 3002. The switchplexer 3002 may include switches 3004 and ports 3006. One or more of the ports 3006 may be optionally and respectively coupled to one or more phase shifters (not shown). The switchplexer 3002, switches 3004 and ports 3006 illustrated in FIG. 30 may be configured similarly to the switchplexer 102, switches 104 and ports 106 described above in connection with FIG. 1. The switchplexer 3002 illustrated in FIG. 30 may include controlling circuitry that controls the switches (with switch signals) that is configured similarly to the controlling circuitry 110 described in connection with FIG. 1. The ports 3006 may be respectively coupled to filters 3018. The filters 3018 may be respectively coupled to amplifiers 3020. The switchplexer 3002 given in this example allows one or multiple switches 3004 to be concurrently closed (e.g., activated or turned "on"). This may enable signaling (e.g., communication) in one or more bands and/or modes corresponding to switches 3004 that are closed.

The first port 3006, first filter 3018 and first amplifier 3020 may support signals in Band 5 Rx 3022a. The second port 3006, second filter 3018 and second amplifier 3020 may support signals in Band 5 Tx and Band 14 Tx 3022b. The third port 3006, third filter 3018 and third amplifier 3020 may support signals in Band 14 Rx 3022c. The fourth port 3006, fourth filter 3018 and fourth amplifier 3020 may support signals in supplemental downlink Rx 3022d.

Table (19) below illustrates some switch states corresponding to modes that may be applied by the switchplexer 3002 in the example illustrated in FIG. 30. This example may support carrier aggregation.

TABLE (19)

| First Switch | Second Switch | Third Switch | Fourth Switch | Mode |
|---|---|---|---|---|
| ON | ON | OFF | OFF | Band 5 |
| OFF | ON | ON | OFF | Band 14 |
| ON | ON | OFF | ON | Band 5 and supplemental downlink Rx |
| OFF | ON | ON | ON | Band 14 & supplemental downlink Rx |

Figure 31:
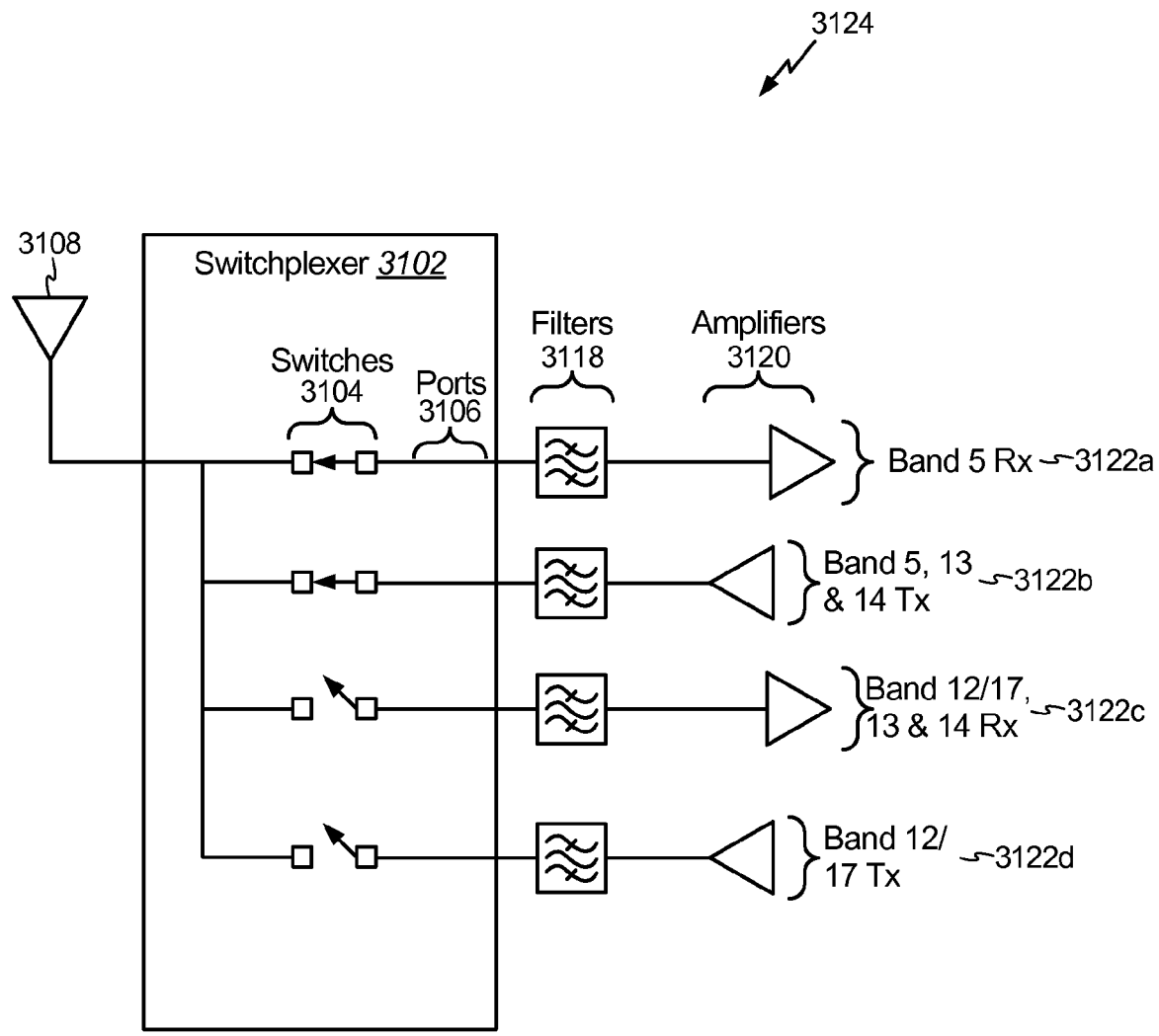
FIG. 31 is a block diagram illustrating another example of a radio frequency (RF) front end in accordance with the systems and methods disclosed herein.

FIG. 31 is a block diagram illustrating another example of a radio frequency (RF) front end 3124 in accordance with the systems and methods disclosed herein. In this example, an antenna 3108 is coupled to a switchplexer 3102. The switchplexer 3102 may include switches 3104 and ports 3106. One or more of the ports 3106 may be optionally and respectively coupled to one or more phase shifters (not shown). The switchplexer 3102, switches 3104 and ports 3106 illustrated in FIG. 31 may be configured similarly to the switchplexer 102, switches 104 and ports 106 described above in connection with FIG. 1. The switchplexer 3102 illustrated in FIG. 31 may include controlling circuitry that controls the switches (with switch signals) that is configured similarly to the controlling circuitry 110 described in connection with FIG. 1. The ports 3106 may be respectively coupled to filters 3118. The filters 3118 may be respectively coupled to amplifiers 3120. The switchplexer 3102 given in this example allows one or multiple switches 3104 to be concurrently closed (e.g., activated or turned "on"). This may enable signaling (e.g., communication) in one or more bands and/or modes corresponding to switches 3104 that are closed.

The first port 3106, first filter 3118 and first amplifier 3120 may support signals in Band 5 Rx 3122a. The second port 3106, second filter 3118 and second amplifier 3120 may support signals in Band 5 Tx, Band 13 Tx and Band 14 Tx 3122b. The third port 3106, third filter 3118 and third amplifier 3120 may support signals in Band 12 or 17 Rx, Band 13 Rx and Band 14 Rx 3122c. The fourth port 3106, fourth filter 3118 and fourth amplifier 3120 may support signals in Band 12 or 17 Tx 3122d.

Table (20) below illustrates some switch states corresponding to modes that may be applied by the switchplexer 3102 in the example illustrated in FIG. 31. This example may support carrier aggregation.

TABLE (20)

| First Switch | Second Switch | Third Switch | Fourth Switch | Mode |
|---|---|---|---|---|
| ON | ON | OFF | OFF | Band 5 |
| OFF | ON | ON | OFF | Band 13 & 14 |
| ON | ON | ON | OFF | Band 5 with Band 12/17, 13 & 14 Carrier Aggregation |
| OFF | OFF | ON | ON | Band 12/17 |
| OFF | ON | ON | ON | Band 12/17 with Band 5 Carrier Aggregation |

Figure 32:
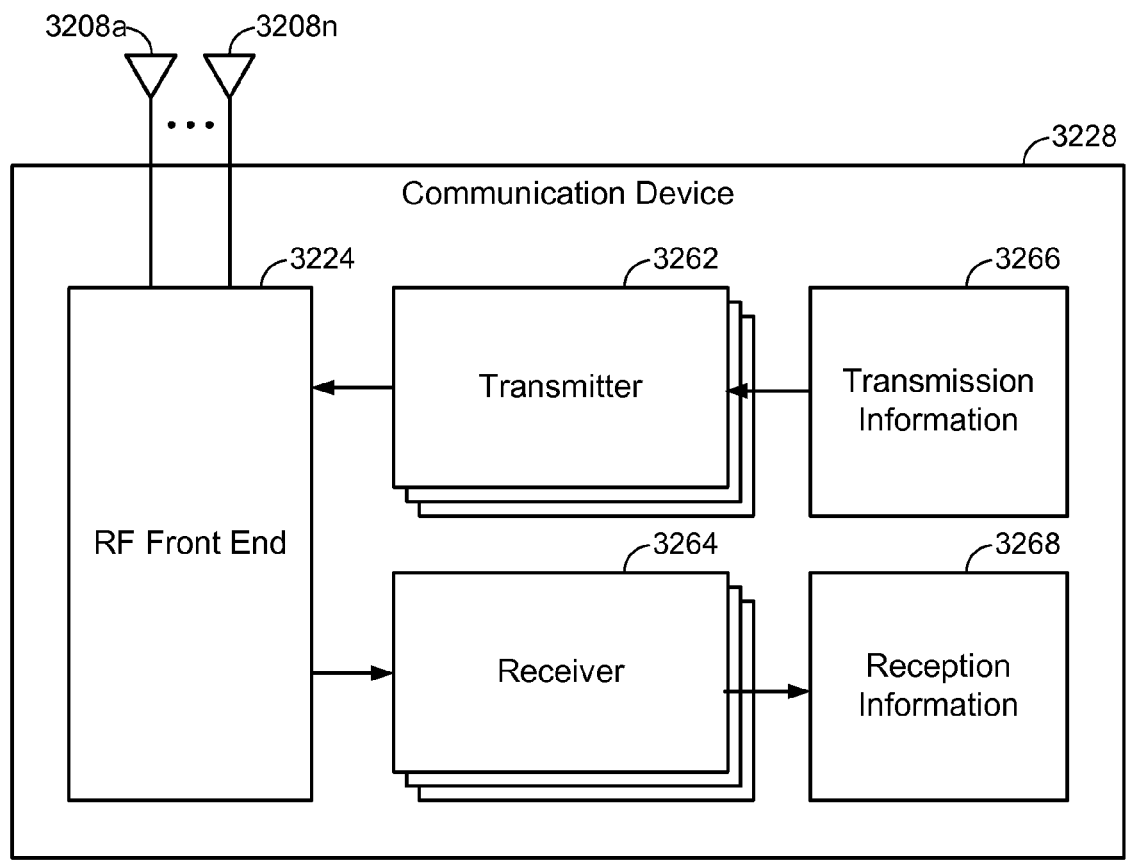
FIG. 32 is a block diagram illustrating one configuration of a communication device in which systems and methods for switching an antenna may be implemented.

FIG. 32 is a block diagram illustrating one configuration of a communication device 3228 in which systems and methods for switching an antenna may be implemented. Examples of communication devices 3228 include wireless communication devices (e.g., cellular phones, smartphones, mobile devices, wireless network cards, wireless modems, etc.), base stations, access points, access terminals, etc. The communication device 3228 may include one or more antennas 3208a-n, a radio frequency (RF) front end 3224, one or more transmitters 3262 (e.g., transmit chains), one or more receivers 3264 (e.g., receive chains), transmission information 3266 and reception information 3268. It should be noted that one or more additional modules not illustrated in FIG. 32 may be included. For example, one or more transmit paths (from transmission information to the RF front end 3224) may include one or more encoders and one or more modulators. Additionally or alternatively, one or more receive paths (from the RF front end 3224 to the reception information) may include one or more demodulators and one or more decoders.

The RF front end 3224 may be coupled to the one or more antennas 3208a-n, to the one or more transmitters 3262 and to the one or more receivers 3264. The RF front end 3224 may be configured similarly to, may include one or more of the devices or circuitries and/or may provide functionality described in one or more of FIGS. 1-31. For example, any of the ports that support transmit signals described above may be coupled to a transmitter 3262 (e.g., transmit chain) and any of the ports that support receive signals described above may be coupled to a receiver 3264.

The transmission information 3266 may be provided to the one or more transmitters (for upconversion, for example), which may provide one or more transmit signals to the RF front end 3224. The RF front end 3224 may amplify, filter and provide the transmit signal(s) to the one or more antennas 3208a-n in accordance with the description above. The RF front end 3224 may obtain one or more receive signals from one or more of the antennas 3208a-n. The RF front end 3224 may amplify, filter and provide the receive signal(s) (for downconversion) to the one or more receivers 3264. The one or more receivers 3264 may translate the receive signal(s) into reception information 3268.

Figure 33:
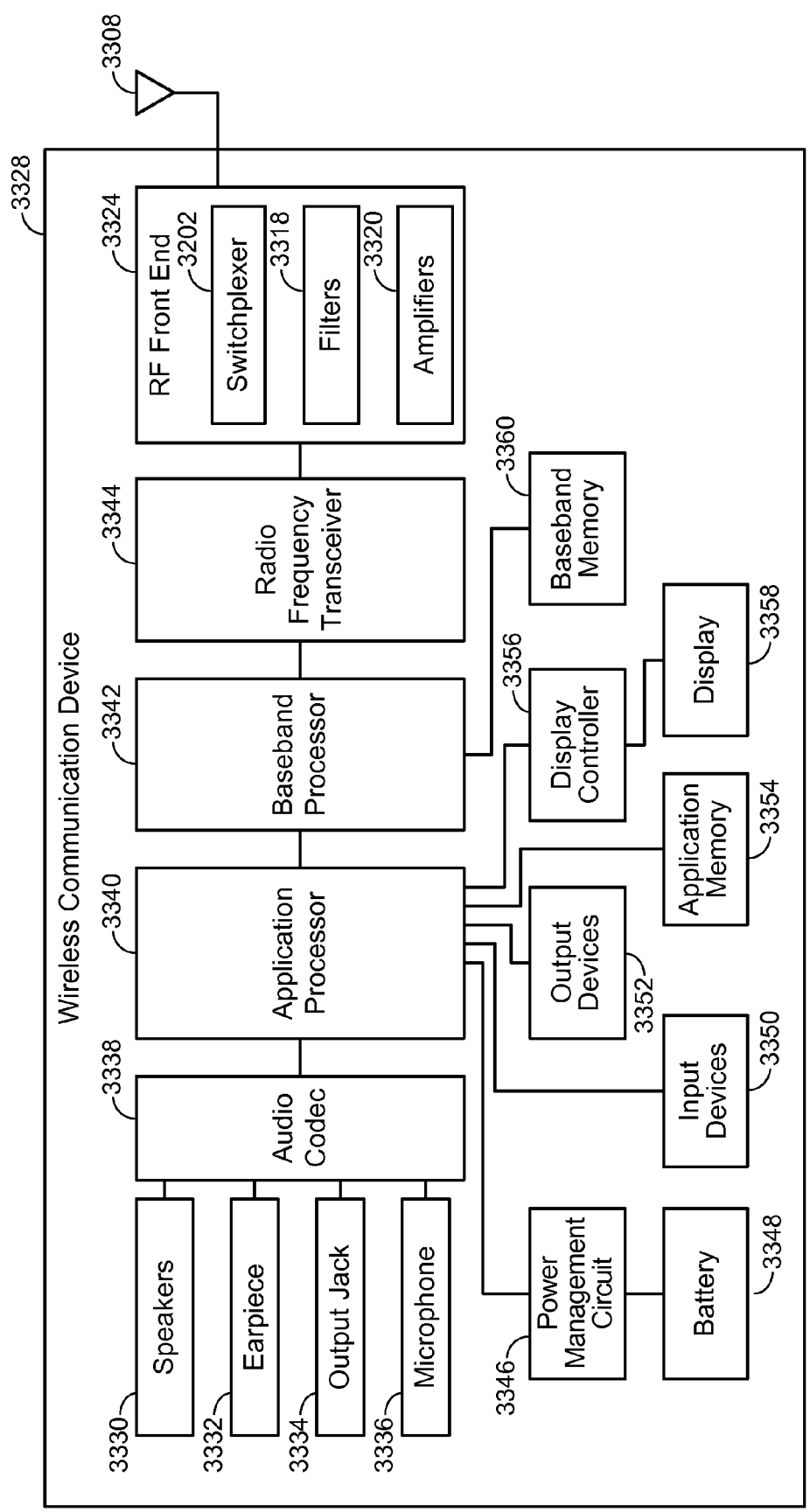
FIG. 33 is a block diagram illustrating one configuration of a wireless communication device in which systems and methods for switching an antenna may be implemented.

FIG. 33 is a block diagram illustrating one configuration of a wireless communication device 3328 in which systems and methods for switching an antenna may be implemented. The wireless communication device 3328 may be one example of the communication device 3228 described above. The wireless communication device 3328 may include an application processor 3340. The application processor 3340 generally processes instructions (e.g., runs programs) to perform functions on the wireless communication device 3328. The application processor 3340 may be coupled to an audio coder/decoder (codec) 3338.

The audio codec 3338 may be an electronic device (e.g., integrated circuit) used for coding and/or decoding audio signals. The audio codec 3338 may be coupled to one or more speakers 3330, an earpiece 3332, an output jack 3334 and/or one or more microphones 3336. The speakers 3330 may include one or more electro-acoustic transducers that convert electrical or electronic signals into acoustic signals. For example, the speakers 3330 may be used to play music or output a speakerphone conversation, etc. The earpiece 3332 may be another speaker or electro-acoustic transducer that can be used to output acoustic signals (e.g., speech signals) to a user. For example, the earpiece 3332 may be used such that only a user may reliably hear the acoustic signal. The output jack 3334 may be used for coupling other devices to the wireless communication device 3328 for outputting audio, such as headphones. The speakers 3330, earpiece 3332 and/or output jack 3334 may generally be used for outputting an audio signal from the audio codec 3338. The one or more microphones 3336 may be one or more acousto-electric transducers that convert an acoustic signal (such as a user's voice) into electrical or electronic signals that are provided to the audio codec 3338.

The application processor 3340 may also be coupled to a power management circuit 3346. One example of the power management circuit 3346 is a power management integrated circuit (PMIC), which may be used to manage the electrical power consumption of the wireless communication device 3328. The power management circuit 3346 may be coupled to a battery 3348. The battery 3348 may generally provide electrical power to the wireless communication device 3328.

The application processor 3340 may be coupled to one or more input devices 3350 for receiving input. Examples of input devices 3350 include infrared sensors, image sensors, accelerometers, touch sensors, keypads, etc. The input devices 3350 may allow user interaction with the wireless communication device 3328. The application processor 3340 may also be coupled to one or more output devices 3352. Examples of output devices 3352 include printers, projectors, screens, haptic devices, etc. The output devices 3352 may allow the wireless communication device 3328 to produce output that may be experienced by a user.

The application processor 3340 may be coupled to application memory 3354. The application memory 3354 may be any electronic device that is capable of storing electronic information. Examples of application memory 3354 include double data rate synchronous dynamic random access memory (DDRAM), synchronous dynamic random access memory (SDRAM), flash memory, etc. The application memory 3354 may provide storage for the application processor 3340. For instance, the application memory 3354 may store data and/or instructions for the functioning of programs that are run on the application processor 3340.

The application processor 3340 may be coupled to a display controller 3356, which in turn may be coupled to a display 3358. The display controller 3356 may be a hardware block that is used to generate images on the display 3358. For example, the display controller 3356 may translate instructions and/or data from the application processor 3340 into images that can be presented on the display 3358. Examples of the display 3358 include liquid crystal display (LCD) panels, light emitting diode (LED) panels, cathode ray tube (CRT) displays, plasma displays, etc.

The application processor 3340 may be coupled to a baseband processor 3342. The baseband processor 3342 generally processes communication signals. For example, the baseband processor 3342 may demodulate and/or decode received signals. Additionally or alternatively, the baseband processor 3342 may encode and/or modulate signals in preparation for transmission.

The baseband processor 3342 may be coupled to baseband memory 3360. The baseband memory 3360 may be any electronic device capable of storing electronic information, such as SDRAM, DDRAM, flash memory, etc. The baseband processor 3342 may read information (e.g., instructions and/or data) from and/or write information to the baseband memory 3360. Additionally or alternatively, the baseband processor 3342 may use instructions and/or data stored in the baseband memory 3360 to perform communication operations.

The baseband processor 3342 may be coupled to a radio frequency (RF) transceiver 3344. The RF transceiver 3344 may be coupled to an RF front end 3324 and one or more antennas 3308. The RF transceiver 3344 may transmit and/or receive radio frequency signals. For example, the RF transceiver 3344 may transmit an RF signal using an RF front end 3324 and one or more antennas 3308. The RF transceiver 3344 may also receive RF signals using the one or more antennas 3308 and the RF front end 3324.

The RF front end 3324 may be configured similarly to, may include one or more of the devices or circuitries and/or may provide functionality described in one or more of FIGS. 1-31. For example, the RF front end 3324 may include a switchplexer 3302, filters 3318 and/or amplifiers 3320, which may be configured similarly to one or more of the switchplexers, filters and/or amplifiers described above.

Figure 34:
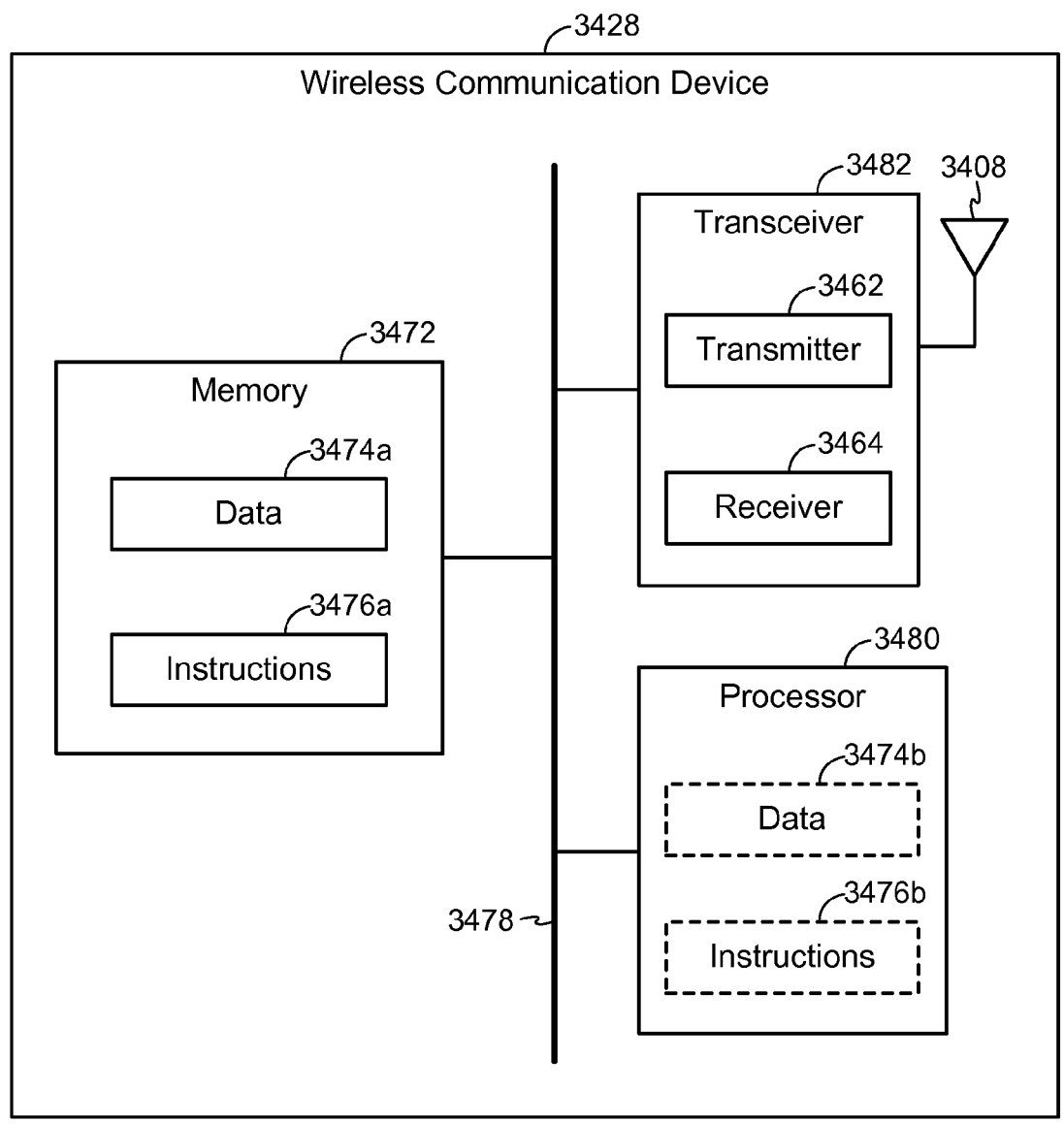
FIG. 34 illustrates certain components that may be included within a wireless communication device.

FIG. 34 illustrates certain components that may be included within a wireless communication device 3428. The wireless communication device 3428 that is shown in FIG. 34 may include one or more of the devices or circuitries and/or may provide functionality described in one or more of FIGS. 1-33. The wireless communication device 3428 includes a processor 3480. The processor 3480 may be a general purpose single- or multi-chip microprocessor (e.g., an ARM), a special purpose microprocessor (e.g., a digital signal processor (DSP)), a microcontroller, a programmable gate array, etc. The processor 3480 may be referred to as a central processing unit (CPU). Although just a single processor 3480 is shown in the wireless communication device 3428 of FIG. 34, in an alternative configuration, a combination of processors (e.g., an ARM and DSP) could be used.

The wireless communication device 3428 also includes memory 3472 in electronic communication with the processor 3480 (i.e., the processor 3480 can read information from and/or write information to the memory 3472). The memory 3472 may be any electronic component capable of storing electronic information. The memory 3472 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 3474a and instructions 3476a may be stored in the memory 3472. The instructions 3476a may include one or more programs, routines, sub-routines, functions, procedures, etc. The instructions 3476a may include a single computer-readable statement or many computer-readable statements. The instructions 3476a may be executable by the processor 3480 to implement one or more of the methods that were described above. Executing the instructions 3476a may involve the use of the data 3474a that is stored in the memory 3472. FIG. 34 shows some instructions 3476b and data 3474b being loaded into the processor 3480. The instructions 3476a may be executable by the processor 3480 to perform one or more of the methods 200, 500, 900 described above.

The wireless communication device 3428 may also include a transmitter 3462 and a receiver 3464 to allow transmission and reception of signals between the wireless communication device 3428 and a remote location (e.g., a base station or other wireless communication device). The transmitter 3462 and receiver 3464 may be collectively referred to as a transceiver 3482. An antenna 3408 may be electrically coupled to the transceiver 3482. The wireless communication device 3428 may also include (not shown) multiple transmitters, multiple receivers, multiple transceivers and/or multiple antenna.

The various components of the wireless communication device 3428 may be coupled together by one or more buses, which may include a power bus, a control signal bus, a status signal bus, a data bus, etc. For simplicity, the various buses are illustrated in FIG. 34 as a bus system 3478.

Figure 35:
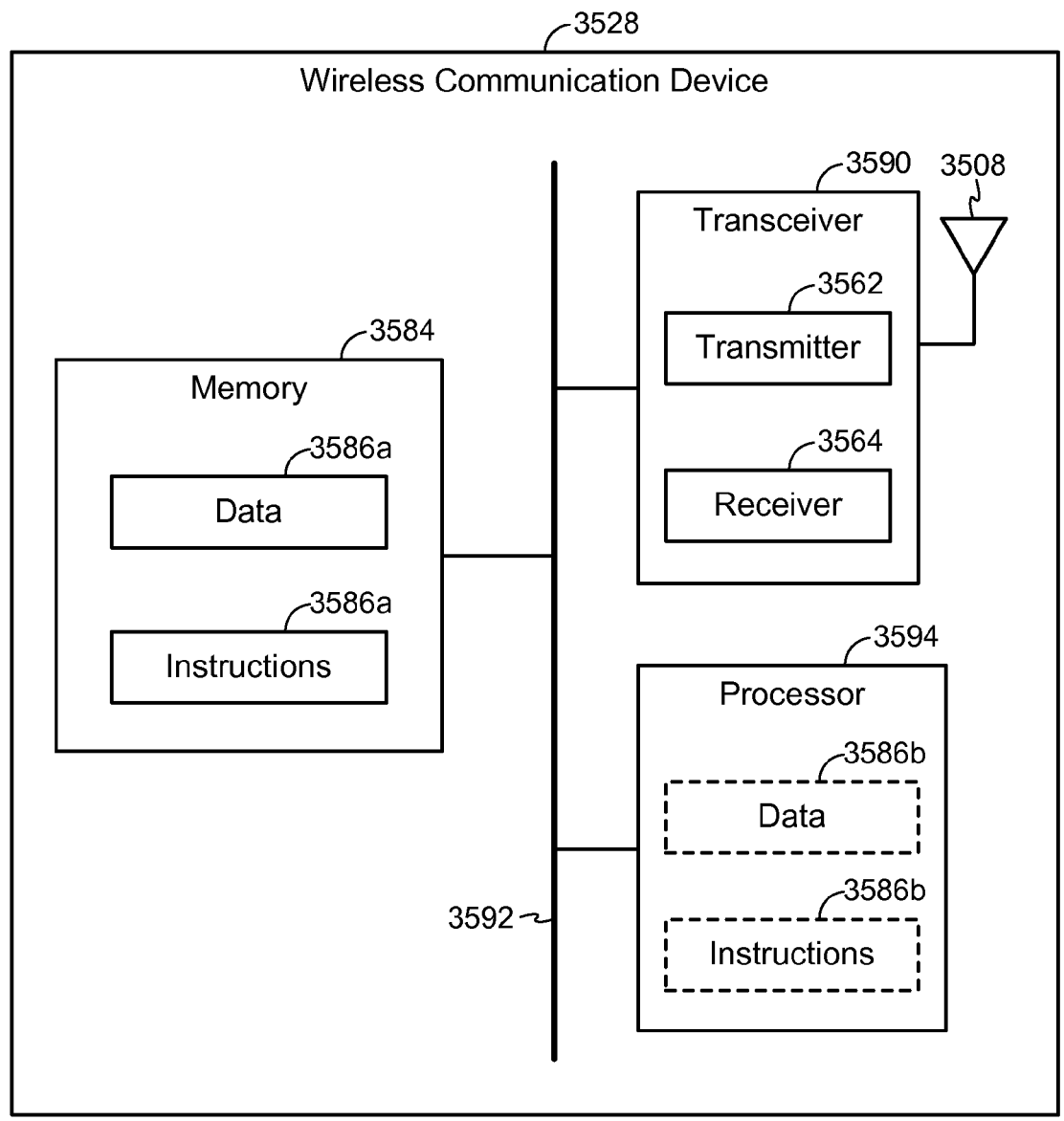
FIG. 35 illustrates certain components that may be included within a base station.

FIG. 35 illustrates certain components that may be included within a base station 3528. The base station 3528 that is shown in FIG. 35 may include one or more of the devices or circuitries and/or may provide functionality described in one or more of FIGS. 1-32. The base station 3528 includes a processor 3594. The processor 3594 may be a general purpose single- or multi-chip microprocessor (e.g., an ARM), a special purpose microprocessor (e.g., a digital signal processor (DSP)), a microcontroller, a programmable gate array, etc. The processor 3594 may be referred to as a central processing unit (CPU). Although just a single processor 3594 is shown in the base station 3528 of FIG. 35, in an alternative configuration, a combination of processors (e.g., an ARM and DSP) could be used.

The base station 3528 also includes memory 3584 in electronic communication with the processor 3594 (i.e., the processor 3594 can read information from and/or write information to the memory 3584). The memory 3584 may be any electronic component capable of storing electronic information. The memory 3584 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 3586a and instructions 3588a may be stored in the memory 3584. The instructions 3588a may include one or more programs, routines, sub-routines, functions, procedures, etc. The instructions 3588a may include a single computer-readable statement or many computer-readable statements. The instructions 3588a may be executable by the processor 3594. Executing the instructions 3588a may involve the use of the data 3586a that is stored in the memory 3584. FIG. 35 shows some instructions 3588b and data 3586b being loaded into the processor 3594. The instructions 3588a may be executable by the processor 3594 to perform one or more of the methods 200, 500, 900 described above.

The base station 3528 may also include a transmitter 3562 and a receiver 3564 to allow transmission and reception of signals between the base station 3528 and a remote location (e.g., a wireless communication device). The transmitter 3562 and receiver 3564 may be collectively referred to as a transceiver 3590. An antenna 3508 may be electrically coupled to the transceiver 3590. The base station 3528 may also include (not shown) multiple transmitters, multiple receivers, multiple transceivers and/or multiple antenna.

The various components of the base station 3528 may be coupled together by one or more buses, which may include a power bus, a control signal bus, a status signal bus, a data bus, etc. For simplicity, the various buses are illustrated in FIG. 35 as a bus system 3592.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A switchplexer, comprising:
   switches that are coupled to an antenna;
   ports, wherein each of the switches is separately coupled to one of the ports; and
   controlling circuitry coupled to the switches, wherein the controlling circuitry concurrently closes at least two of the switches when indicated by a control signal.

2. The switchplexer of claim 1, wherein the switches are only coupled to a single antenna.

3. The switchplexer of claim 1, wherein at least one of the ports is coupled to a phase shifter.

4. The switchplexer of claim 1, further comprising a separate set of switches coupled to another antenna and to the controlling circuitry.

5. The switchplexer of claim 1, wherein each of the ports is coupled to one of a plurality of filters.

6. The switchplexer of claim 1, wherein a transmit filter is coupled to one of the ports and a receive filter coupled to another of the ports, wherein the transmit filter and the receive filter are independently linkable to the antenna.

7. The switchplexer of claim 6, wherein the receive filter is a multiple mode receive filter.

8. The switchplexer of claim 1, wherein the ports are not coupled to a duplexer.

9. The switchplexer of claim 1, wherein a first port of the ports is coupled to a receive filter and a second port of the ports is coupled to a transmit filter and switches corresponding to the ports are closed to enable concurrent transmission and reception.

10. The switchplexer of claim 1, wherein the controlling circuitry concurrently closes at least two of the switches corresponding to at least two of the ports that support codirectional signals when indicated by the control signal.

11. The switchplexer of claim 10, wherein the ports are not coupled to a diplexer.

12. The switchplexer of claim 10, wherein the codirectional signals are receive signals in different bands to enable carrier aggregation.

13. The switchplexer of claim 1, wherein each of the ports supports signals in one or more bands corresponding to at least one of the group consisting of: Global System for Mobile Communications (GSM), Code Division Multiple Access (CDMA), Wideband Code Division Multiple Access (WCDMA), Universal Mobile Telecommunications System (UMTS), Long Term Evolution (LTE), Time Division Synchronous Code Division Multiple Access (TD-SCDMA), wireless personal area network (PAN) and Institute of Electrical and Electronics Engineers (IEEE) 802.11 specifications.

14. The switchplexer of claim 1, wherein the ports support concurrent wireless communication with two or more different wireless systems.

15. A method for switching an antenna, comprising:
obtaining a control signal;
generating switch signals based on the control signal; and
controlling switches that are coupled to an antenna based on the switch signals, wherein each of the switches is separately coupled to one of multiple ports, and wherein the switch signals concurrently close at least two of the switches when indicated by the control signal.

16. The method of claim 15, wherein the switches are only coupled to a single antenna.

17. The method of claim 15, wherein at least one of the ports is coupled to a phase shifter.

18. The method of claim 15, further comprising controlling a separate set of switches that is coupled to another antenna.

19. The method of claim 15, wherein each of the ports is coupled to one of a plurality of filters.

20. The method of claim 15, wherein a transmit filter is coupled to one of the ports and a receive filter coupled to another of the ports, wherein the transmit filter and the receive filter are independently linkable to the antenna.

21. The method of claim 20, wherein the receive filter is a multiple mode receive filter.

22. The method of claim 15, wherein the ports are not coupled to a duplexer.

23. The method of claim 15, wherein a first port of the ports is coupled to a receive filter and a second port of the ports is coupled to a transmit filter and switches corresponding to the ports are closed to enable concurrent transmission and reception.

24. The method of claim 15, wherein the switch signals concurrently close at least two of the switches corresponding to at least two of the ports that support codirectional signals when indicated by the control signal.

25. The method of claim 24, wherein the ports are not coupled to a diplexer.

26. The method of claim 24, wherein the codirectional signals are receive signals in different bands to enable carrier aggregation.

27. The method of claim 15, wherein each of the ports supports signals in one or more bands corresponding to at least one of the group consisting of: Global System for Mobile Communications (GSM), Code Division Multiple Access (CDMA), Wideband Code Division Multiple Access (WCDMA), Universal Mobile Telecommunications System (UMTS)), Long Term Evolution (LTE), Time Division Synchronous Code Division Multiple Access (TD-SCDMA), wireless personal area network (PAN) and Institute of Electrical and Electronics Engineers (IEEE) 802.11 specifications.

28. The method of claim 15, wherein the ports support concurrent wireless communication with two or more different wireless systems.

29. An apparatus for switching an antenna, comprising:
means for obtaining a control signal;
means for generating switch signals based on the control signal; and
means for controlling switches that are coupled to an antenna based on the switch signals, wherein each of the switches is separately coupled to one of multiple ports, and wherein the means for controlling switches concurrently closes at least two of the switches when indicated by the control signal.

30. The apparatus of claim 29, further comprising means for controlling a separate set of switches that is coupled to another antenna.

31. The apparatus of claim 29, wherein a transmit filter is coupled to one of the ports and a receive filter coupled to another of the ports, wherein the transmit filter and the receive filter are independently linkable to the antenna.

32. The apparatus of claim 31, wherein the receive filter is a multiple mode receive filter.

33. The apparatus of claim 29, wherein the ports are not coupled to a duplexer.

34. The apparatus of claim 29, wherein the means for controlling switches concurrently close at least two of the switches corresponding to at least two of the ports that support codirectional signals when indicated by the control signal.

35. The apparatus of claim 34, wherein the ports are not coupled to a diplexer.

36. The apparatus of claim 34, wherein the codirectional signals are receive signals in different bands to enable carrier aggregation.

37. A computer-program product for switching an antenna, comprising a non-transitory tangible computer-readable medium having instructions thereon, the instructions comprising:
code for causing a switchplexer to obtain a control signal;
code for causing the switchplexer to generate switch signals based on the control signal; and
code for causing the switchplexer to control switches that are coupled to an antenna based on the switch signals, wherein each of the switches is separately coupled to one of multiple ports, and wherein the switch signals concurrently close at least two of the switches when indicated by the control signal.

38. The computer-program product of claim 37, the instructions further comprising code for causing the switchplexer to control a separate set of switches that is coupled to another antenna.

39. The computer-program product of claim 37, wherein a transmit filter is coupled to one of the ports and a receive filter coupled to another of the ports, wherein the transmit filter and the receive filter are independently linkable to the antenna.

40. The computer-program product of claim 39, wherein the receive filter is a multiple mode receive filter.

41. The computer-program product of claim 37, wherein the ports are not coupled to a duplexer.

42. The computer-program product of claim 37, wherein the switch signals concurrently close at least two of the switches corresponding to at least two of the ports that support codirectional signals when indicated by the control signal.

43. The computer-program product of claim 42, wherein the ports are not coupled to a diplexer.

44. The computer-program product of claim 42, wherein the codirectional signals are receive signals in different bands to enable carrier aggregation.

* * * * *